US006965422B2

(12) United States Patent
Kubo et al.

(10) Patent No.: US 6,965,422 B2
(45) Date of Patent: Nov. 15, 2005

(54) LIQUID CRYSTAL DISPLAY DEVICE

(75) Inventors: Masumi Kubo, Nara (JP); Kiyoshi Ogishima, Kyoto (JP); Takashi Ochi, Nara (JP); Keizoh Watanabe, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/307,432

(22) Filed: Dec. 2, 2002

(65) Prior Publication Data

US 2003/0107695 A1 Jun. 12, 2003

(30) Foreign Application Priority Data

Jul. 24, 1998 (JP) .......................................... 10-210131
Jul. 24, 1998 (JP) .......................................... 10-210132
Jul. 24, 1998 (JP) .......................................... 10-210133
Jul. 24, 1998 (JP) .......................................... 10-210134

(51) Int. Cl.[7] ...................... G02F 1/1343; G02F 1/1337
(52) U.S. Cl. ........................ 349/143; 349/129; 349/130
(58) Field of Search ............................ 349/42, 43, 128, 349/129, 143, 130, 139

(56) References Cited

U.S. PATENT DOCUMENTS

| | | | |
|---|---|---|---|
| 5,408,345 A | 4/1995 | Mitsui et al. | |
| 5,434,687 A | 7/1995 | Kawata et al. | |
| 5,512,336 A | 4/1996 | Yamahara | |
| 5,666,179 A | 9/1997 | Koma | |
| 6,169,593 B1 | 1/2001 | Kanaya et al. | |
| 6,195,140 B1 | 2/2001 | Kubo et al. | |
| 6,246,453 B1 | 6/2001 | Zhang et al. | |
| 6,256,082 B1 | 7/2001 | Suzuki et al. | |
| 6,330,047 B1 | 12/2001 | Kubo et al. | |
| 6,384,889 B1 | 5/2002 | Miyachi et al. | |
| 6,661,488 B1 | 12/2003 | Takeda et al. | |
| 2001/0024257 A1 * | 9/2001 | Kubo et al. | 349/138 |
| 2002/0036744 A1 | 3/2002 | Kubo et al. | |

FOREIGN PATENT DOCUMENTS

| | | |
|---|---|---|
| EP | 0 884 626 A2 | 12/1998 |
| JP | 6-75238 A | 9/1994 |
| JP | 6-301036 | 10/1994 |
| JP | 10-301114 A | 11/1998 |
| JP | 11-242225 | 9/1999 |
| JP | 2000-47217 | 2/2000 |
| JP | 2000-305110 | 11/2000 |
| JP | 2001-343647 A | 12/2001 |
| JP | 2002-55343 A | 2/2002 |

OTHER PUBLICATIONS

U.S. Appl. No. 10/748,141 filed Dec. 31, 2003.
U.S. Appl. No. 09/923,344, filed Aug. 8, 2001, Kubo, M. et al.

(Continued)

*Primary Examiner*—Toan Ton
*Assistant Examiner*—Tai Duong
(74) *Attorney, Agent, or Firm*—Nixon & Vanderhye P.C.

(57) ABSTRACT

A first substrate includes, on one side thereof that is closer to a liquid crystal layer, a picture element electrode provided for each picture element region, a switching element, and a bus line. A second substrate includes a counter electrode opposing the picture element electrode. The picture element electrode includes a plurality of openings and a solid portion that includes a plurality of unit solid portions. In each picture element region, the liquid crystal layer takes a vertical alignment in the absence of an applied voltage, and forms a plurality of liquid crystal domains, each of which takes a radially-inclined orientation, in the plurality of openings and the solid portion by inclined electric fields produced at respective edge portions of the plurality of openings of the picture element electrode in response to an applied voltage. In each picture element region, at least one of the plurality of openings of the picture element electrode that is located along the bus line and located between two adjacent ones of the plurality of unit solid portions is superposed on the bus line.

15 Claims, 41 Drawing Sheets

OTHER PUBLICATIONS

U.S. Appl. No. 09/983,665, filed Oct. 25, 2001, Kubo, M. et al.
U.S. Appl. No. 10/119,681, filed Apr. 11, 2002, Ogishima, et al.
Chinese Office Action mailed Jul. 30, 2004 in corresponding Chinese application no. 0214006.7
U.S. Appl. 09/357,814 filed Jul. 20, 1999.

Jisaki et al, "Development of transflective LCD for High contrast and wide viewing angle by using homeotropic alignment", Asia Display/IDW '01, pp. 133–136.

* cited by examiner

LIQUID CRYSTAL DISPLAY DEVICE

BACKGROUND OF THE INVENTION

1. Field of the Invention

The present invention relates to a liquid crystal display device, and more particularly to a liquid crystal display device having a wide viewing angle characteristic and being capable of producing a high quality display.

2. Description of the Background Art

In recent years, liquid crystal display devices, which are thin and light in weight, are used as personal computer displays and PDA (personal digital assistance) displays. However, conventional twist nematic (TN) type and super twist nematic (STN) type liquid crystal display devices have a narrow viewing angle. Various technical developments have been undertaken to solve the problem.

A typical technique for improving the viewing angle characteristic of a TN or STN type liquid crystal display device is to add an optical compensation plate thereto. Another approach is to employ a transverse electric field mode in which a horizontal electric field with respect to the substrate plane is applied across the liquid crystal layer. Transverse electric field mode liquid crystal display devices have been attracting public attention and are mass-produced in recent years. Still another technique is to employ a DAP (deformation of vertical aligned phase) mode in which a nematic liquid crystal material having a negative dielectric anisotropy is used as a liquid crystal material and a vertical alignment film is used as an alignment film. This is a type of ECB (electrically controlled birefringence) mode, in which the transmittance is controlled by using the birefringence of liquid crystal molecules.

While the transverse electric field mode is an effective approach to improve the viewing angle, the production process thereof imposes a significantly lower production margin than that of a normal TN type device, whereby it is difficult to realize stable production of the device. This is because the display brightness or the contrast ratio is significantly influenced by variations in the gap between the substrates or a shift in the direction of the transmission axis (polarization axis) of a polarization plate with respect to the orientation axis of the liquid crystal molecules. It requires further technical developments to be able to precisely control these factors and thus to realize stable production of the device.

In order to realize a uniform display without display non-uniformity with a DAP mode liquid crystal display device, an alignment control is necessary. An alignment control can be provided by, for example, subjecting the surface of an alignment film to an alignment treatment by rubbing. However, when a vertical alignment film is subjected to a rubbing treatment, rubbing streaks are likely to appear in the displayed image, and it is not suitable for mass-production.

Another approach proposed in the art for performing an alignment control without a rubbing treatment is to form a slit (opening) in an electrode so as to produce an inclined electric field and to control the orientation direction of the liquid crystal molecules by the inclined electric field (e.g., Japanese Laid-Open Patent Publication Nos. 6-301036 and 2000-47217). However, the present inventors reviewed these publications and found that with the methods disclosed therein, the orientation in regions of the liquid crystal layer corresponding to the openings in the electrode is not defined, whereby the orientation of the liquid crystal molecules is not sufficiently continuous, and it is difficult to achieve a stable orientation across each pixel, resulting in a display with non-uniformity.

In view of this, an inventive entity that includes some of the present inventors proposed another approach (Japanese Patent Application No. 2000-244648), in which a predetermined electrode structure including openings and a solid portion is formed on one of a pair of substrates opposing each other via a liquid crystal layer therebetween, so that a plurality of liquid crystal domains, each of which takes a radially-inclined orientation, are formed in the openings and the solid portion by inclined electric fields that are produced at the respective edge portions of the openings.

However, the present inventors have found that the display quality may not be improved sufficiently only by providing an electrode structure as disclosed in this patent application. This is due to an electric field produced in the vicinity of the edge of a bus line (herein, the term "bus line" is used to refer collectively to a group of interconnection lines) exerting an orientation-regulating force that is not matched with the orientation-regulating force exerted by the inclined electric field produced at the edge portion of the opening.

SUMMARY OF THE INVENTION

The present invention has been made to solve the problem in the prior art, and has an object to provide a liquid crystal display device having a wide viewing angle characteristic and a high display quality.

A liquid crystal display device of the present invention includes a first substrate, a second substrate, a liquid crystal layer provided between the first substrate and the second substrate, and a plurality of picture element regions for producing a display, wherein: the first substrate includes, on one side thereof that is closer to the liquid crystal layer, a picture element electrode provided for each of the plurality of picture element regions, a switching element electrically connected to the picture element electrode, and a bus line including a gate bus line and a source bus line that are electrically connected to the switching element; the second substrate includes a counter substrate opposing the picture element electrode via the liquid crystal layer; the picture element electrode includes a plurality of openings and a solid portion that includes a plurality of unit solid portions; in each of the plurality of picture element regions, the liquid crystal layer takes a vertical alignment in the absence of an applied voltage between the picture element electrode and the counter electrode, and forms a plurality of liquid crystal domains in the plurality of openings and the solid portion by inclined electric fields produced at respective edge portions of the plurality of openings of the picture element electrode in response to a voltage applied between the picture element electrode and the counter electrode, each of the plurality of liquid crystal domains taking a radially-inclined orientation, and an orientation of each of the plurality of liquid crystal domains changing according to the applied voltage, thereby producing a display; and in each of the plurality of picture element regions, at least one of the plurality of openings of the picture element electrode that is located along the bus line and located between two adjacent ones of the plurality of unit solid portions overlaps the bus line. Thus, the object set forth above is achieved.

Another liquid crystal display device of the present invention includes a first substrate, a second substrate, a liquid crystal layer provided between the first substrate and the second substrate, and a plurality of picture element regions for producing a display, wherein: the first substrate includes, on one side thereof that is closer to the liquid crystal layer, a picture element electrode provided for each of the plurality of picture element regions, a switching element electrically connected to the picture element electrode, and a bus line including a gate bus line and a source bus line that are electrically connected to the switching element; the second substrate includes a counter substrate opposing the picture element electrode via the liquid crystal layer; the picture element electrode includes a plurality of openings and a solid portion that includes a plurality of unit solid portions, each of which is surrounded by at least some of the plurality of openings; the liquid crystal layer takes a vertical alignment in the absence of an applied voltage between the picture element electrode and the counter electrode; and in each of the plurality of picture element regions, at least one of the plurality of openings of the picture element electrode that is located along the bus line and located between two adjacent ones of the plurality of unit solid portions overlaps the bus line. Thus, the object set forth above is achieved.

Preferably, the at least one opening that overlaps the bus line at least includes an opening that is located along the gate bus line.

Some of the plurality of openings of the picture element electrode that are located along the gate bus line may all overlap the bus line.

The at least one opening that overlaps the bus line may further include an opening that is located along the source bus line.

Preferably, at least some of the plurality of openings have substantially the same shape and substantially the same size, and form at least one unit lattice arranged so as to have rotational symmetry.

Preferably, a shape of each of the at least some of the plurality of openings has rotational symmetry.

Each of the at least some of the plurality of openings may have a generally circular shape.

Each of the plurality of unit solid portions may have a generally circular shape.

Preferably, in each of the plurality of picture element regions, a total area of the plurality of openings of the picture element electrode is smaller than an area of the solid portion of the picture element electrode.

The liquid crystal display device may further include a protrusion within each of the plurality of openings, the protrusion having the same cross-sectional shape in a plane of the first substrate as that of the plurality of openings, a side surface of the protrusion having an orientation-regulating force of the same direction with respect to liquid crystal molecules of the liquid crystal layer as a direction of orientation regulation by the inclined electric field.

Still another liquid crystal display device includes a first substrate, a second substrate, a liquid crystal layer provided between the first substrate and the second substrate, and a plurality of picture element regions for producing a display, wherein: the first substrate includes, on one side thereof that is closer to the liquid crystal layer, a picture element electrode provided for each of the plurality of picture element regions, a switching element electrically connected to the picture element electrode, and a bus line including a gate bus line and a source bus line that are electrically connected to the switching element; the second substrate includes a counter substrate opposing the picture element electrode via the liquid crystal layer; the picture element electrode includes a plurality of openings and a solid portion; in each of the plurality of picture element regions, the liquid crystal layer takes a vertical alignment in the absence of an applied voltage between the picture element electrode and the counter electrode, and an orientation of the liquid crystal layer is regulated by inclined electric fields produced at respective edge portions of the plurality of openings of the picture element electrode in response to a voltage applied between the picture element electrode and the counter electrode; and in each of the plurality of picture element regions, at least one of an edge of the gate bus line and that of the source bus line is covered by the solid portion of the picture element electrode. Thus, the object set forth above is achieved.

Preferably, in each of the plurality of picture element regions, at least the edge of the gate bus line is covered by the solid portion of the picture element electrode.

In each of the plurality of picture element regions, the edge of the gate bus line and that of the source bus line may be both covered by the solid portion of the picture element electrode.

The solid portion of the picture element electrode may include a plurality of unit solid portions; and in each of the plurality of picture element regions, the liquid crystal layer may form a plurality of liquid crystal domains in the plurality of openings and the solid portion by inclined electric fields produced at respective edge portions of the plurality of openings of the picture element electrode in response to a voltage applied between the picture element electrode and the counter electrode, each of the plurality of liquid crystal domains taking a radially-inclined orientation, and an orientation of each of the plurality of liquid crystal domains changing according to the applied voltage, thereby producing a display.

In each of the plurality of picture element regions, at least one of the plurality of openings of the picture element electrode that is located along the bus line and located between two adjacent ones of the plurality of unit solid portions may overlap the bus line.

The liquid crystal layer may form a portion of a liquid crystal domain that takes a radially-inclined orientation in a portion of the solid portion that is located along the bus line by the inclined electric field in the presence of an applied voltage between the picture element electrode and the counter electrode.

Functions of the present invention will now be described.

In the liquid crystal display device of the present invention, the picture element electrode for applying a voltage across the liquid crystal layer in each picture element region includes a plurality of openings (a portion of the electrode where a conductive film does not exist) and a solid portion (a portion of the electrode other than the openings, i.e., a portion where a conductive film exists). The solid portion includes a plurality of unit solid portions, each of which is substantially surrounded by the openings, and is typically made of a continuous conductive film. The liquid crystal layer takes a vertical orientation in the absence of an applied voltage, whereas in the presence of an applied voltage, a plurality of liquid crystal domains, each of which takes a radially-inclined orientation, are formed by inclined electric fields that are produced at the respective edge portions of the openings of the picture element electrode. Typically, the liquid crystal layer is made of a liquid crystal material having a negative dielectric anisotropy, and the orientation of the liquid crystal layer is controlled by vertical alignment films provided on the opposing sides thereof.

The liquid crystal domains are formed by the inclined electric fields in regions corresponding to the openings and the solid portion of the picture element electrode, and the orientation of each liquid crystal domain changes according to the applied voltage, thereby producing a display. Since each liquid crystal domain takes an axially symmetrical orientation, there is little viewing angle dependence of the display quality, and thus a wide viewing angle characteristic is realized.

Moreover, a liquid crystal domain corresponding to an opening and a liquid crystal domain corresponding to a solid portion are both formed by an inclined electric field produced at the edge portion of the opening, whereby these liquid crystal domains are formed adjacent to each other in an alternating pattern, and the orientation of the liquid crystal molecules in one liquid crystal domain and that in another adjacent liquid crystal domain are essentially continuous with each other. Therefore, no disclination line is formed between a liquid crystal domain formed in the opening and another adjacent liquid crystal domain formed in the solid portion, whereby the display quality is not deteriorated and the orientation of the liquid crystal molecules is highly stable.

In the liquid crystal display device of the present invention, the liquid crystal molecules take a radially-inclined orientation not only in a region corresponding to the solid portion of the picture element electrode but also in a region corresponding to the opening thereof. With such a liquid crystal display device, as compared to the conventional liquid crystal display device described above, the continuity in the orientation of the liquid crystal molecules is higher while a stable orientation is realized, whereby a uniform display without display non-uniformity can be obtained. Particularly, in order to realize a desirable response characteristic (high response speed), the inclined electric field for controlling the orientation of the liquid crystal molecules needs to act upon a large number of liquid crystal molecules. For this purpose, it is necessary to form a large number of openings (edge portions). In the liquid crystal display device of the present invention, a liquid crystal domain having a stable radially-inclined orientation is formed for each opening. Therefore, even if a large number of openings are formed in order to improve the response characteristic, a decrease in the display quality (occurrence of display non-uniformity) can be suppressed.

However, the display quality may not be improved sufficiently only by providing an electrode structure as described above, depending on the positional relationship between the openings of the picture element electrode and the edge of the bus line (a group of interconnection lines).

Since a predetermined signal (voltage) for driving the liquid crystal display device is applied to the bus line of the liquid crystal display device, an electric field is produced between the bus line and the counter electrode. Therefore, an inclined electric field is produced in the vicinity of the edge of the bus line. However, the orientation-regulating force from the inclined electric field is not matched with that from an inclined electric field that is produced at the edge portion of the opening. Therefore, if the liquid crystal domain formed in an opening that is located along the bus line is subject to the orientation-regulating force from the inclined electric field in the vicinity of the edge of the bus line, the orientation of the liquid crystal domain is disturbed, thereby resulting in a distorted radially-inclined orientation. Moreover, since adjacent liquid crystal domains are predisposed to maintain the orientation continuity therebetween, the orientation disturbance influences the orientation of adjacent liquid crystal domains, i.e., the liquid crystal domains of adjacent unit solid portions. Thus, the orientation of the liquid crystal domain of each of the adjacent unit solid portions is disturbed.

In a liquid crystal domain that takes a distorted radially-inclined orientation due to its disturbed orientation, the orientation is not stable and it easily collapses, whereby it takes a long time before the orientation of such a liquid crystal domain reaches a steady state after a voltage application. Thus, the orientation disturbance as described above leads to a decrease in the response speed (deterioration in the response characteristic).

Moreover, each liquid crystal domain in a picture element region reaches a steady state with such a distorted radially-inclined orientation, in which the orientation is disturbed, and the disturbed orientation varies from one picture element region to another. Therefore, an after image phenomenon may occur, in which the previously-displayed image remains after an image-switching signal is input. This is because if the orientation of the liquid crystal layer varies among different picture element regions, the transmittance also varies among different picture element regions. Particularly, there is a significant difference in the orientation of the liquid crystal layer between a picture element region that has transitioned to an intermediate gray level display from a white display and a picture element region that has transitioned to an intermediate gray level display from a black display, and the difference in transmittance between such picture element regions is likely to be viewed as an after image phenomenon. This is for the following reason. In a white display, the inclined electric field produced at the edge portion of an opening exerts a relatively strong orientation-regulating force, whereby the orientation of the liquid crystal layer is stable. Therefore, the orientation of the liquid crystal layer is stable even after the transition to an intermediate gray level display. On the other hand, when transitioning from a black display to an intermediate gray level display, the orientation of the liquid crystal layer is likely to collapse because the orientation-regulating force from the inclined electric field produced at the edge portion of an opening is relatively weak.

The liquid crystal display device of the present invention is designed so that in each of a plurality of picture element regions, at least one of a plurality of openings that is located along the bus line and located between two adjacent unit solid portions is superposed on the bus line (strictly speaking, a portion of the bus line). Therefore, the edge of a bus line in the vicinity of an opening that is superposed on the bus line is covered by the unit solid portions of the picture element region.

Therefore, in the vicinity of an opening that is superposed on the bus line, the liquid crystal molecules of the liquid crystal layer are electrically shielded by the unit solid portions of the picture element region from the influence of the inclined electric field produced in the vicinity of the edge of the bus line. Thus, the liquid crystal molecules of the liquid crystal layer are not subject to the orientation-regulating force from the inclined electric field produced in the vicinity of the edge of the bus line, and the orientation thereof is regulated only by the inclined electric field that is produced at the edge portion of the opening. Therefore, in the liquid crystal display device of the present invention, the orientation is not disturbed in the liquid crystal domain formed in an opening that is superposed on a bus line or in the liquid crystal domain formed in a unit solid portion that is adjacent to the opening, whereby the decrease in the response speed (deterioration in the response characteristic) and the occurrence of the after image phenomenon are suppressed.

In order to suppress the orientation disturbance due to the inclined electric field produced in the vicinity of the edge of the bus line, it is preferred to increase the proportion of the opening that is superposed on the bus line, i.e., to increase the portion of the edge of the bus line to be covered by the unit solid portions of the picture element region. However, in a case where the bus line is made of a light-blocking material, an increase in this proportion may decrease the aperture ratio. Thus, the proportion of the opening that is superposed on the bus line can suitably be determined depending on the application of the liquid crystal display device, etc., in view of the intended response characteristic and aperture ratio.

The decrease in the response speed and the occurrence of the after image phenomenon can be suppressed effectively by employing an arrangement where the opening that is located between two adjacent unit solid portions and superposed on the bus line at least include the opening that is located along the gate bus line (i.e., an arrangement where among openings that are located along the bus line and located between two adjacent unit solid portions, at least an opening that is located along the gate bus line are superposed on the bus line). This is because a larger voltage is typically applied to the gate bus line than to the source bus line, whereby an inclined electric field produced in the vicinity of the edge of the gate bus line has a greater influence on the liquid crystal molecules than an inclined electric field produced in the vicinity of the edge of the source bus line.

Moreover, not only the opening that is located between two adjacent unit solid portions, but also other openings that are located along the bus line, may be superposed on the bus line. For example, among a plurality of openings of a picture element electrode, all of the openings that are located along a gate bus line may be superposed on the bus line.

Of course, an alternative arrangement may be employed, e.g., an arrangement where the opening that is located between two adjacent unit solid portions and superposed on the bus line includes the opening that is located along the source bus line.

Note that although the inclined electric field produced in the vicinity of the edge of the bus line not only causes the decrease in the response speed and the after image phenomenon, as described above, but also causes a decrease in the contrast ratio, the decrease in the contrast ratio can be suppressed as will be described below if the bus line is made of a light-blocking material.

As described above, an inclined electric field is produced in the vicinity of the edge of the bus line, and the inclined electric field is produced regardless of the presence/absence of the applied voltage across the liquid crystal layer between the picture element electrode and the counter electrode. Therefore, in a liquid crystal display device that produces a display in a normally black mode, if the liquid crystal molecules in the vicinity of the edge of the bus line are inclined, in the absence of an applied voltage, by the orientation-regulating force from the inclined electric field, light leakage may occur, thereby decreasing the contrast ratio. Particularly, since the gate bus line is, most of the time, under the application of a relatively high voltage for holding switching elements OFF, the degree of such light leakage is significant in the vicinity of the edge of the gate bus line.

In the liquid crystal display device of the present invention, the edge of the bus line near an opening that is superposed on the bus line is covered by the unit solid portions of the picture element electrode, whereby the liquid crystal molecules of the liquid crystal layer are electrically shielded from the influence of the inclined electric field produced in the vicinity of the edge of the bus line. Therefore, the liquid crystal molecules of the liquid crystal layer are not inclined by the orientation-regulating force from the inclined electric field. Although the liquid crystal molecules of the liquid crystal layer in the opening that is superposed on the bus line may be inclined by the electric field produced between the bus line and the counter electrode, the opening that is superposed on the bus line is blocked from light if the bus line is made of a light-blocking material. Therefore, in the liquid crystal display device of the present invention, the occurrence of light leakage is suppressed, thereby suppressing the decrease in the contrast ratio, if the bus line is made of a light-blocking material.

Moreover, if the bus line is made of a light-blocking material, it is possible to suppress the non-uniformity in the display plane (i.e., a local variation in the contrast ratio), as will be described below, thereby improving the display quality.

A residual charge is likely to occur in an opening, through which an insulator material is exposed, due to the inclined electric field produced in the vicinity of the edge of the bus line, and if the liquid crystal molecules in the opening that is located along the bus line are inclined due to the influence of the residual charge, it will cause light leakage. While the degree of the residual charge varies depending on the surface condition of the insulator material, variations in the surface condition of the insulator material occur when printing an alignment film or when injecting a liquid crystal material. Therefore, in a liquid crystal display device, there are variations in the residual charge in the display plane. If the residual charge varies in the display plane, the degree of light leakage also varies in the display plane, thereby causing local variations in the contrast ratio, thus resulting in non-uniformity. Particularly, since a relatively high voltage is applied to the gate bus line, as described above, the gate bus line significantly contributes to the occurrence of the non-uniformity.

In the liquid crystal display device of the present invention, when the bus line is made of a light-blocking material, the opening that is superposed on the bus line is shaded by the bus line, thereby suppressing the occurrence of the non-uniformity as described above, and thus improving the display quality.

When at least some of the plurality of openings have substantially the same shape and substantially the same size, and form at least one unit lattice arranged so as to have rotational symmetry, a plurality of liquid crystal domains can be arranged with a high degree of symmetry for each unit lattice, whereby it is possible to improve the viewing angle dependence of the display quality. Moreover, by dividing the entire picture element region into unit lattices, it is possible to stabilize the orientation of the liquid crystal layer across the entire picture element region. For example, openings may be arranged so that the centers of the openings form a square lattice. Note that where each picture element region is divided by an opaque element such as a storage capacitance line, a unit lattice can be arranged for each region contributing to the display.

When the shape of each of at least some of the plurality of openings (typically those forming a unit lattice) has rotational symmetry, it is possible to increase the stability of the radially-inclined orientation of the liquid crystal domain formed in the opening. For example, the shape of each opening (as viewed in the substrate normal direction) may be a circular shape or a regular polygonal shape (e.g., a square shape). Note that a shape that does not have rotational symmetry (e.g., an elliptical shape) may be employed depending upon the shape (aspect ratio) of the picture element, etc. Moreover, when the shape of a region of the solid portion that is substantially surrounded by the openings ("unit solid portion") has rotational symmetry, it is possible to increase the stability of the radially-inclined orientation of the liquid crystal domain formed in the solid portion. For example, when the openings are arranged in a square lattice pattern, the shape of the opening may be a generally star shape or a cross shape, and the shape of the solid portion may be a generally circular shape, a generally square shape, or the like. Of course, the openings and the solid portion substantially surrounded by the openings may both have a generally square shape.

In order to stabilize the radially-inclined orientation of the liquid crystal domain formed in the electrode opening, it is preferred that the liquid crystal domain formed in the opening has a generally circular shape. In other words, the shape of the opening may be designed so that the liquid crystal domain formed in the opening has a generally circular shape.

Of course, in order to stabilize the radially-inclined orientation of the liquid crystal domain formed in the electrode solid portion, it is preferred that the region of the solid portion substantially surrounded by the openings has a generally circular shape. A liquid crystal domain formed in the solid portion, which is made of a continuous conductive film, is formed corresponding to a region of a solid portion (unit solid portion) that is substantially surrounded by a plurality of openings. Therefore, the shape and arrangement of the openings may be determined so that the region of the solid portion (unit solid portion) has a generally circular shape.

With any of the alternatives described above, it is preferred that the total area of the openings formed in the electrode is smaller than the area of the solid portion in each picture element region. As the area of the solid portion increases, the area of the liquid crystal layer (defined in the plane of the liquid crystal layer as viewed in the substrate normal direction) that is directly influenced by the electric field produced by the electrodes increases, thereby improving the optical characteristics (e.g., the transmittance) with respect to the voltage applied across the liquid crystal layer.

It is preferred that whether to employ an arrangement where each opening has a generally circular shape or an arrangement where each unit solid portion has a generally circular shape is determined by determining with which arrangement, the area of the solid portion can be made larger. Which arrangement is more preferred is appropriately selected depending upon the pitch of the picture elements. Typically, when the pitch is greater than about 25 $\mu$m, it is preferred that the openings are formed so that each solid portion has a generally circular shape. When the pitch is less than or equal to about 25 $\mu$m, it is preferred that each opening has a generally circular shape.

The orientation-regulating force from an inclined electric field produced at the edge portion of an opening formed in an electrode described above is present only in the presence of an applied voltage. Therefore, in the absence of an applied voltage or in the presence of a relatively low voltage, it may not be possible to maintain the radially-inclined orientation of a liquid crystal domain if, for example, a stress is applied on the liquid crystal panel. In order to solve this problem, a liquid crystal display device of one embodiment of the present invention includes, within each electrode opening, a protrusion whose side surface has an orientation-regulating force of the same direction with respect to the liquid crystal molecules of the liquid crystal layer as the direction of orientation regulation by the inclined electric field as described above. It is preferred that the cross-sectional shape of the protrusion in the substrate plane direction is the same as that of the opening, and has rotational symmetry as does the shape of the opening as described above.

With the liquid crystal display device of the present invention, it is possible to realize a stable radially-inclined orientation only by providing openings in each picture element electrode, and by arranging the openings of each picture element electrode in a predetermined positional relationship with the edge of the bus line. Specifically, the liquid crystal display device of the present invention can be produced by a known production method by modifying a photomask in the step of patterning a conductive film into picture element electrodes so that openings of an intended shape are formed in an intended arrangement, and by modifying a photomask in the step of patterning the bus line so that the bus line is formed in an intended shape.

In another liquid crystal display device of the present invention, the edge of at least one of the gate bus line and the source bus line is covered by the solid portion of a picture element electrodes. Therefore, in the vicinity of the bus line whose edge is covered by the solid portion of the picture element electrode, the liquid crystal molecules of the liquid crystal layer are electrically shielded from the influence of the inclined electric field produced in the vicinity of the edge of the bus line. Thus, the liquid crystal molecules of the liquid crystal layer are not subject to the orientation-regulating force from the inclined electric field. Therefore, the occurrence of light leakage is suppressed, thereby suppressing the decrease in the contrast ratio. Moreover, since a region in the vicinity of the edge that is covered by the solid portion of a picture element electrode is covered by the conductive film (solid portion) of the picture element electrode, a residual charge is unlikely to occur, and thus the occurrence of non-uniformity is suppressed. As described above, in this liquid crystal display device of the present invention, the occurrence of light leakage due to an inclined electric field produced in the vicinity of the bus line is suppressed, thereby suppressing the decrease in the contrast ratio, while the occurrence of non-uniformity due to a residual charge in the vicinity of the bus line is suppressed, thereby realizing a high-quality display.

Since an inclined electric field produced in the vicinity of the edge of the gate bus line has a greater influence on the liquid crystal molecules than an inclined electric field produced in the vicinity of the edge of the source bus line, it is preferred that at least the edge of the gate bus line is covered by the solid portion of the picture element electrode. Moreover, in order to more reliably suppress the influence of an inclined electric field produced in the vicinity of the edge of the bus line, it is preferred that the edge of the gate bus line and that of the source bus line are both covered by the solid portion of the picture element electrode.

In the liquid crystal display device of the present invention, the decrease in the display quality due to the inclined electric field produced in the vicinity of the edge of the bus line is suppressed. Therefore, the present invention provides a liquid crystal display device having a wide viewing angle characteristic and a high display quality.

The present invention can suitably be used with an active matrix type liquid crystal display device, and can suitably be used with any of a transmission type liquid crystal display device, a reflection type liquid crystal display device, and a transmission/reflection combination type liquid crystal display device.

BRIEF DESCRIPTION OF THE DRAWINGS

FIG. 1A and FIG. 1B schematically illustrate a structure of one picture element region of a liquid crystal display device 100 according to an embodiment of the present invention, wherein FIG. 1A is a plan view, and FIG. 1B is a cross-sectional view taken along line 1B–1B' of FIG. 1A.

Each of FIG. 3A to FIG. 3D schematically illustrates the relationship between an electric force line and an orientation of a liquid crystal molecule.

Figure 4A:
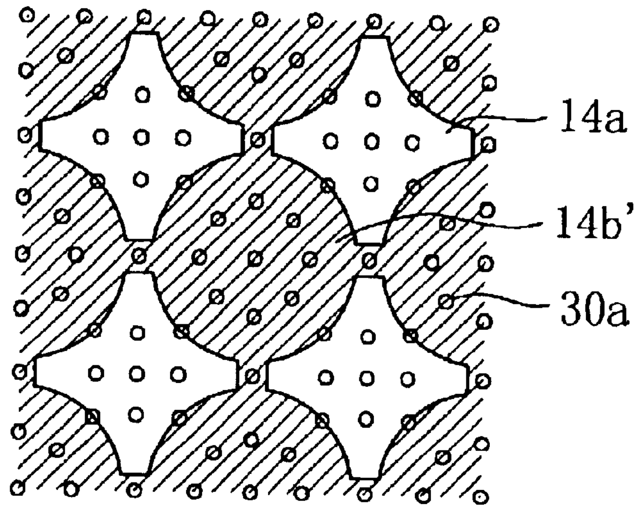
Figure 4B:
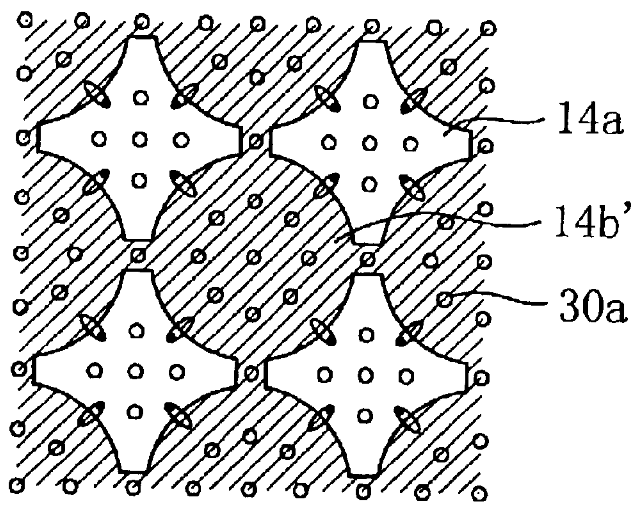
Figure 4C:
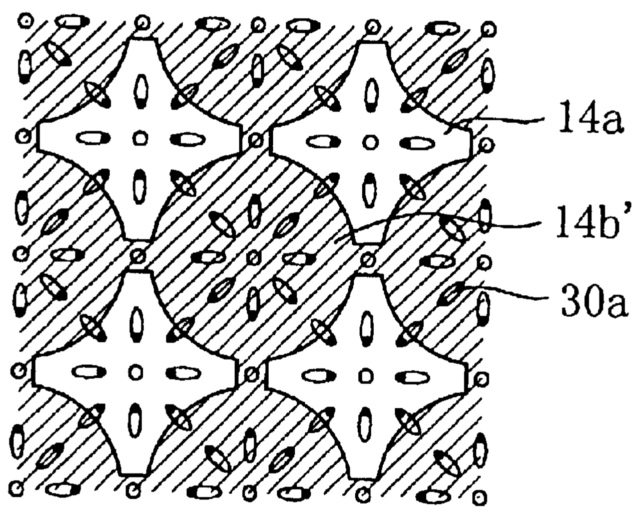

Each of FIG. 4A to FIG. 4C schematically illustrates an orientation of liquid crystal molecules in the liquid crystal display device 100 according to an embodiment of the present invention as viewed in a substrate normal direction.

Figure 5A:
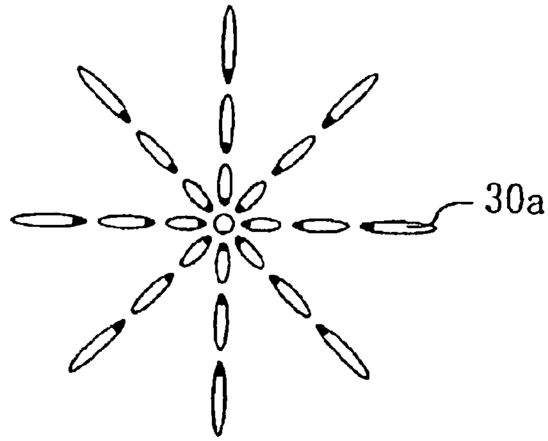
Figure 5B:
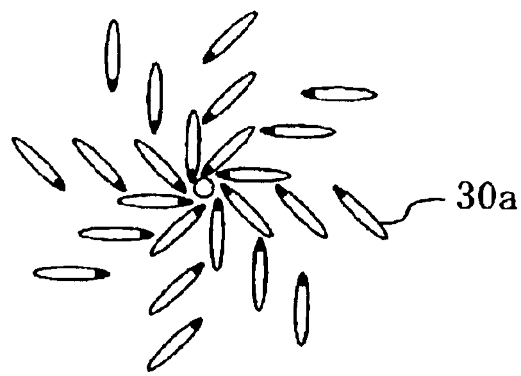
Figure 5C:
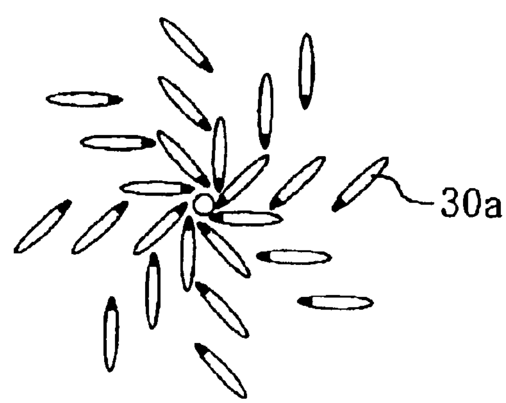

FIG. 5A to FIG. 5C schematically illustrate exemplary radially-inclined orientations of liquid crystal molecules.

Figure 6A:
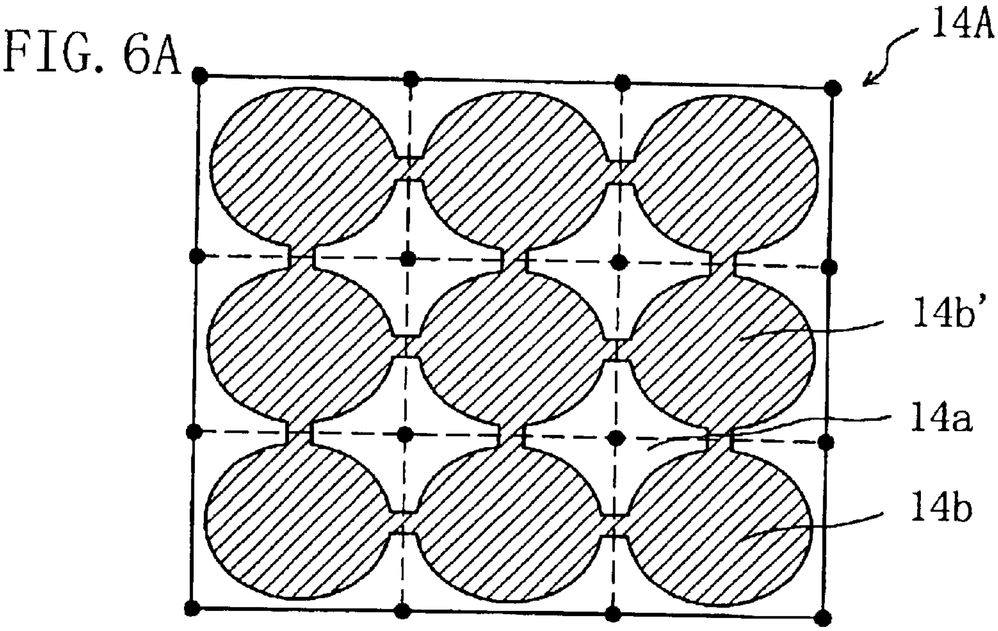
Figure 6B:
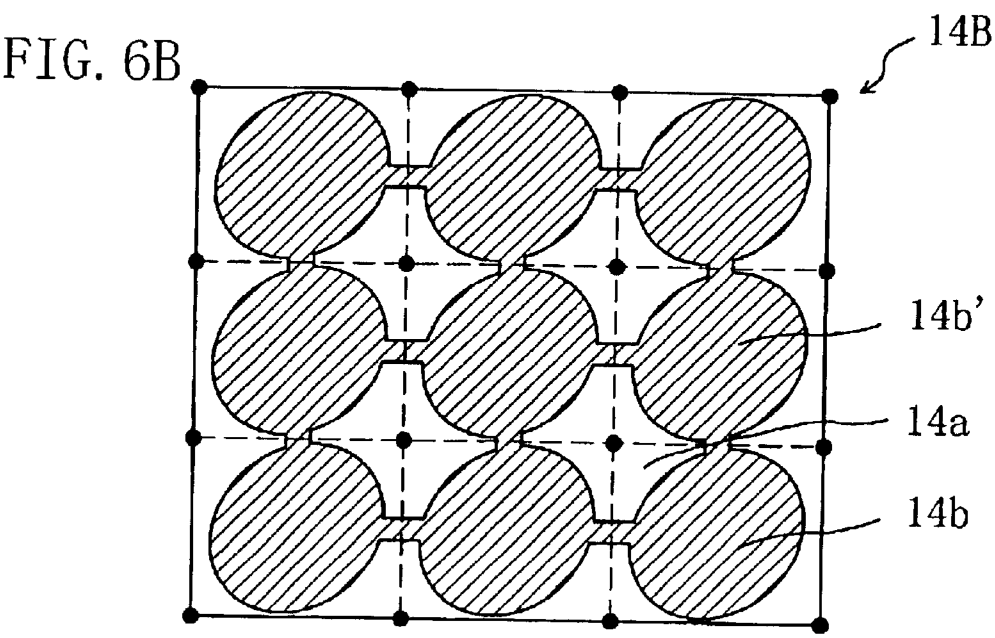

FIG. 6A and FIG. 6B are plan views schematically illustrating other picture element electrodes used in the liquid crystal display device according to an embodiment of the present invention.

Figure 7A:
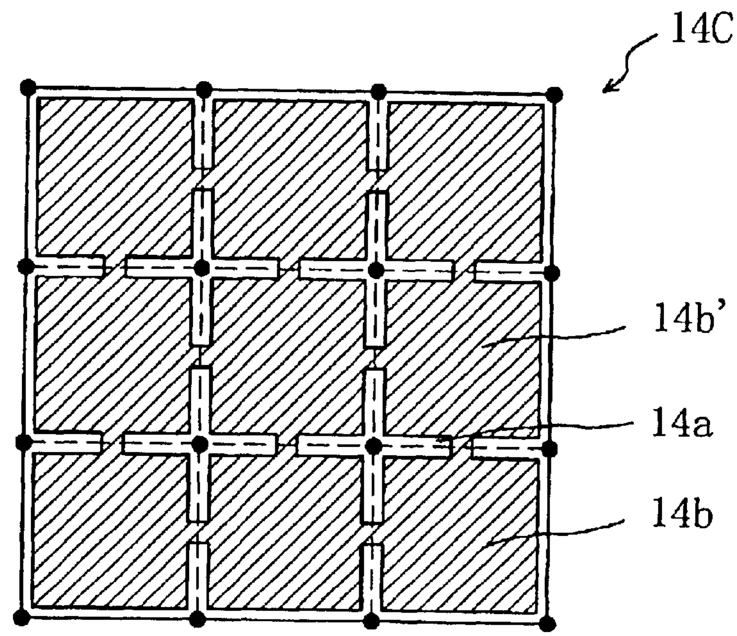
Figure 7B:
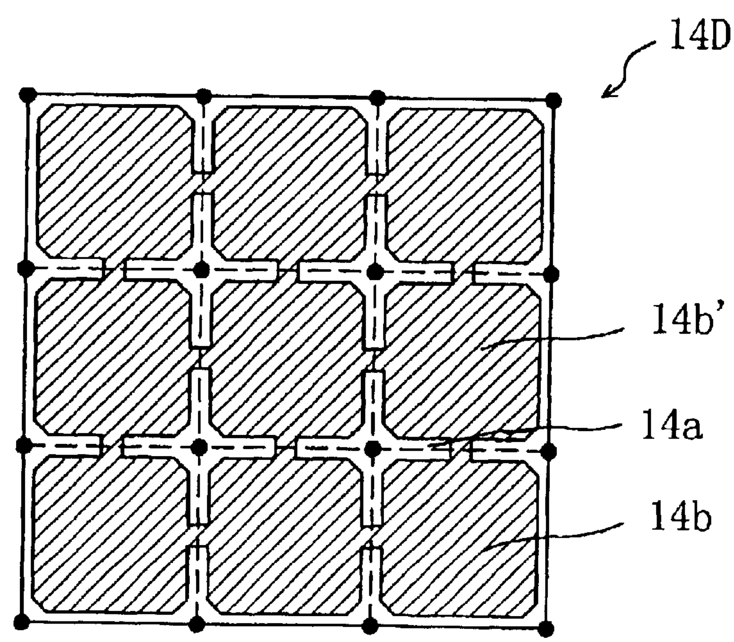

FIG. 7A and FIG. 7B are plan views schematically illustrating still other picture element electrodes used in the liquid crystal display device according to an embodiment of the present invention.

Figure 8A:
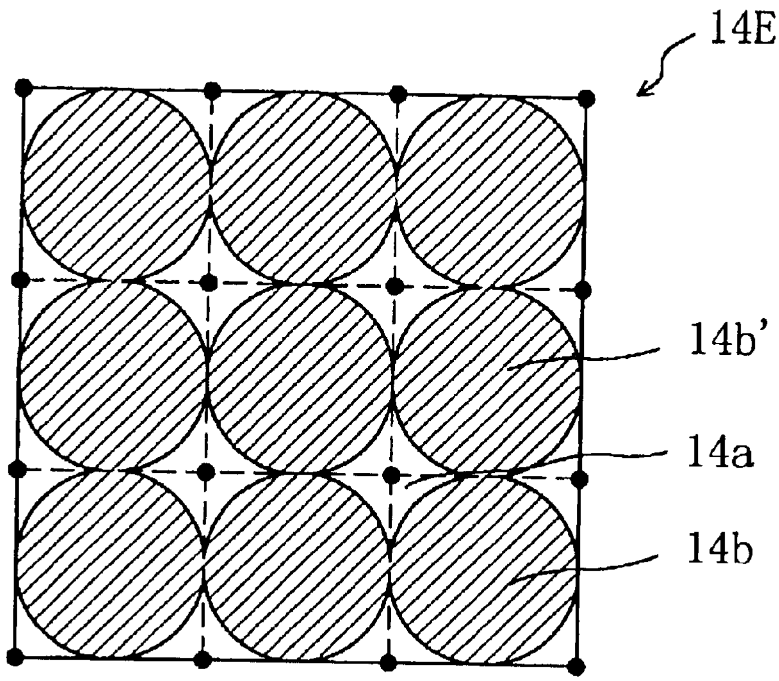
Figure 8B:
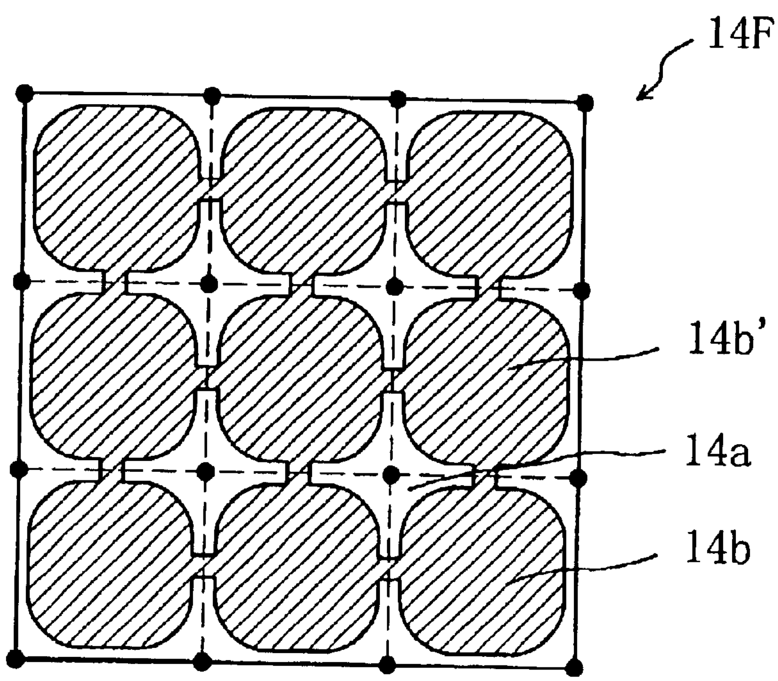

FIG. 8A and FIG. 8B are plan views schematically illustrating still other picture element electrodes used in the liquid crystal display device according to an embodiment of the present invention.

Figure 9:
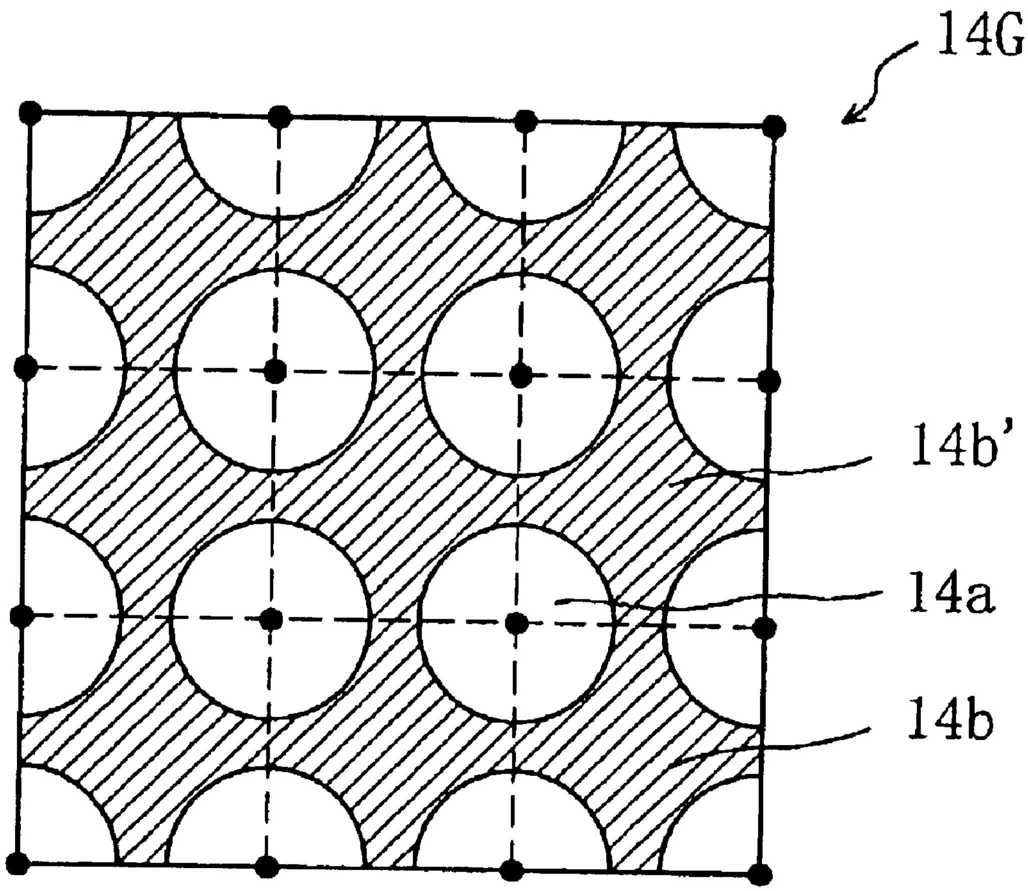

FIG. 9 is a plan view schematically illustrating still another picture element electrode used in the liquid crystal display device according to an embodiment of the present invention.

Figure 10A:
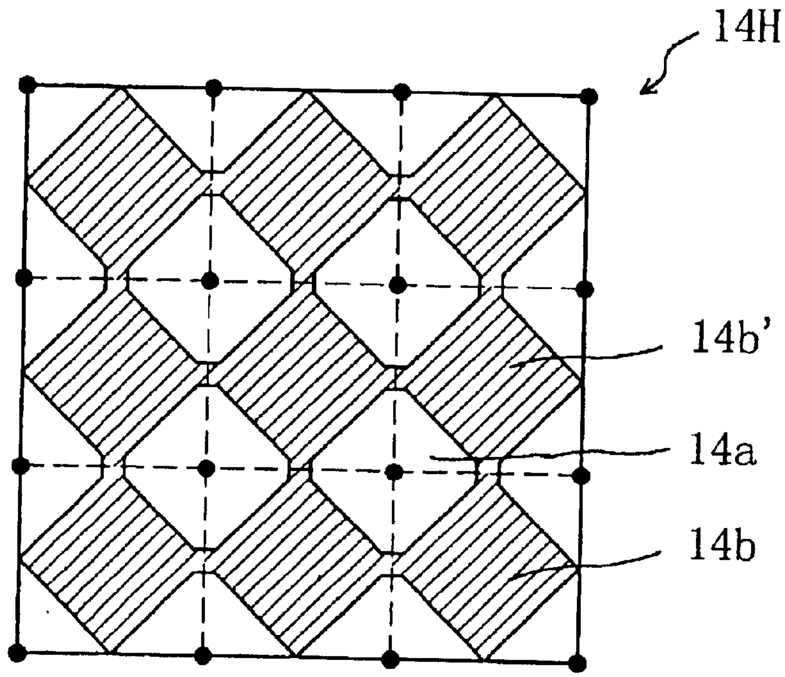
Figure 10B:
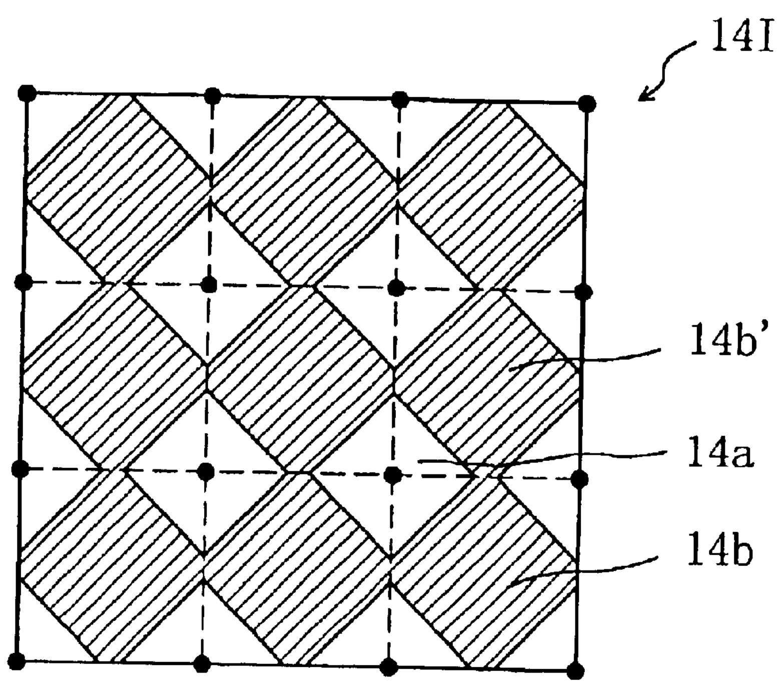

FIG. 10A and FIG. 10B are plan views schematically illustrating still other picture element electrodes used in the liquid crystal display device according to an embodiment of the present invention.

Figure 1A:
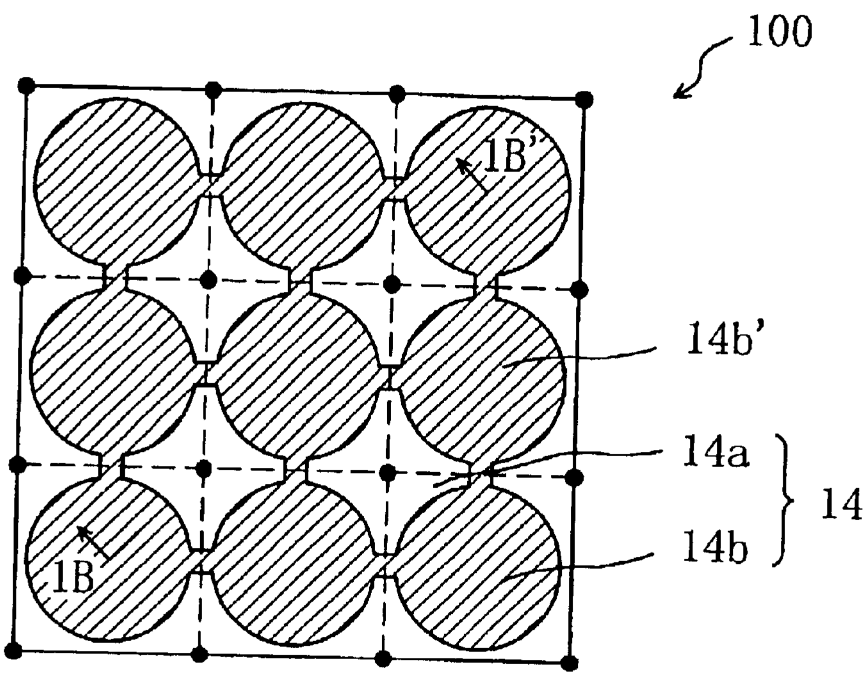
Figure 11A:
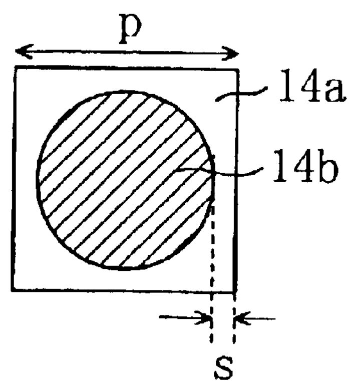
Figure 11B:
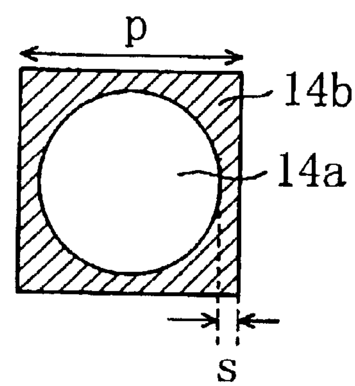
Figure 11C:
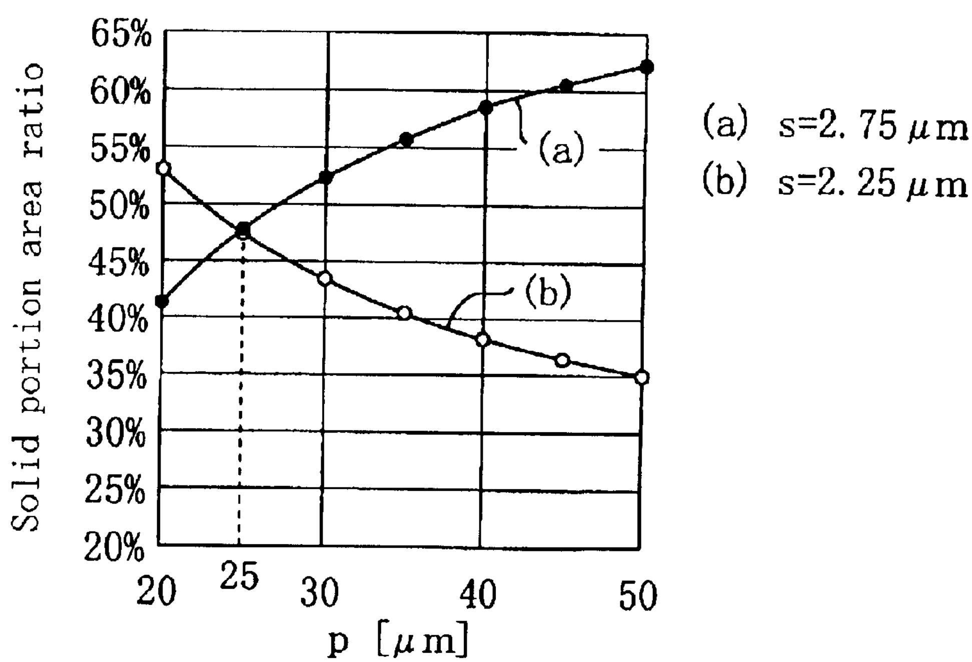

FIG. 11A schematically illustrates a unit lattice of the pattern illustrated in FIG. 1A, FIG. 11B schematically illustrates a unit lattice of the pattern illustrated in FIG. 9, and FIG. 11C is a graph illustrating the relationship between a pitch p and a solid portion area ratio.

Figure 12:
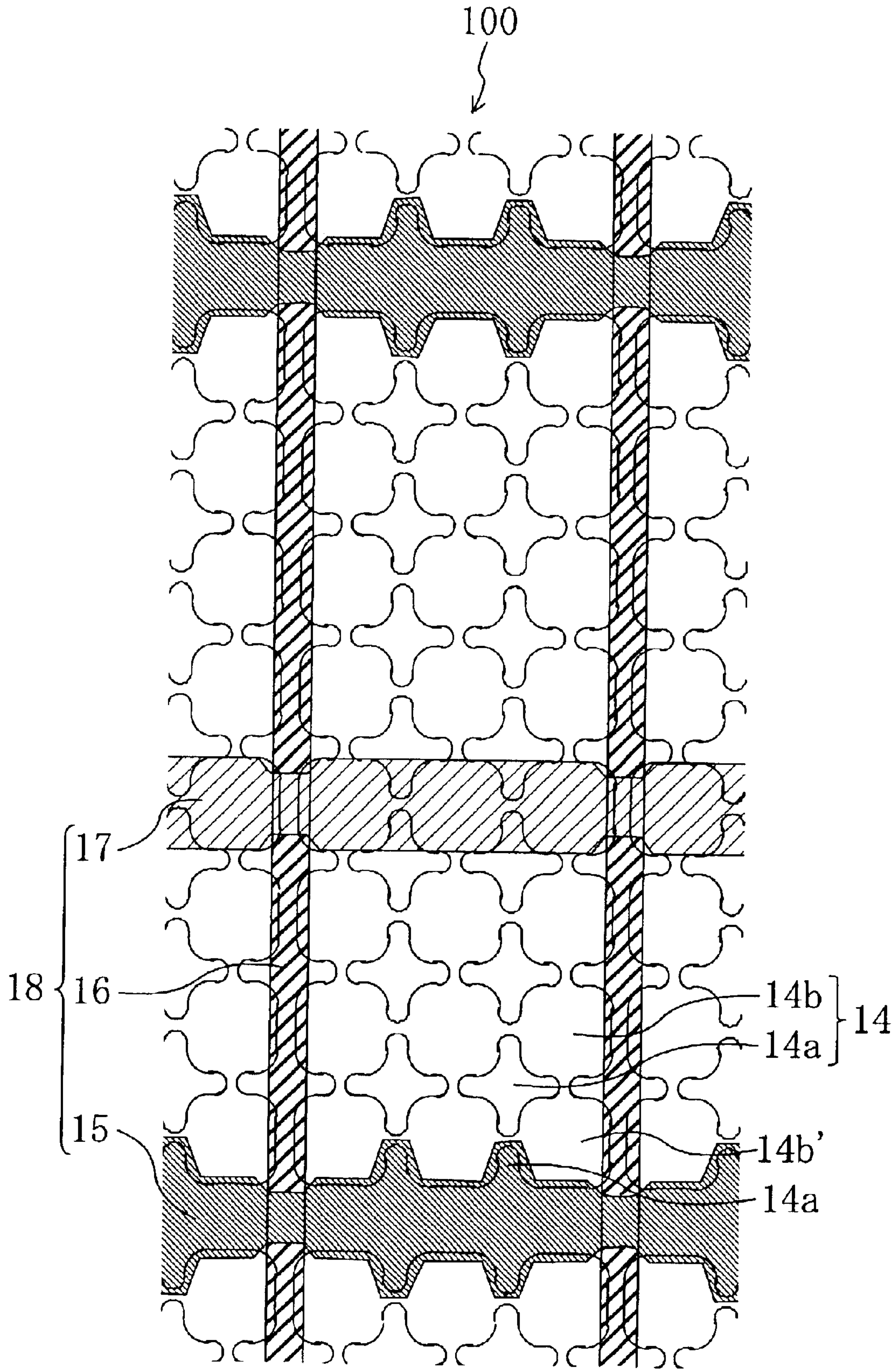

FIG. 12 is a plan view schematically illustrating a structure of one picture element region of the liquid crystal display device 100 according to an embodiment of the present invention.

Figure 13:
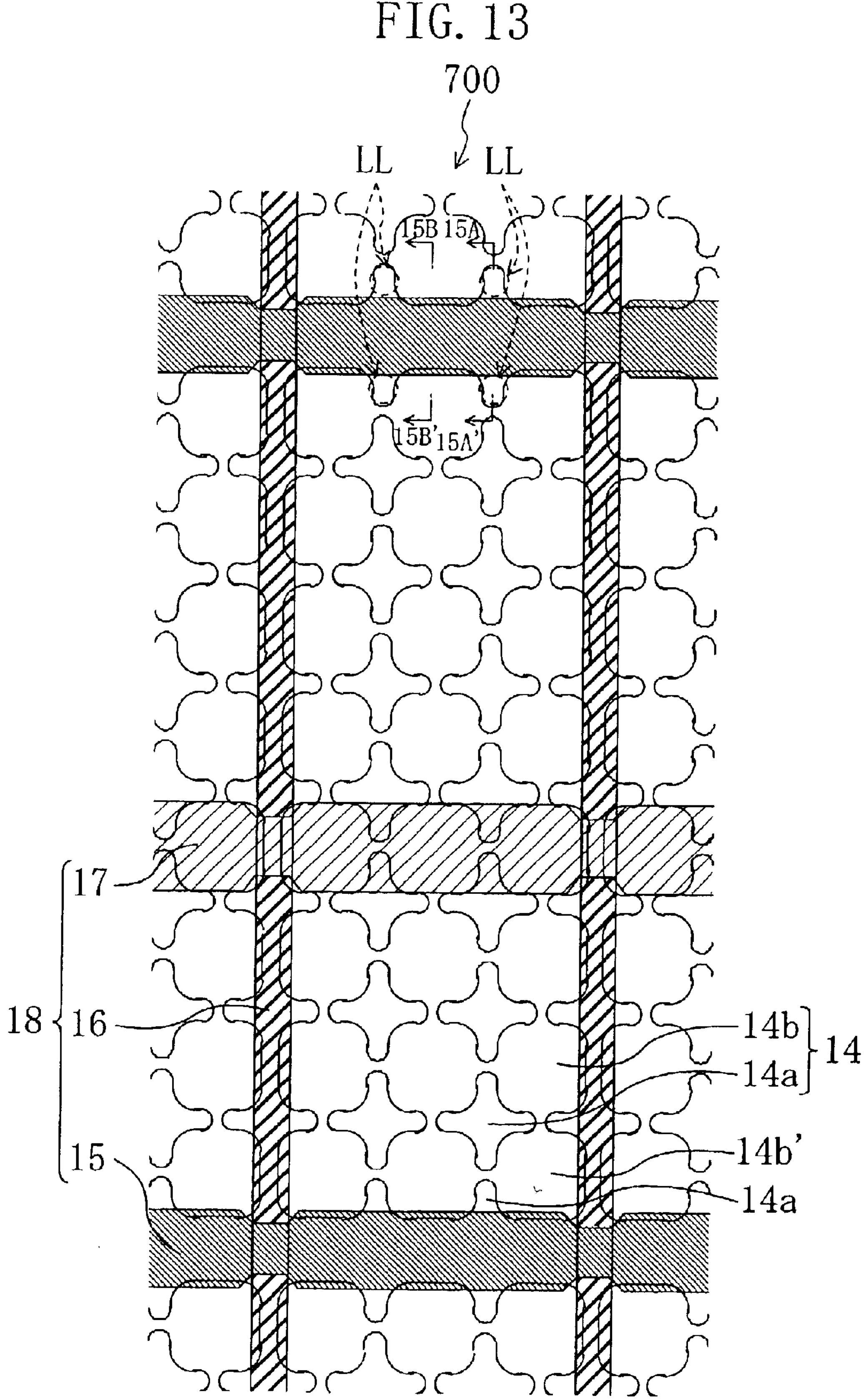

FIG. 13 is a plan view schematically illustrating a structure of one picture element region of a liquid crystal display device 700 in which an opening that is located along the bus line is not superposed on the bus line.

Figure 14A:
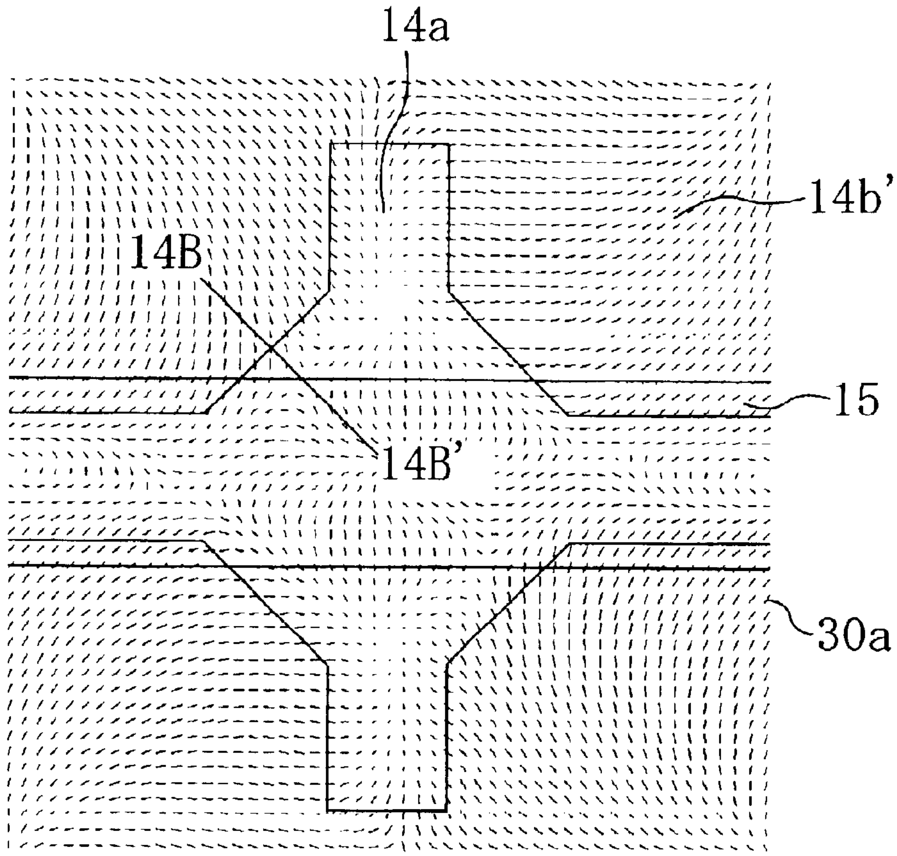
Figure 14B:
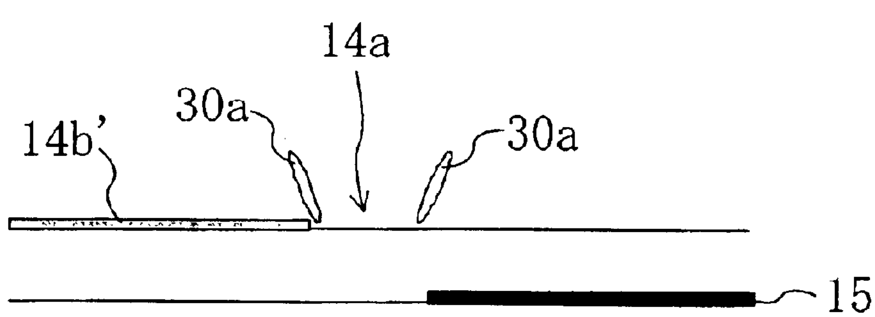

FIG. 14A and FIG. 14B schematically illustrate an orientation of liquid crystal molecules around an opening that is located along a gate bus line of the liquid crystal display device 700, wherein FIG. 14A is a plan view, and FIG. 14B is a cross-sectional view.

Figure 15A:
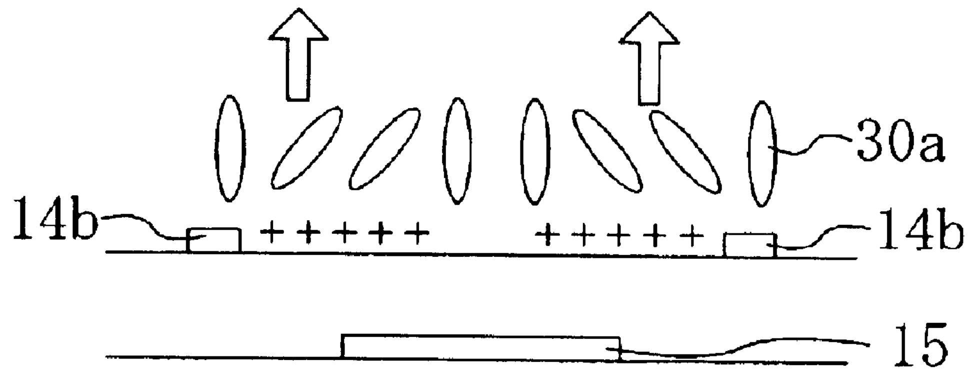
Figure 15B:
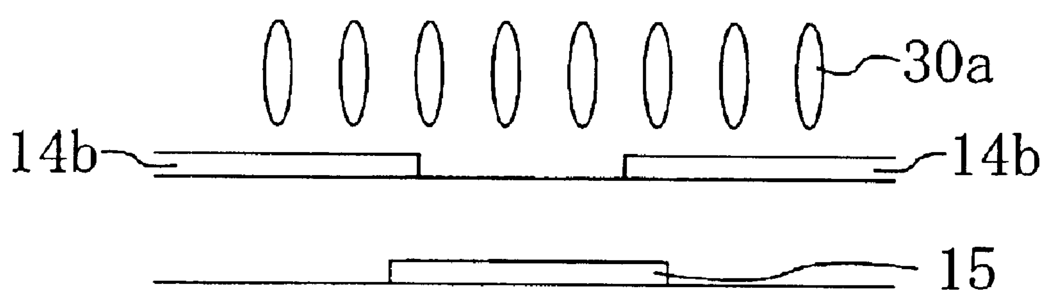

FIG. 15A is a cross-sectional view taken along line 15A–15A' of FIG. 13, and FIG. 15B is a cross-sectional view taken along line 15B–15B' of FIG. 13.

Figure 16A:
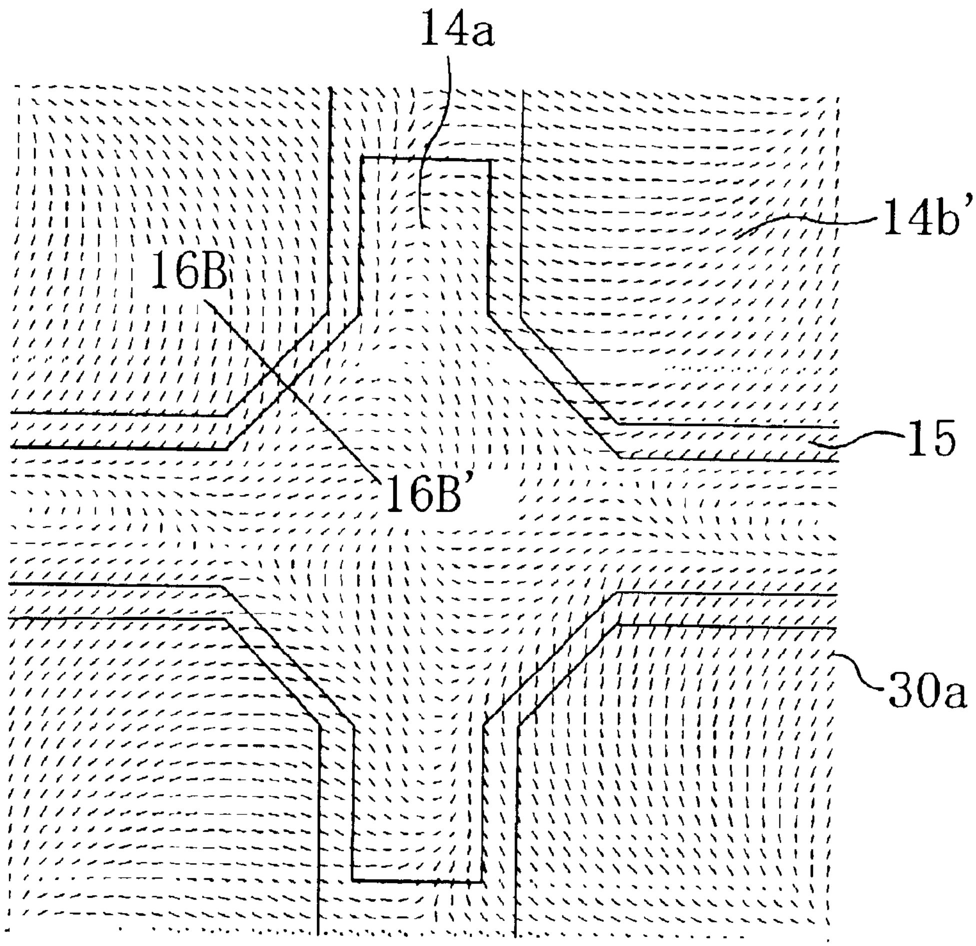
Figure 16B:
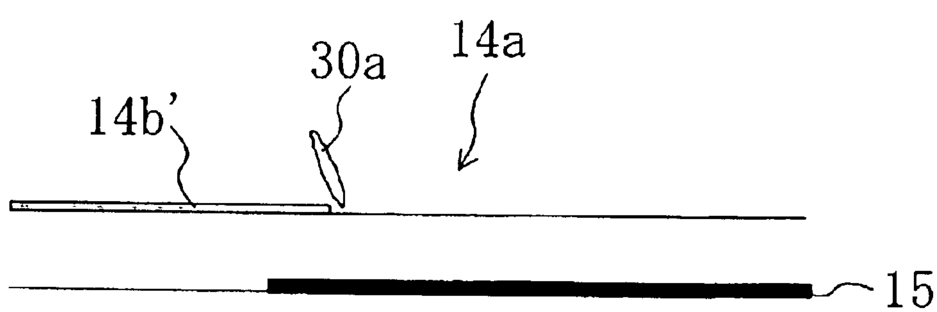

FIG. 16A and FIG. 16B schematically illustrate an orientation of liquid crystal molecules around an opening that is located along a gate bus line of the liquid crystal display device 100 according to an embodiment of the present invention, wherein FIG. 16A is a plan view, and FIG. 16B is a cross-sectional view.

Figure 17:
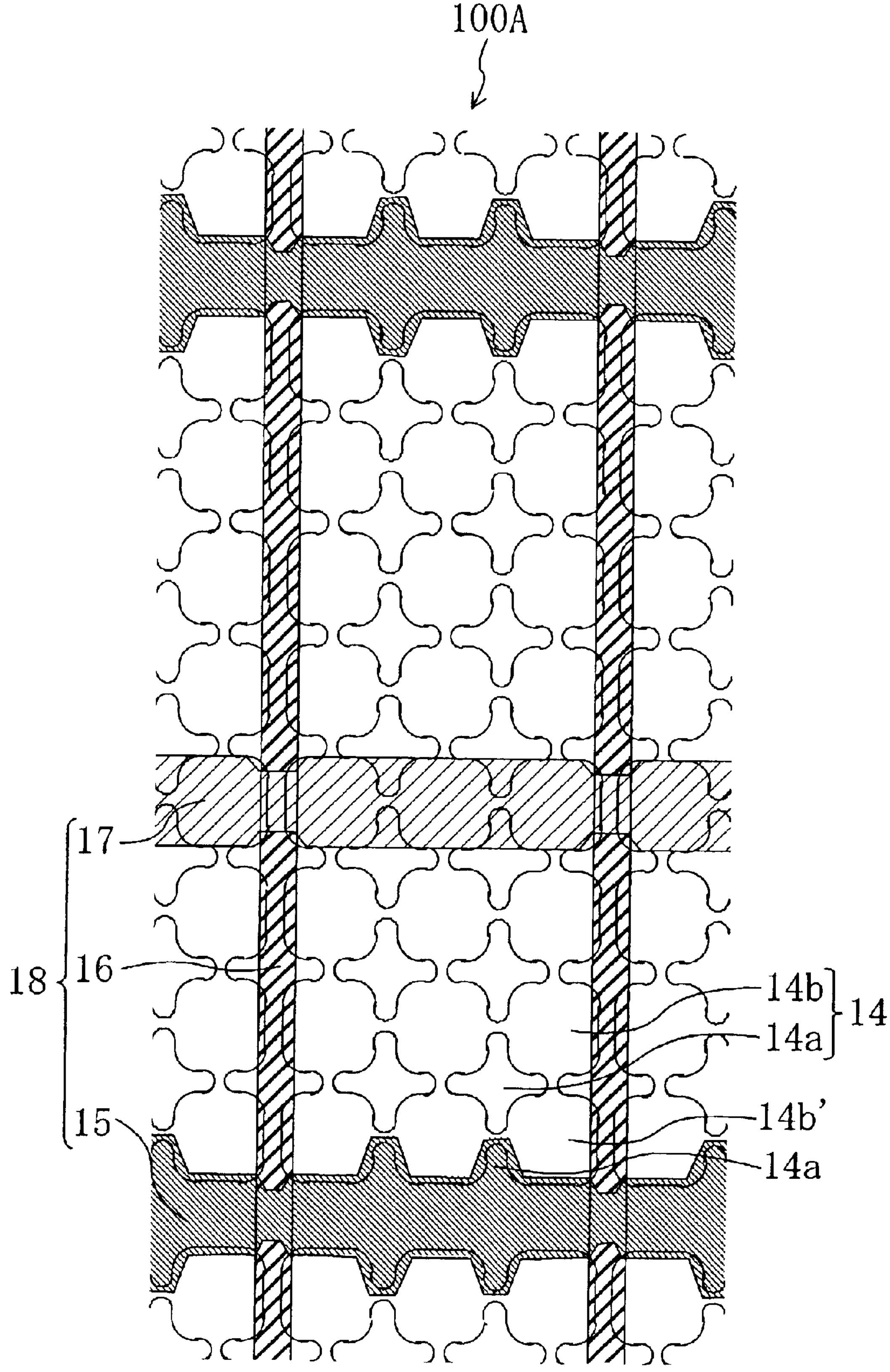

FIG. 17 is a plan view schematically illustrating a structure of one picture element region of a liquid crystal display device 100A according to an embodiment of the present invention.

Figure 18:
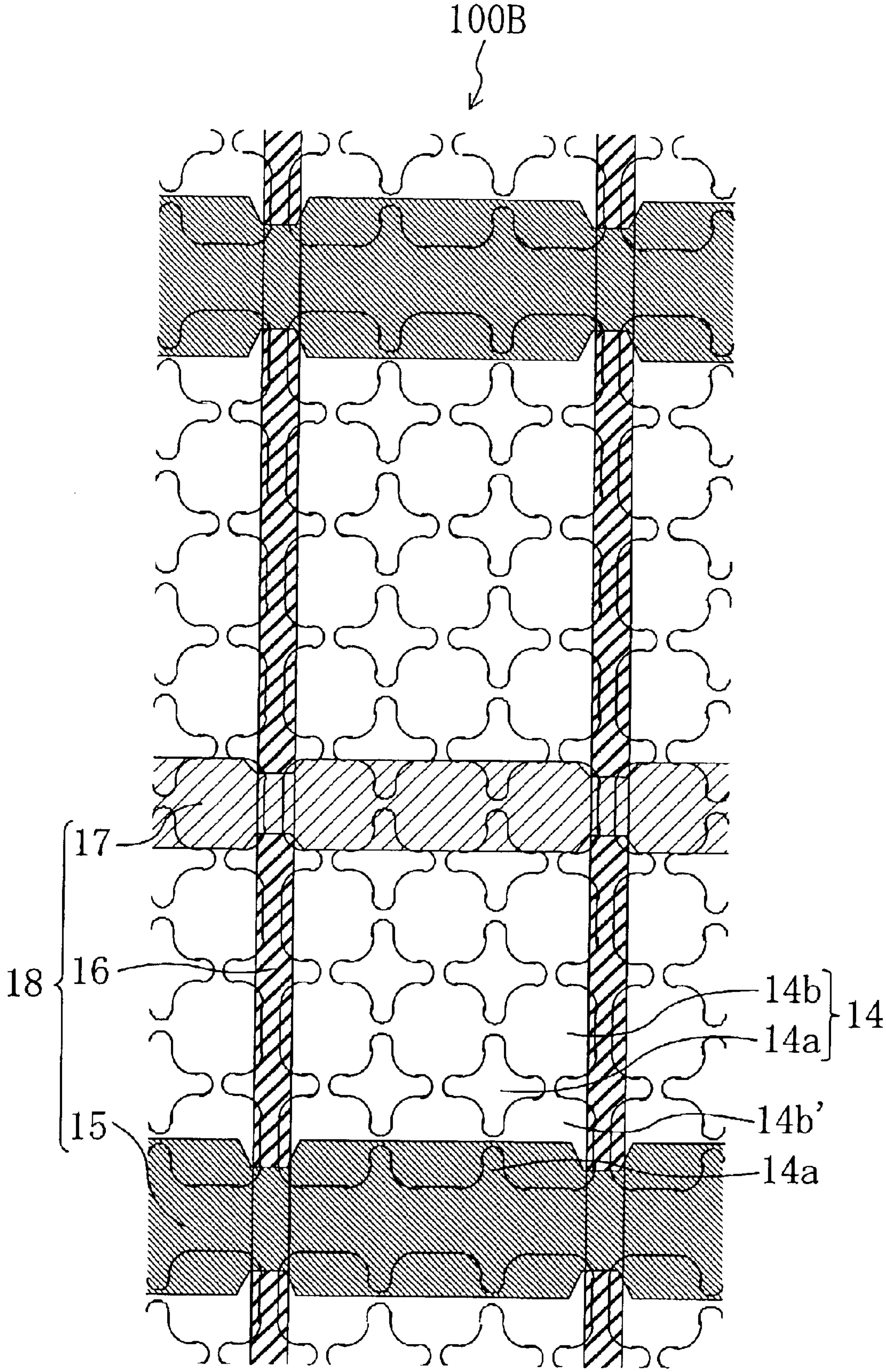

FIG. 18 is a plan view schematically illustrating a structure of one picture element region of a liquid crystal display device 100B according to an embodiment of the present invention.

Figure 19:
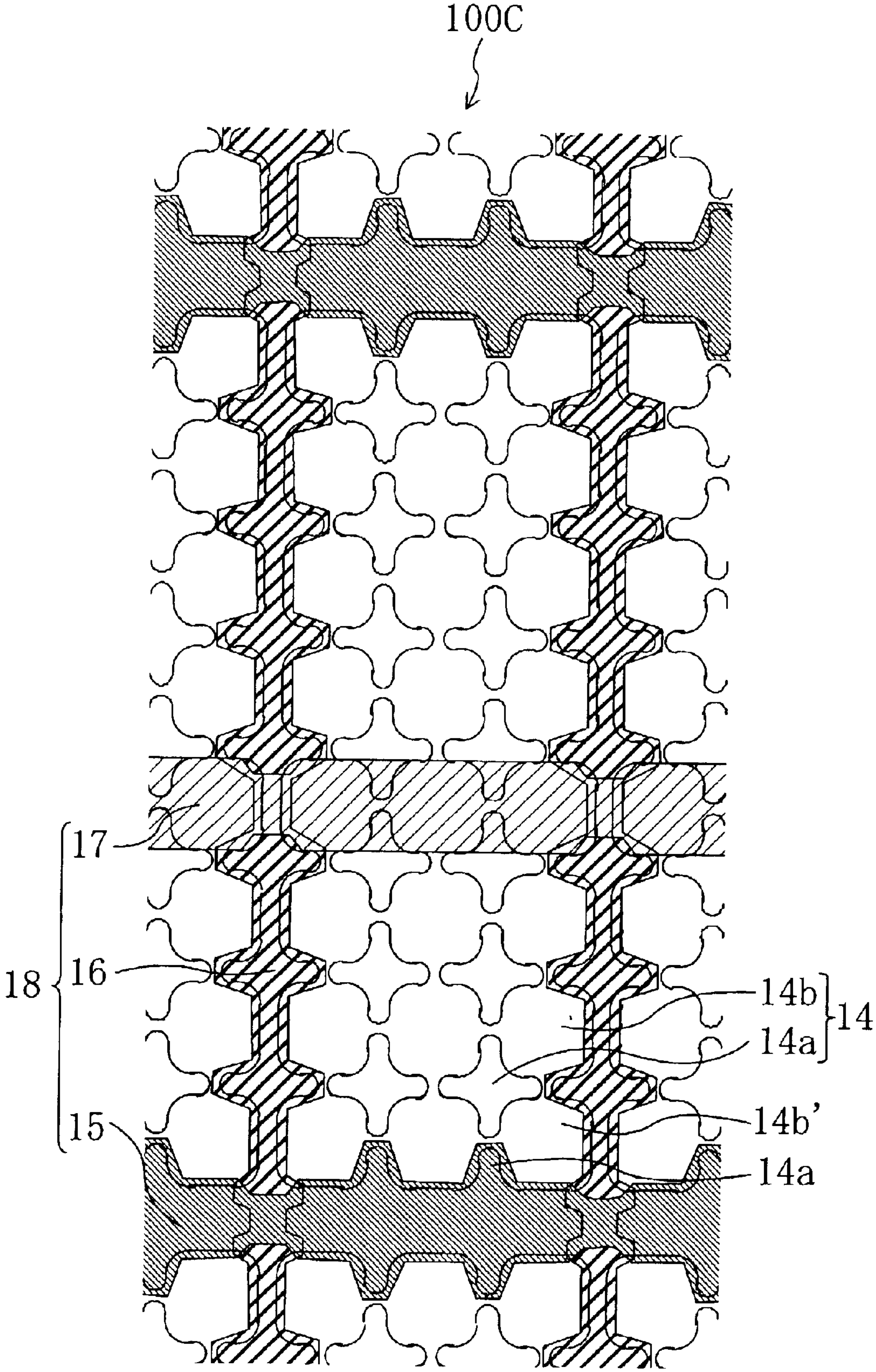

FIG. 19 is a plan view schematically illustrating a structure of one picture element region of a liquid crystal display device 100C according to an embodiment of the present invention.

Figure 20:
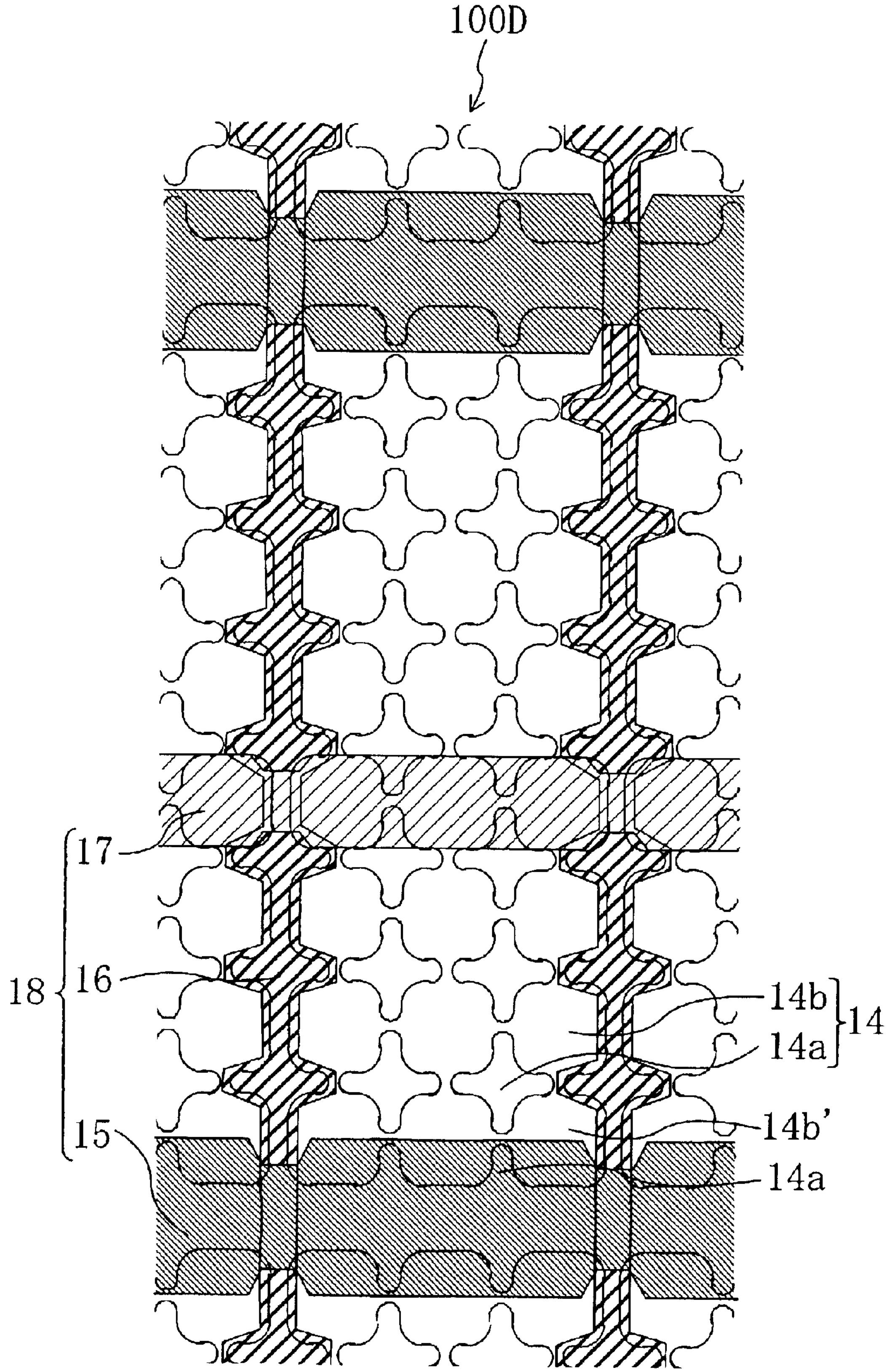

FIG. 20 is a plan view schematically illustrating a structure of one picture element region of a liquid crystal display device 100D according to an embodiment of the present invention.

Figure 21B:
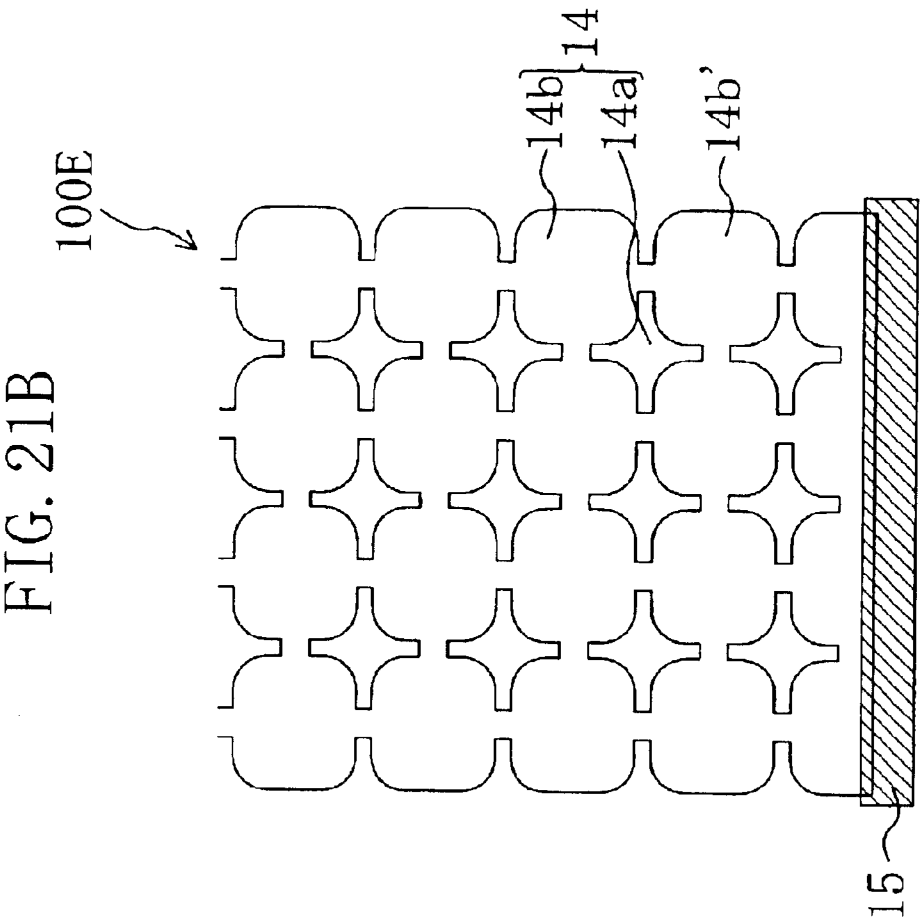
Figure 21A:
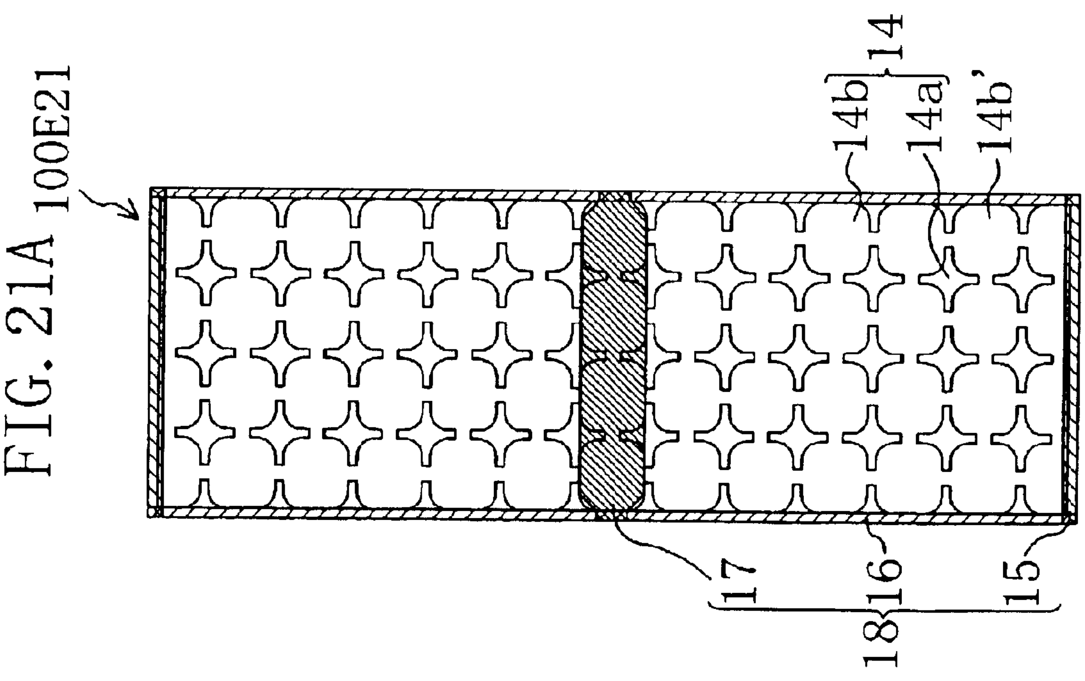

FIG. 21A is a plan view schematically illustrating a structure of one picture element region of a liquid crystal display device 100E according to an embodiment of the present invention, and FIG. 21B is an enlarged view illustrating a portion around the gate bus line in FIG. 21A.

Figure 22B:
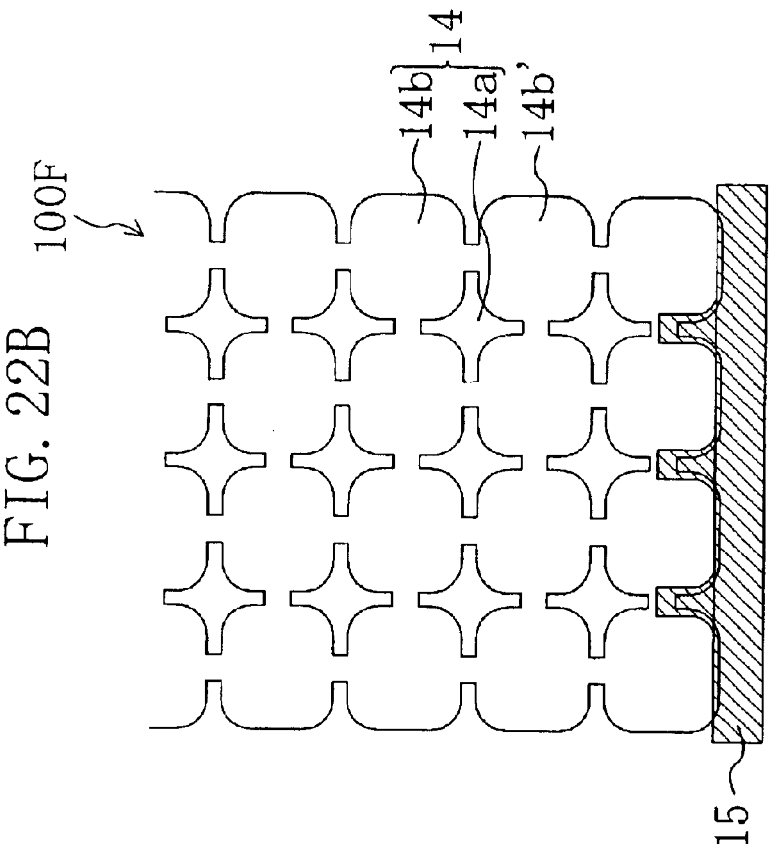
Figure 22A:
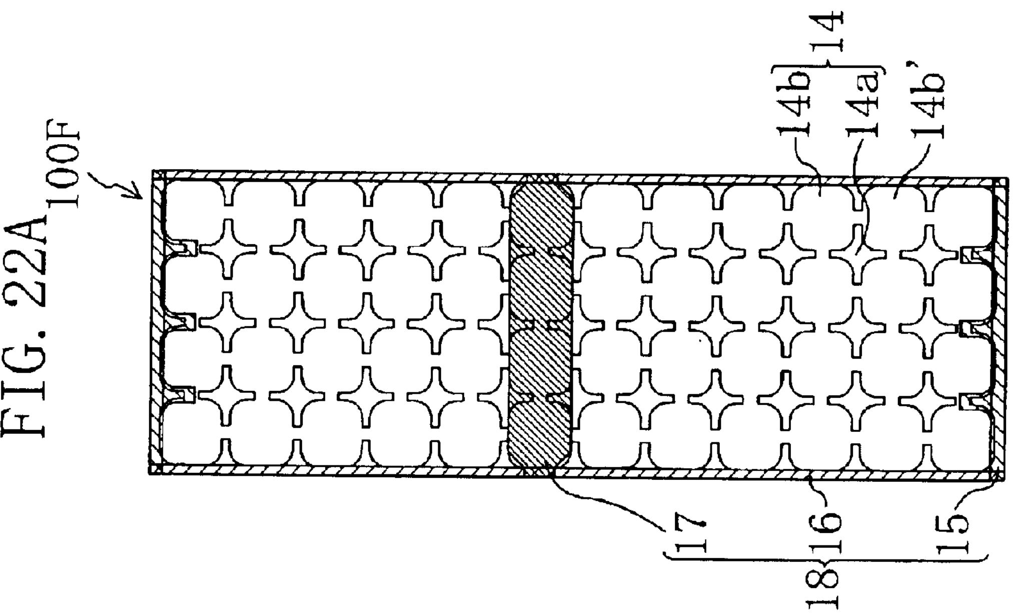

FIG. 22A is a plan view schematically illustrating a structure of one picture element region of a liquid crystal display device 100F according to an embodiment of the present invention, and FIG. 22B is an enlarged view illustrating a portion around the gate bus line in FIG. 22A.

Figure 23:
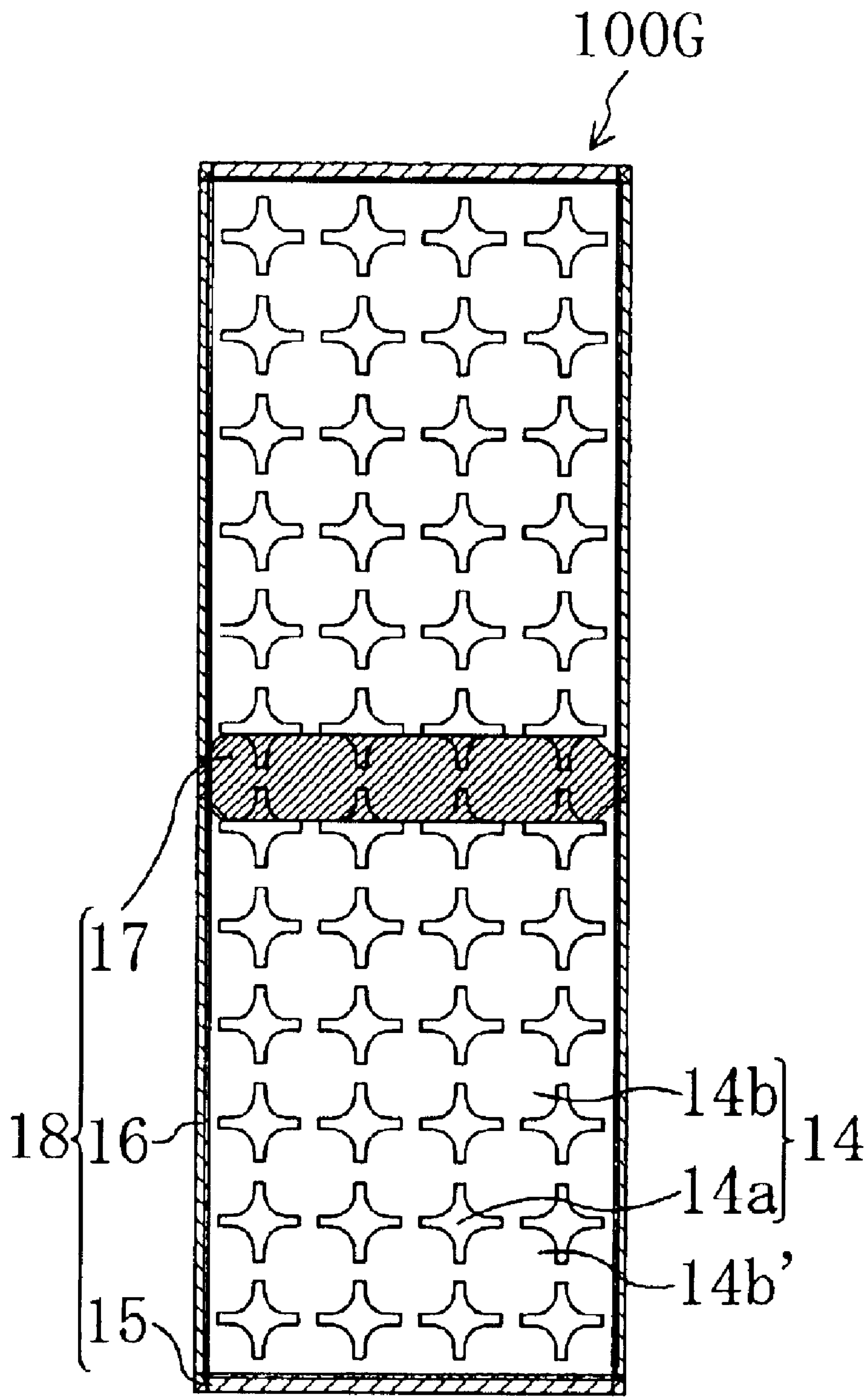

FIG. 23 is a plan view schematically illustrating a structure of one picture element region of a liquid crystal display device 100G according to an embodiment of the present invention.

Figure 24A:
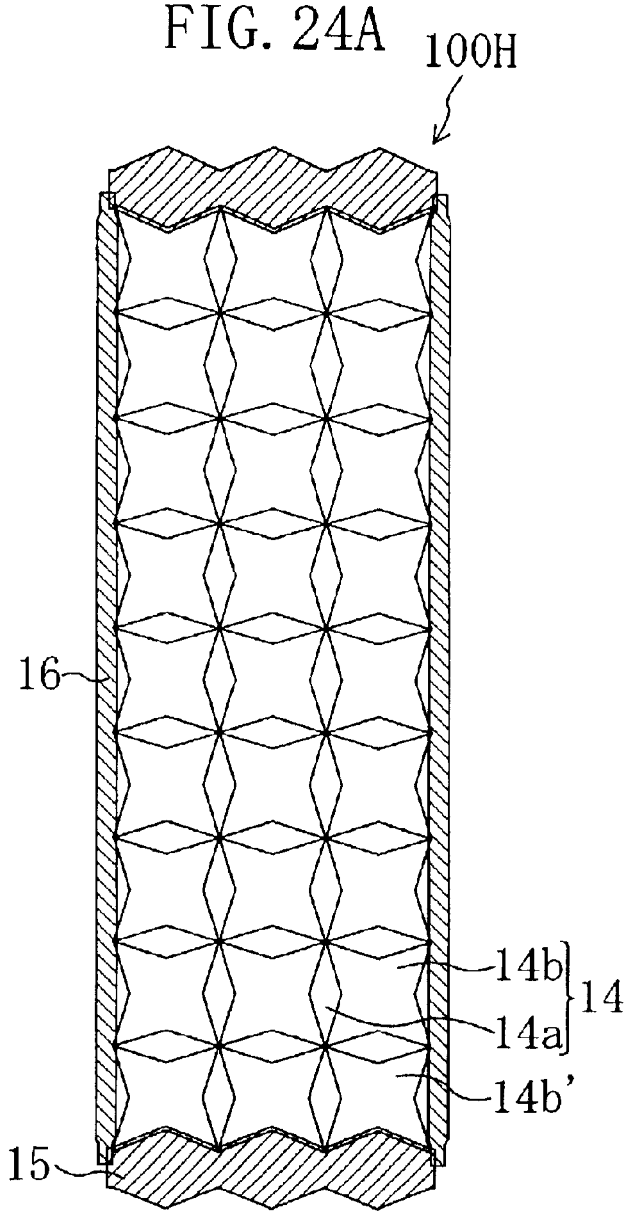
Figure 24B:
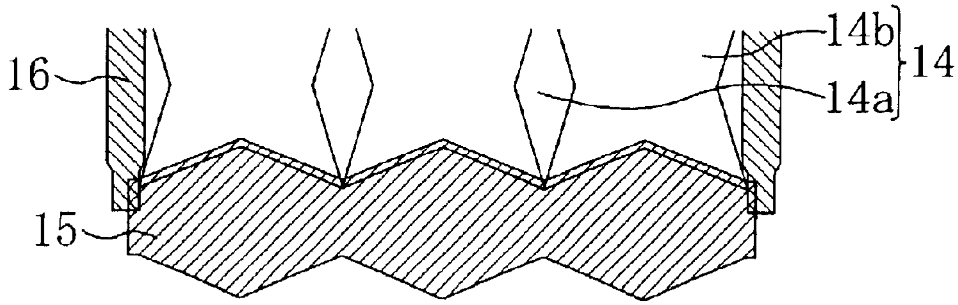

FIG. 24A is a plan view schematically illustrating a structure of one picture element region of a liquid crystal display device 100H according to an embodiment of the present invention, and FIG. 24B is an enlarged view illustrating a portion around the gate bus line in FIG. 24A.

Figure 25A:
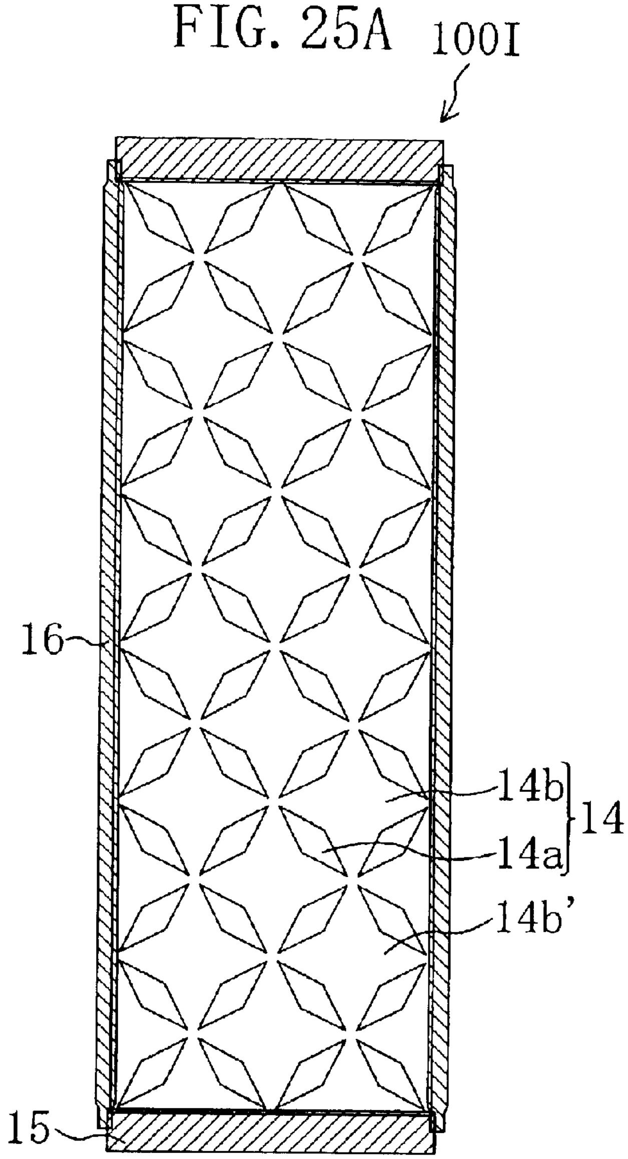
Figure 25B:
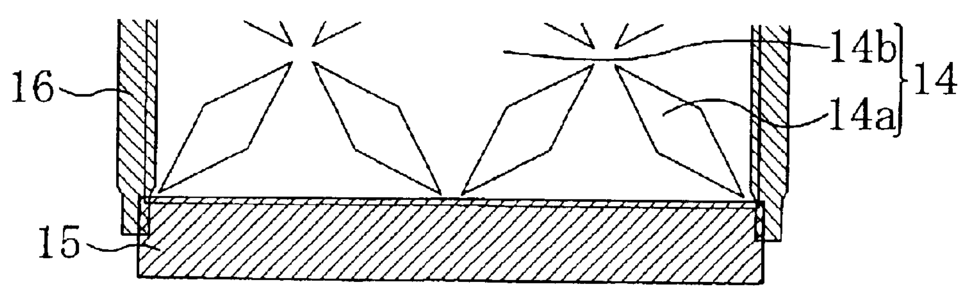

FIG. 25A is a plan view schematically illustrating a structure of one picture element region of a liquid crystal display device 100I according to an embodiment of the present invention, and FIG. 25B is an enlarged view illustrating a portion around the gate bus line in FIG. 25A.

Figure 26A:
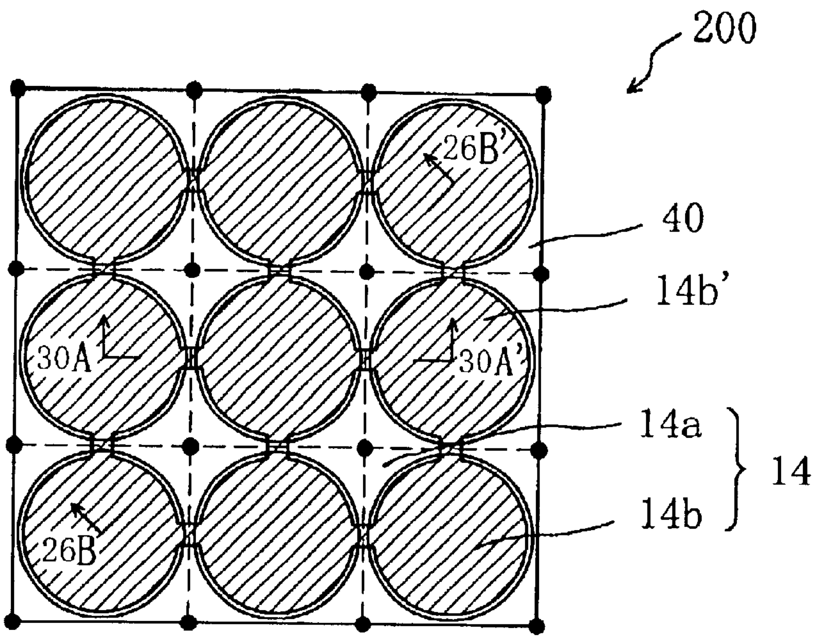
Figure 26B:
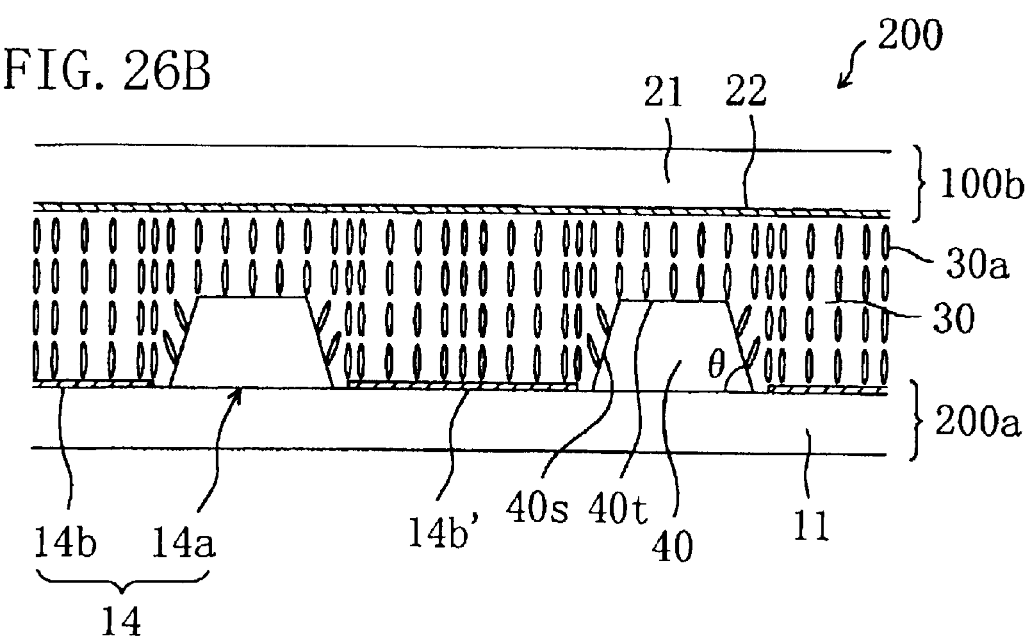

FIG. 26A and FIG. 26B schematically illustrate a structure of one picture element region of a liquid crystal display device 200 according to an alternative embodiment of the present invention, wherein FIG. 26A is a plan view, and FIG. 26B is a cross-sectional view taken along line 26B–26B' of FIG. 26A.

FIG. 27A to FIG. 27D schematically illustrate the relationship between an orientation of liquid crystal molecules 30*a* and a surface configuration having a vertical alignment power.

Figure 28A:
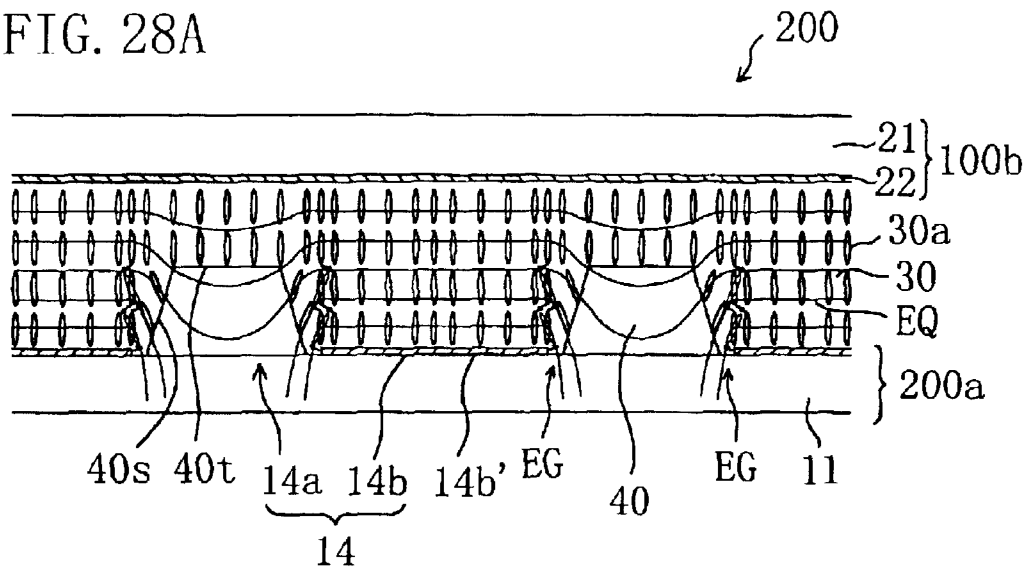
Figure 28B:
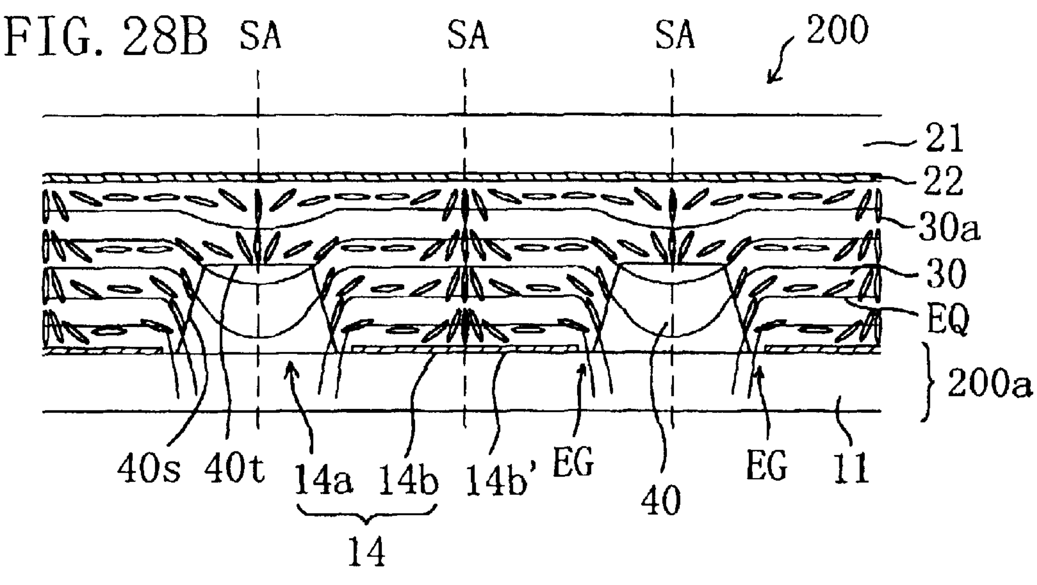

FIG. 28A and FIG. 28B illustrate a liquid crystal layer 30 of the liquid crystal display device 200 in the presence of an applied voltage thereacross, wherein FIG. 28A schematically illustrates a state where an orientation has just started to change (initial ON state), and FIG. 28B schematically illustrates a steady state.

Figure 29A:
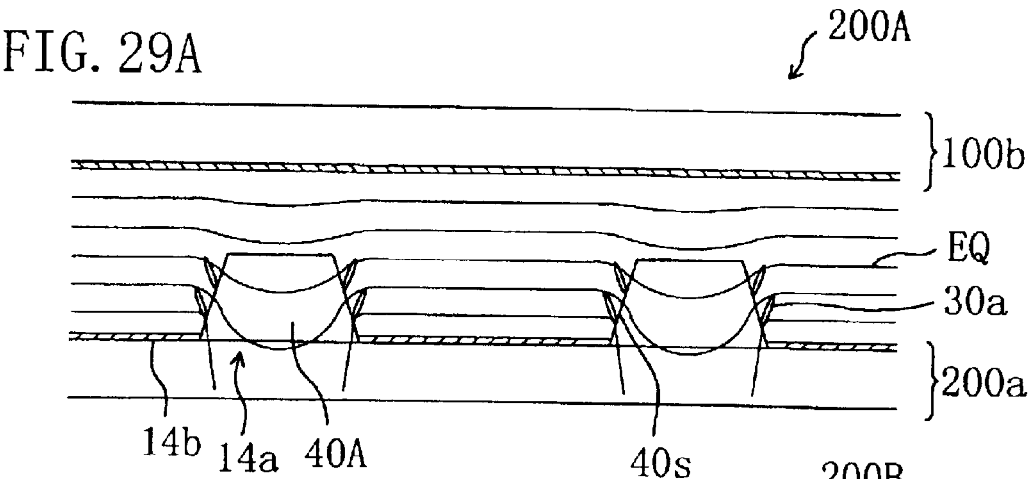
Figure 29B:
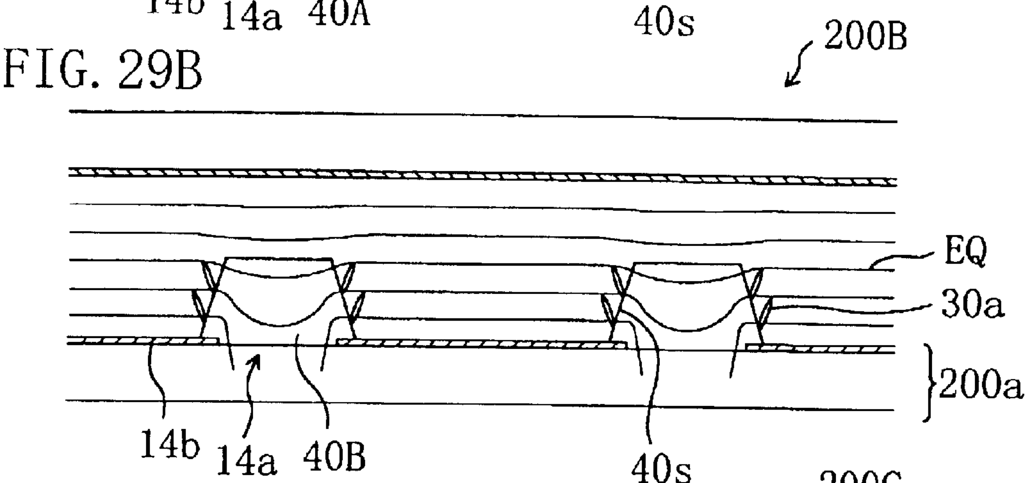
Figure 29C:
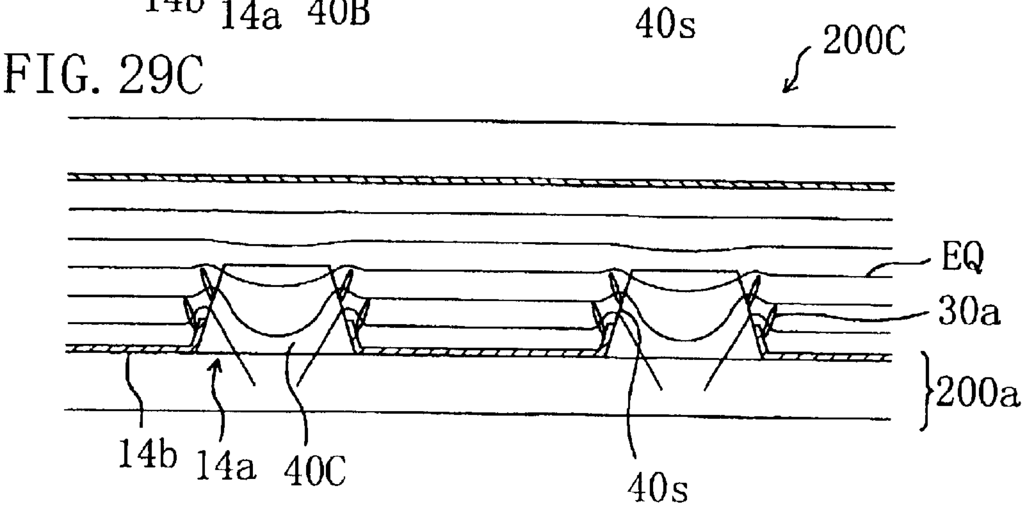

FIG. 29A to FIG. 29C are cross-sectional views schematically illustrating liquid crystal display devices 200A, 200B and 200C, respectively, of an alternative embodiment, having different positional relationships between an opening and a protrusion.

Figure 30:
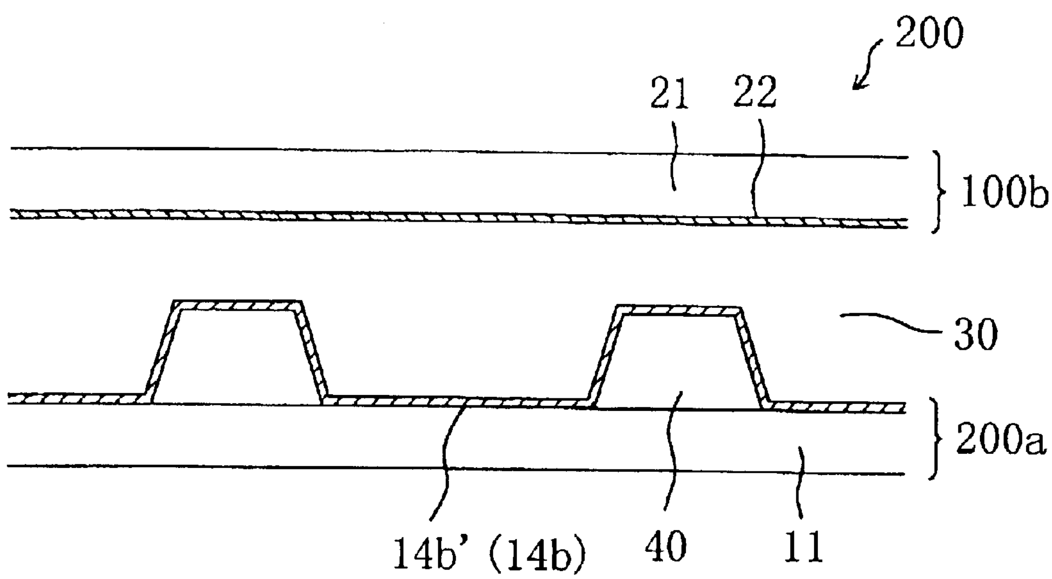

FIG. 30 is a cross-sectional view schematically illustrating the liquid crystal display device 200 taken along line 30A–30A' of FIG. 26A.

Figure 31A:
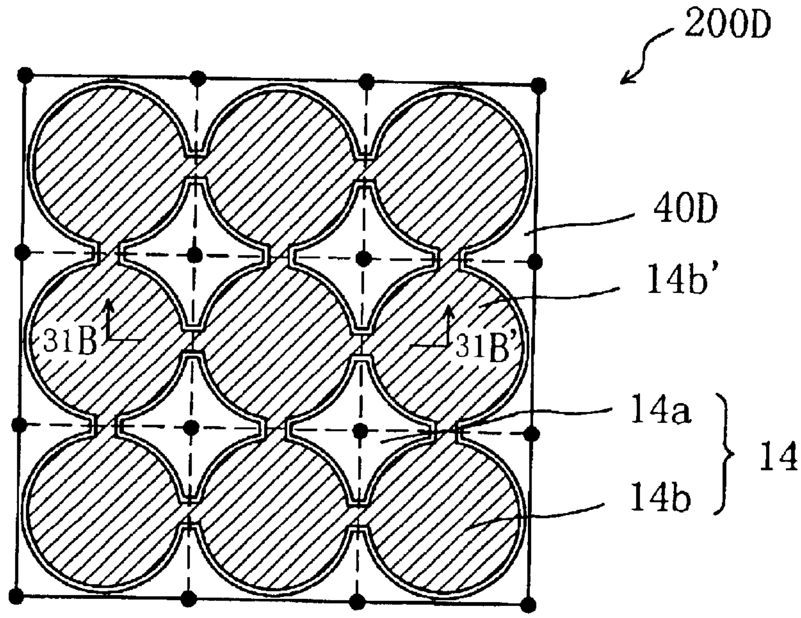
Figure 31B:
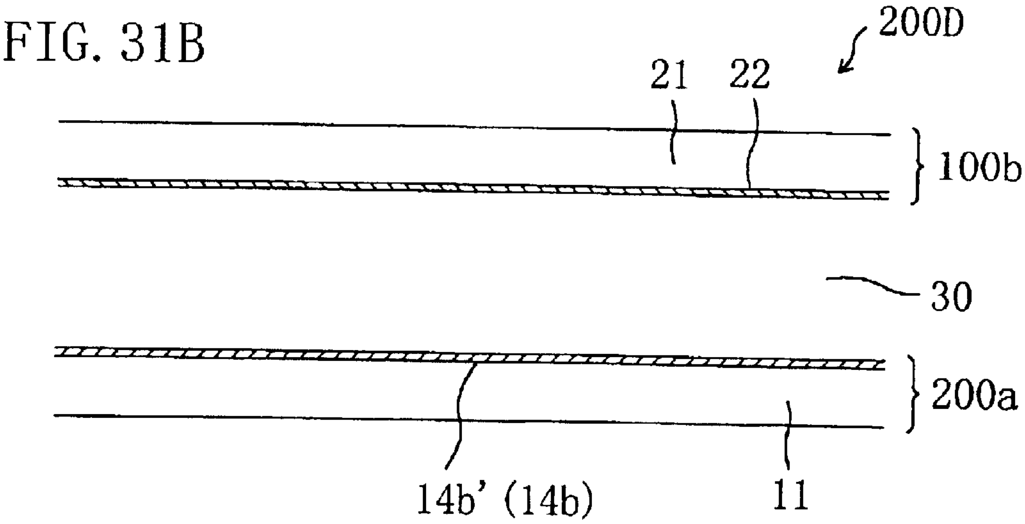

FIG. 31A and FIG. 31B schematically illustrate a structure of one picture element region of a liquid crystal display device 200D according to an alternative embodiment of the present invention, wherein FIG. 31A is a plan view, and FIG. 31B is a cross-sectional view taken along line 31B–31B' of FIG. 31A.

Figure 32A:
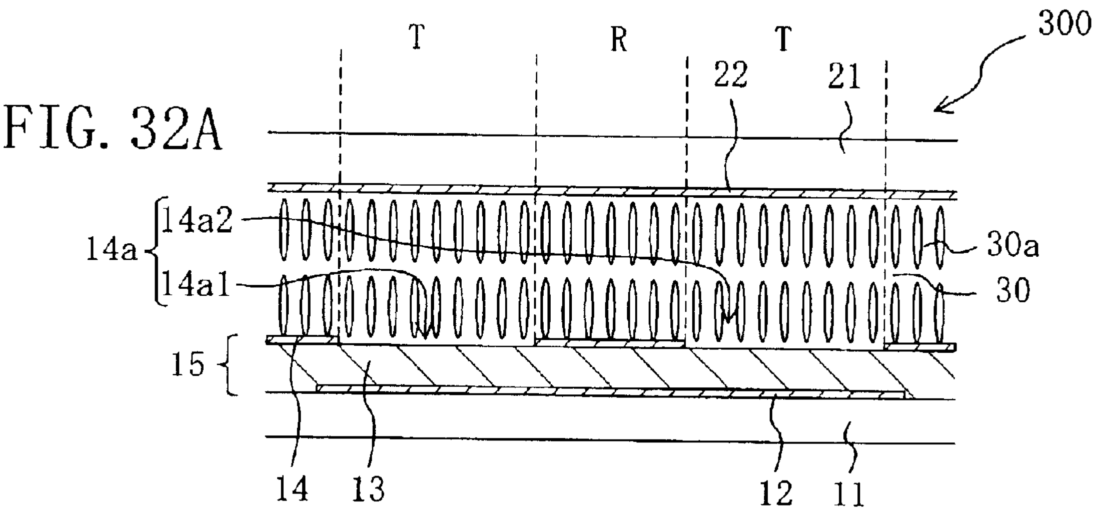
Figure 32B:
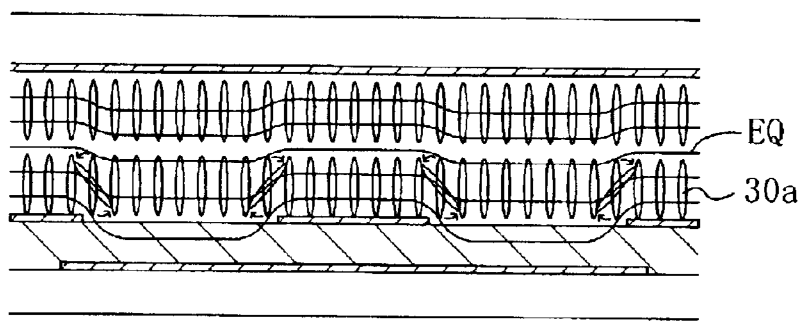
Figure 32C:
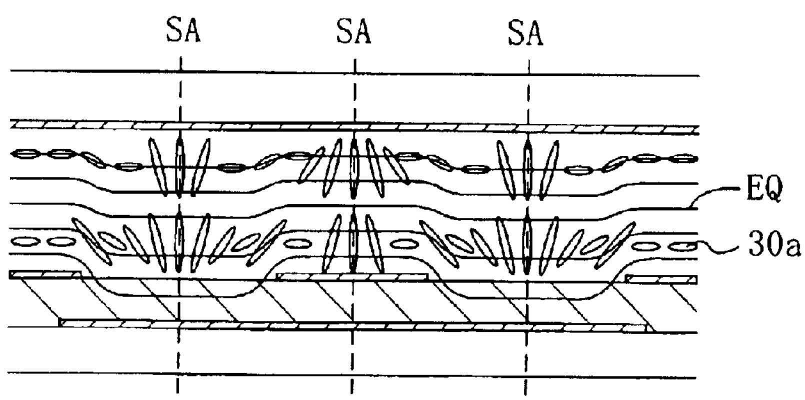

FIG. 32A to FIG. 32C are cross-sectional views schematically illustrating one picture element region of a liquid crystal display device 300 having a two-layer electrode, wherein FIG. 32A illustrates a state in the absence of an applied voltage, FIG. 32B illustrates a state where an orientation has just started to change (initial ON state), and FIG. 32C illustrates a steady state.

Figure 33A:
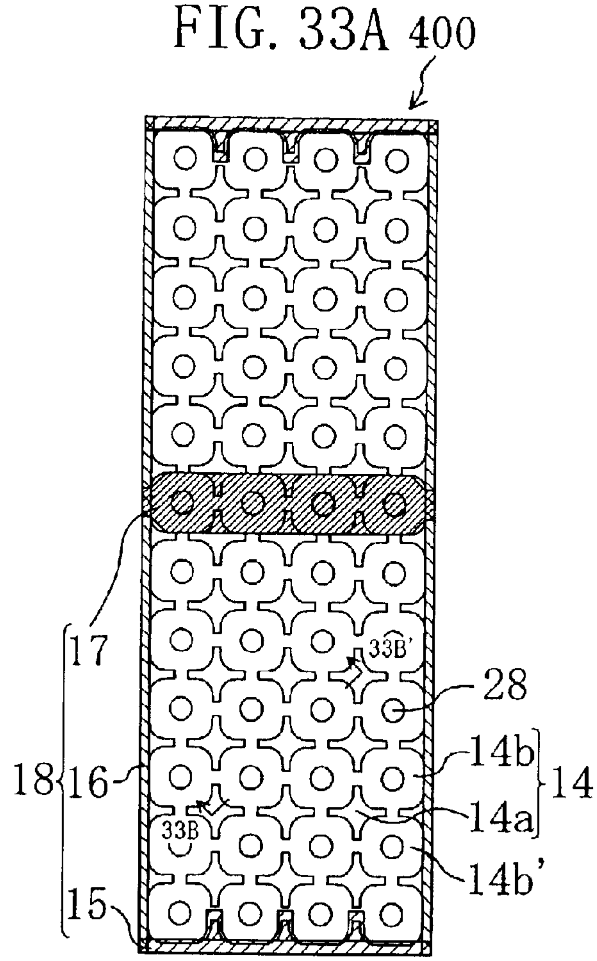
Figure 33B:
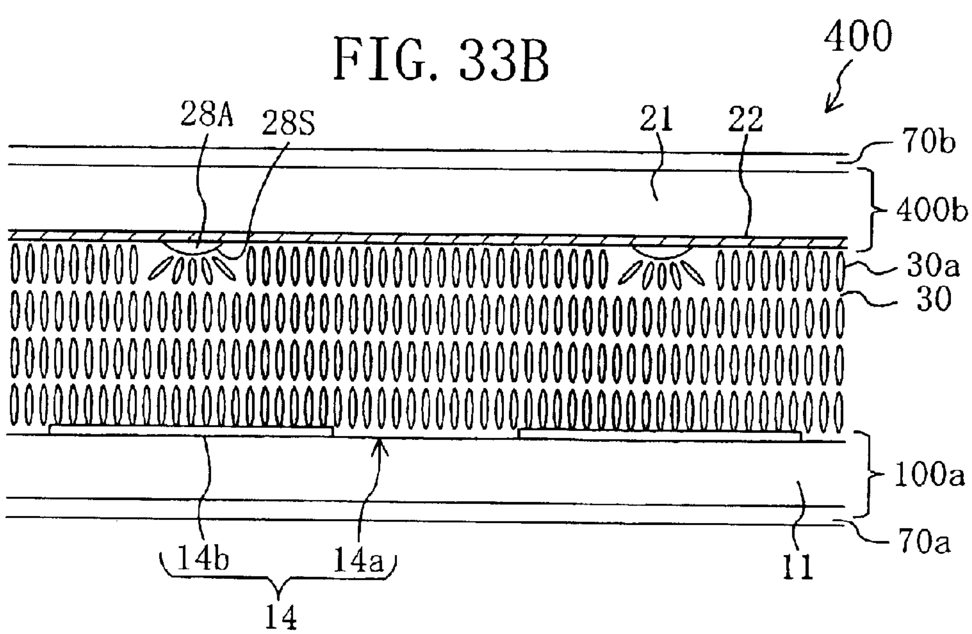

FIG. 33A and FIG. 33B are cross-sectional views schematically illustrating one picture element region of a liquid crystal display device 400 having a protrusion on a counter substrate, wherein FIG. 33A is a plan view, and FIG. 33B is a cross-sectional view taken along line 33B–33B' of FIG. 33A.

Figure 34A:
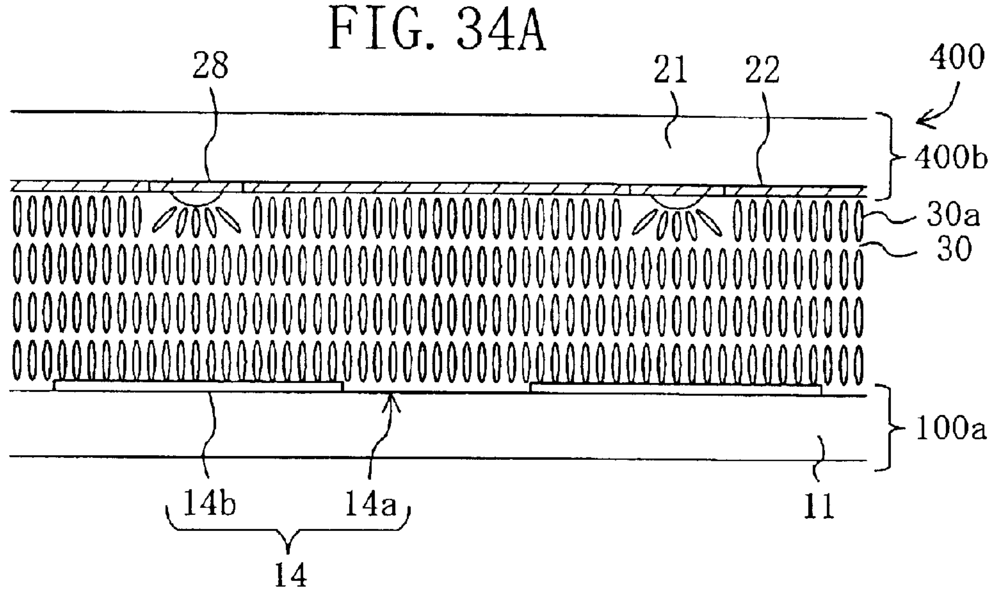
Figure 34B:
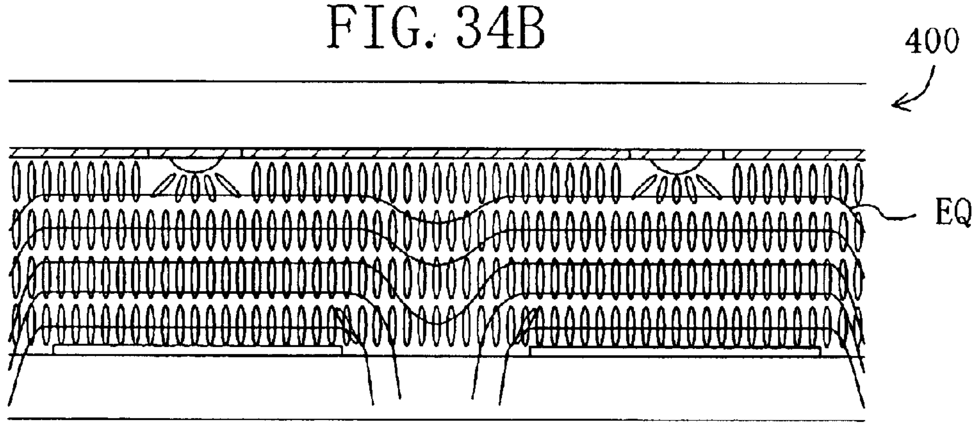
Figure 34C:
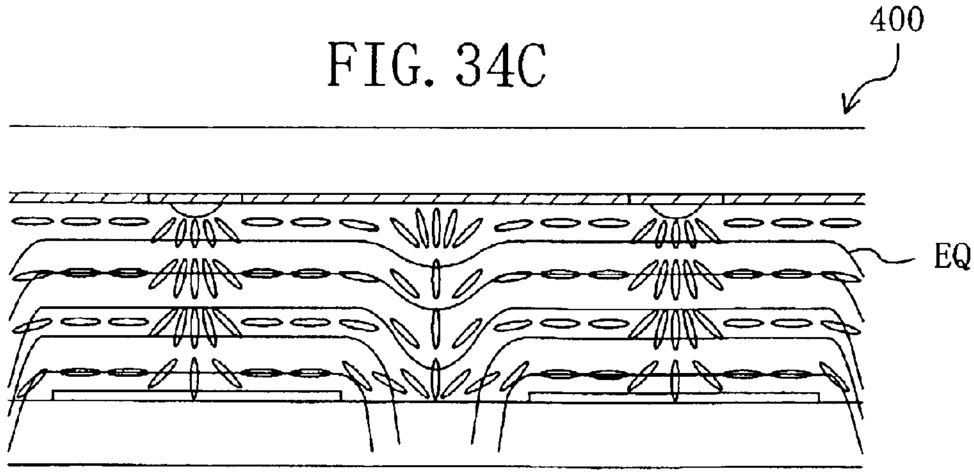

FIG. 34A to FIG. 34C are cross-sectional views schematically illustrating one picture element region of the liquid crystal display device 400, wherein FIG. 34A illustrates a state in the absence of an applied voltage, FIG. 34B illustrates a state where an orientation has just started to change (initial ON state), and FIG. 34C illustrates a steady state.

Figure 35:
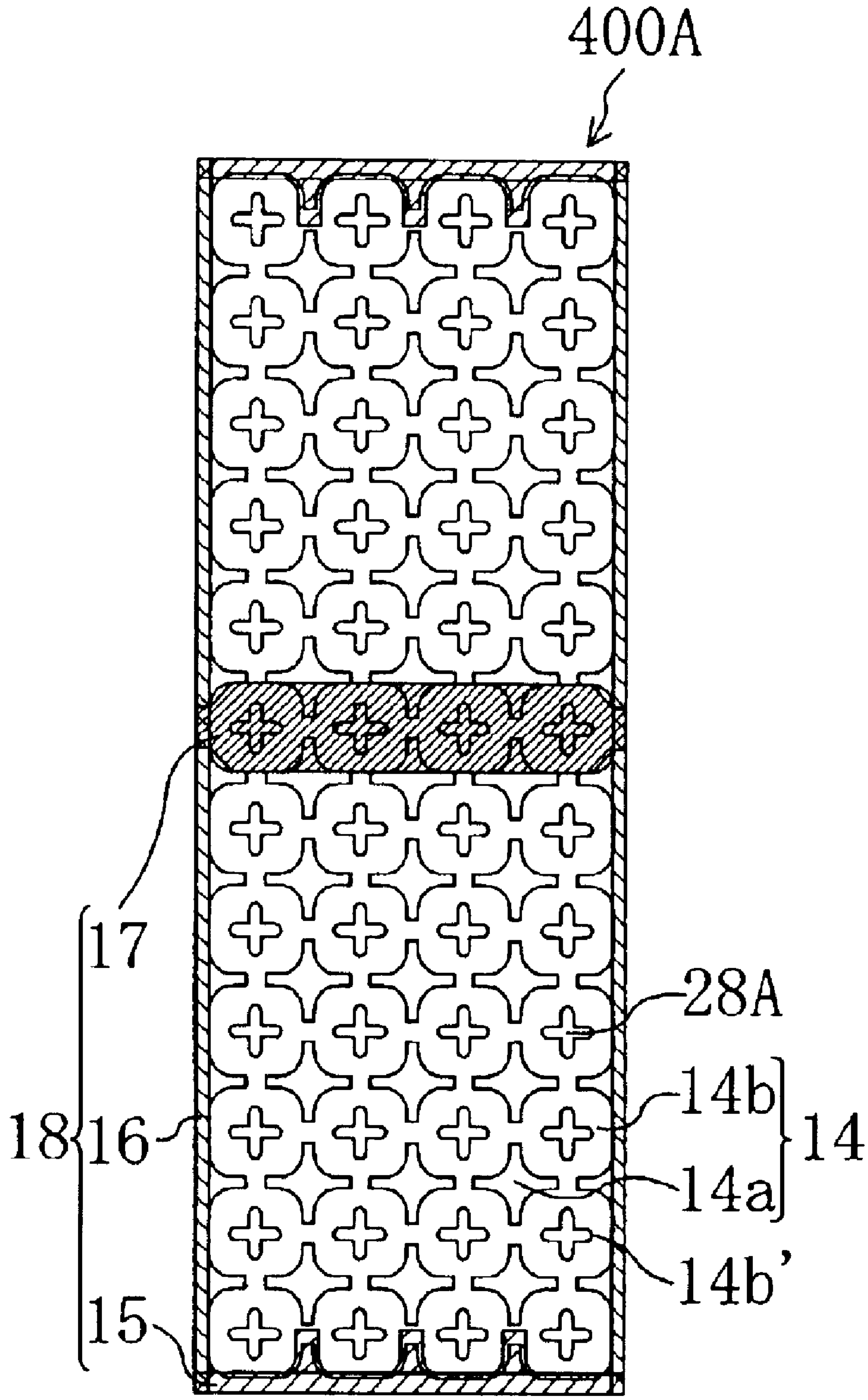

FIG. 35 is a plan view schematically illustrating a structure of one picture element region of another liquid crystal display device 400A having a protrusion on a counter substrate.

Figure 36:
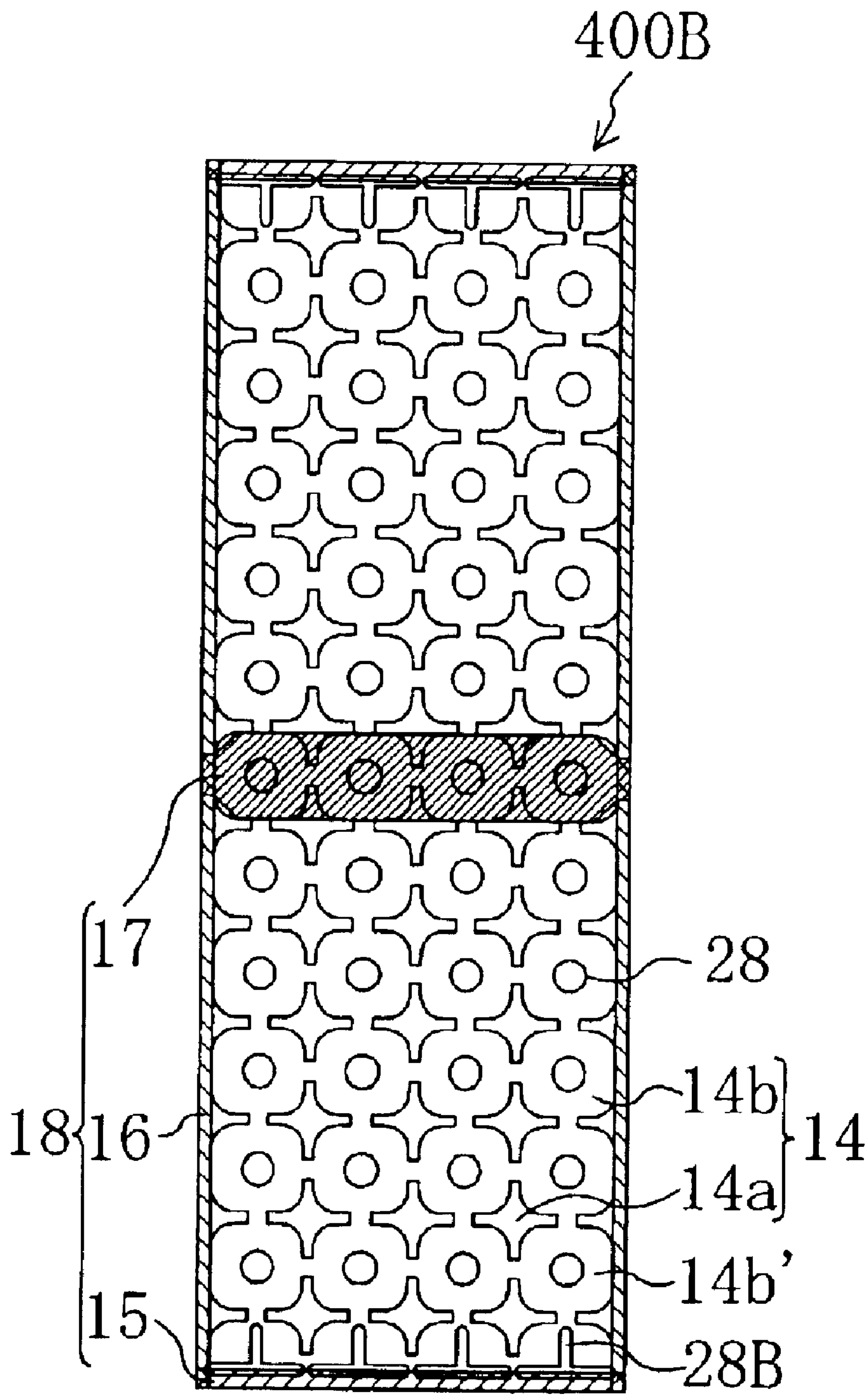

FIG. 36 is a plan view schematically illustrating a structure of one picture element region of another liquid crystal display device 400B having a protrusion on a counter substrate.

Figure 37:
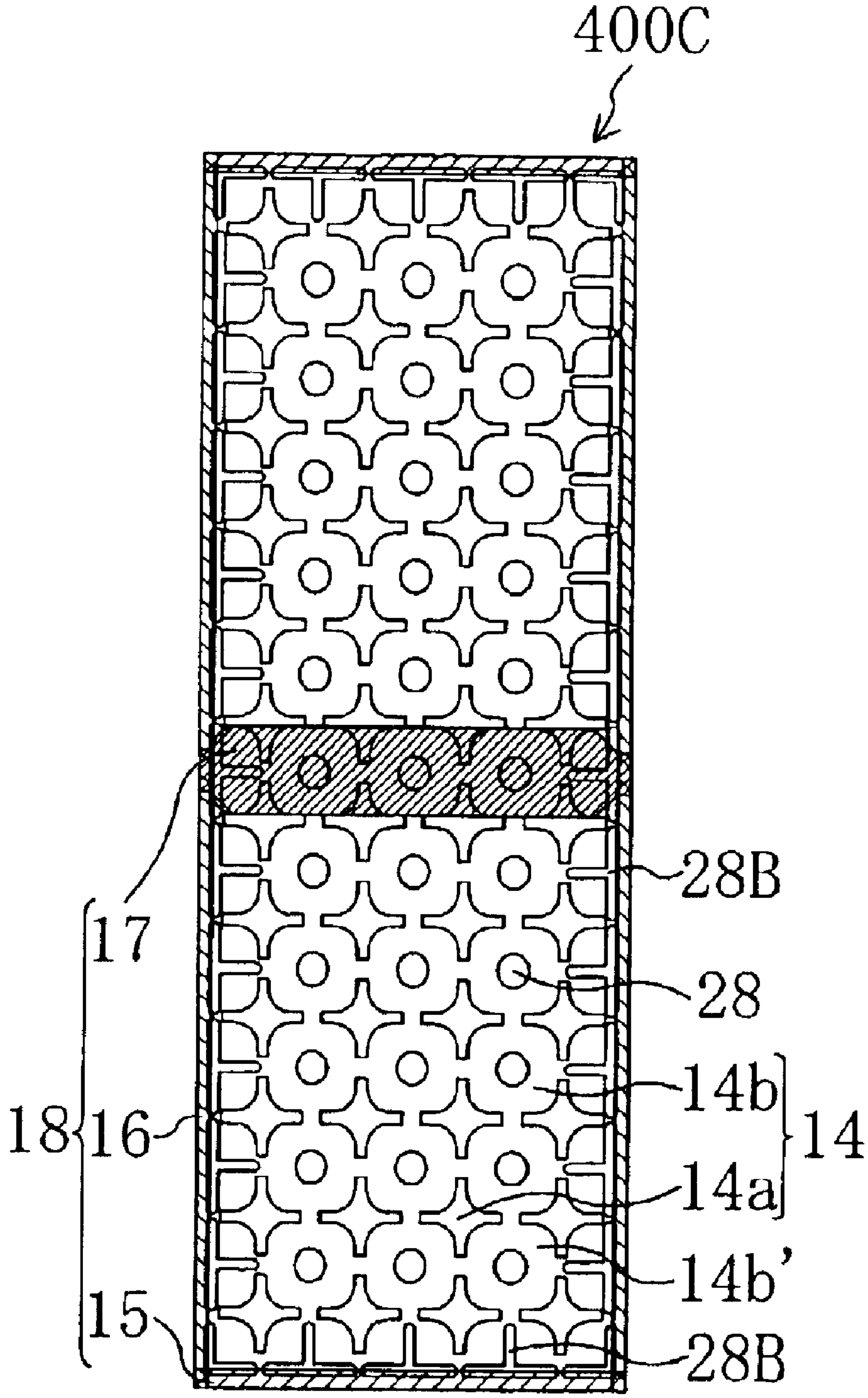

FIG. 37 is a plan view schematically illustrating a structure of one picture element region of another liquid crystal display device 400C having a protrusion on a counter substrate.

Figure 38A:
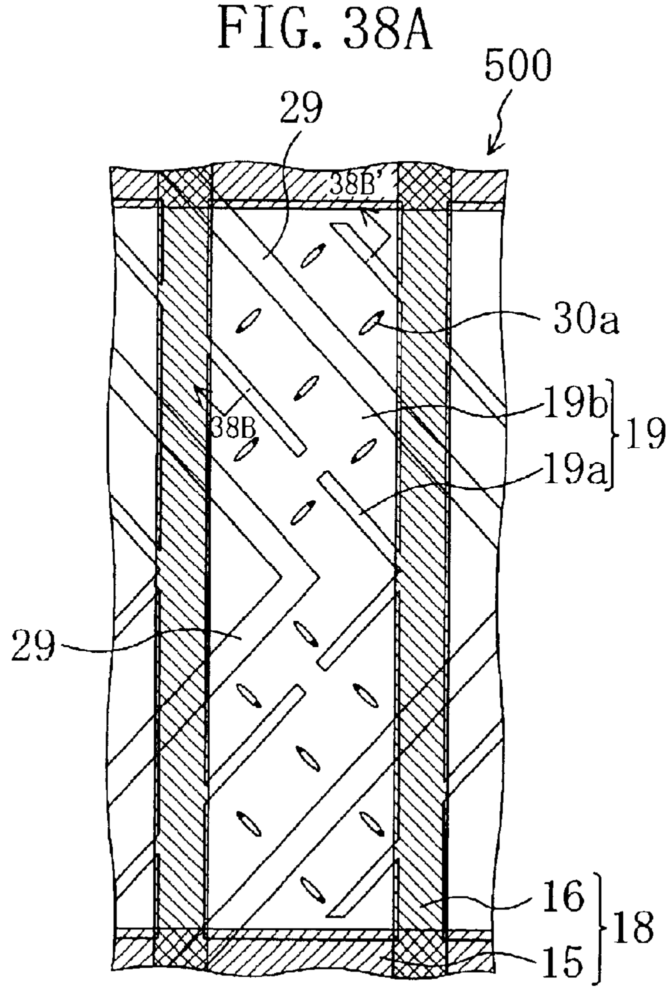
Figure 38B:
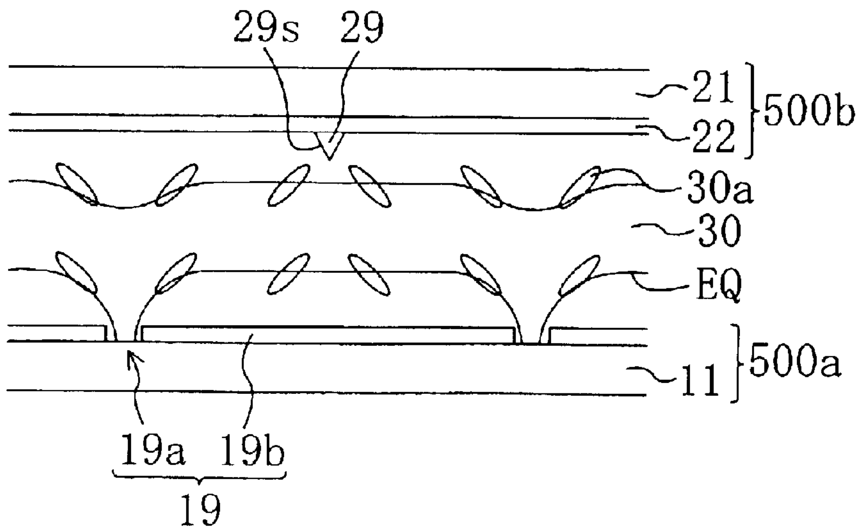

FIG. 38A and FIG. 38B schematically illustrate a structure of one picture element region of a liquid crystal display device 500 according to another alternative embodiment of the present invention, wherein FIG. 38A is a plan view, and FIG. 38B is a cross-sectional view taken along line 38B–38B' of FIG. 38A.

Figure 39:
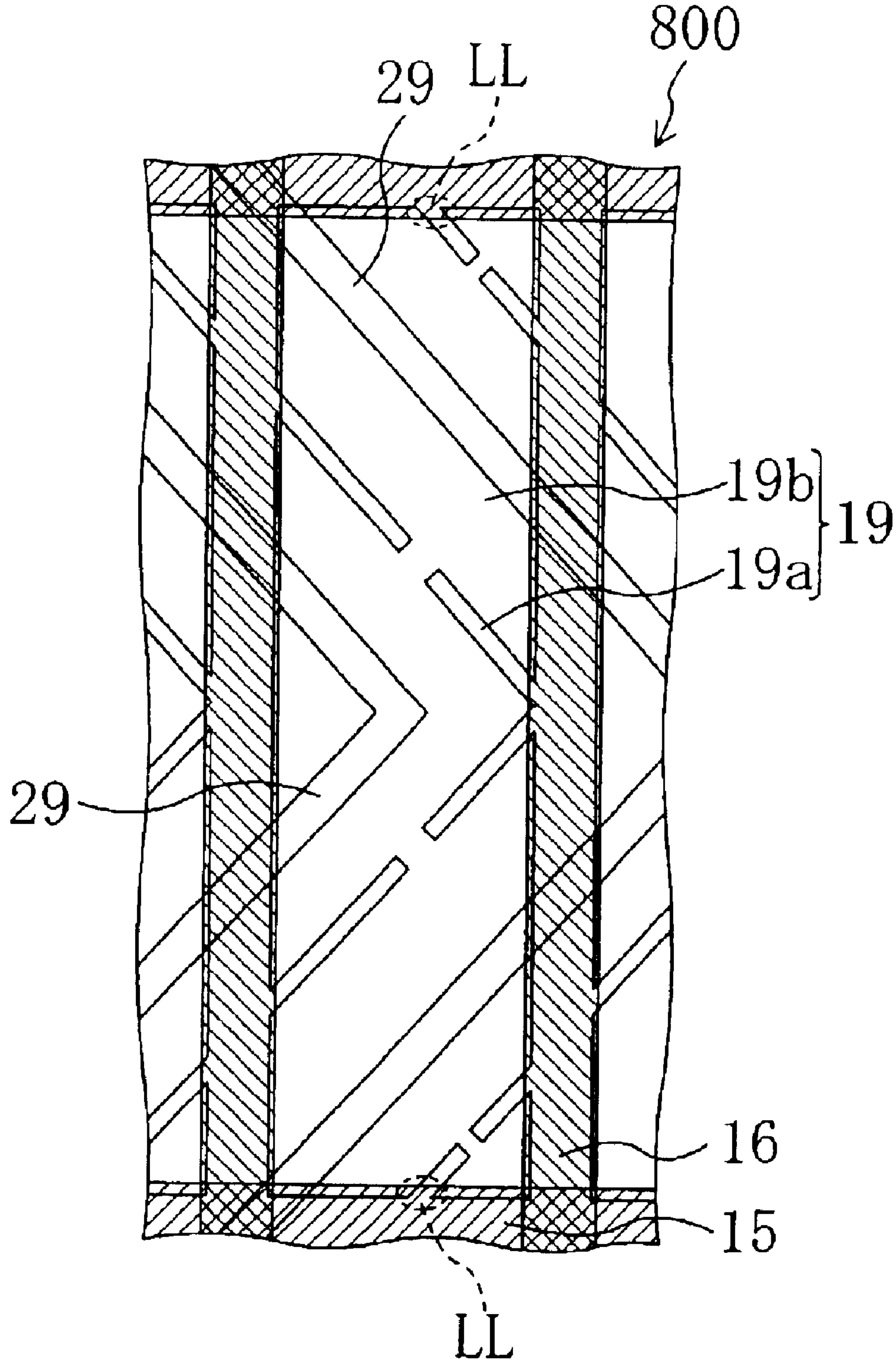

FIG. 39 is a plan view schematically illustrating a liquid crystal display device 800, in which a portion of an edge of a gate bus line is not covered by a solid portion of a picture element region.

Figure 40:
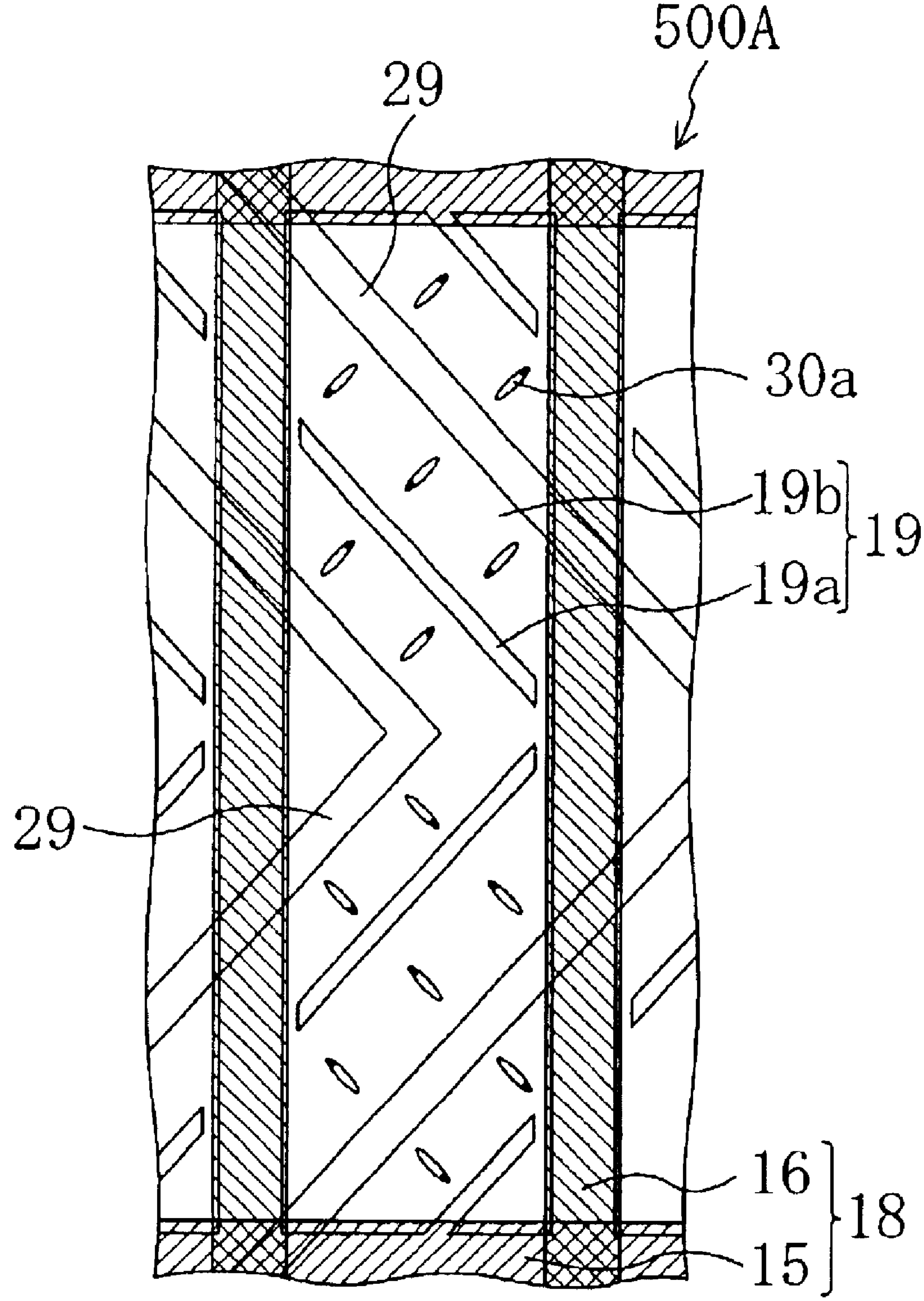

FIG. 40 is a plan view schematically illustrating a structure of one picture element region of a liquid crystal display device 500A according to another alternative embodiment of the present invention.

Figure 41:
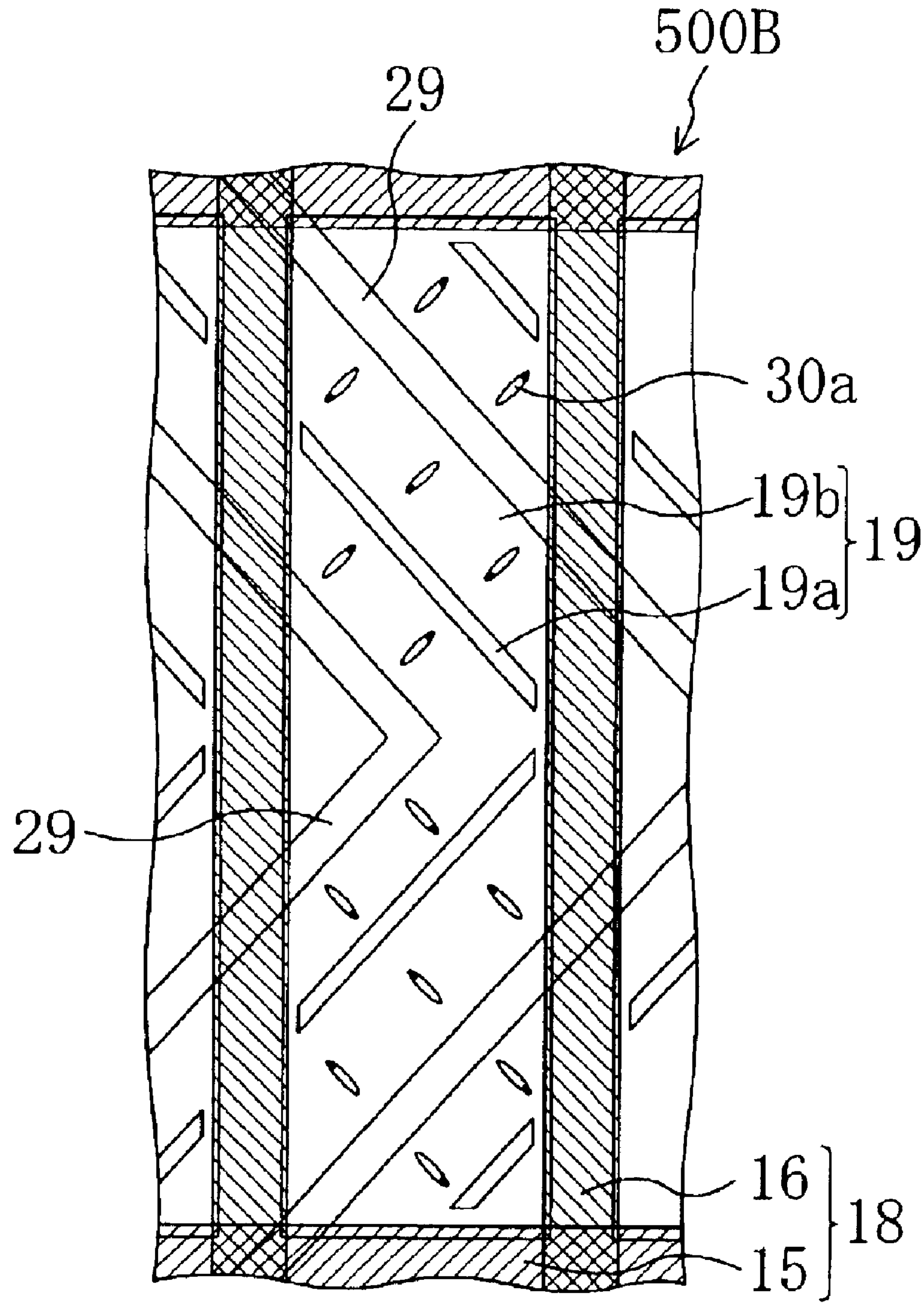

FIG. 41 is a plan view schematically illustrating a structure of one picture element region of a liquid crystal display device 500B according to another alternative embodiment of the present invention.

DETAILED DESCRIPTION OF THE PREFERRED EMBODIMENTS

Embodiments of the present invention will now be described with reference to the drawings.

First, the electrode structure of the liquid crystal display device of the present invention and the function thereof will be described. The preferred embodiments of the present invention will be hereinafter described with respect to an active matrix type liquid crystal display device using thin film transistors (TFTs). Moreover, while the preferred embodiments of the present invention will be described with respect to a transmission type liquid crystal display device, the present invention can alternatively be used with a reflection type liquid crystal display device or a transmission/reflection combination type liquid crystal display device.

Note that in the present specification, a region of a liquid crystal display device corresponding to a "picture element", which is the minimum unit of display, will be referred to as a "picture element region". In a color liquid crystal display device, R, G and B "picture elements" correspond to one "pixel". In an active matrix type liquid crystal display device, a picture element region is defined by a picture element electrode and a counter electrode which opposes the picture element electrode. In an arrangement with a black matrix, strictly speaking, a picture element region is a portion of each region across which a voltage is applied according to the intended display state which corresponds to an opening of the black matrix.

Figure 1B:
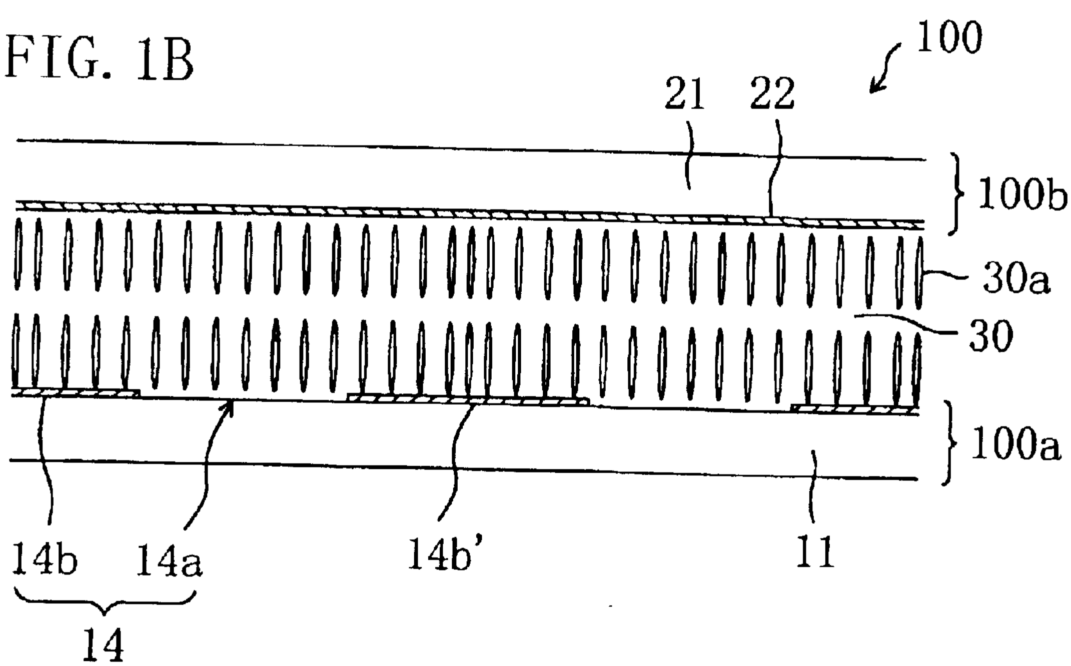

A structure of one picture element region of a liquid crystal display device 100 according to an embodiment of the present invention will be described with reference to FIG. 1A and FIG. 1B. In the following description, a color filter and a black matrix are omitted for the sake of simplicity. Moreover, in subsequent figures, each element having substantially the same function as the corresponding element in the liquid crystal display device 100 will be denoted by the same reference numeral and will not be further described below. FIG. 1A is a plan view as viewed in the substrate normal direction, and FIG. 1B is a cross-sectional view taken along line 1B–1B' of FIG. 1A. FIG. 1B illustrates a state where no voltage is applied across a liquid crystal layer.

The liquid crystal display device 100 includes an active matrix substrate (hereinafter referred to as a "TFT substrate") 100*a*, a counter substrate (referred to also as a "color filter substrate") 100*b*, and a liquid crystal layer 30 provided between the TFT substrate 100*a* and the counter substrate 100*b*. Liquid crystal molecules 30*a* of the liquid crystal layer 30 have a negative dielectric anisotropy, and are aligned vertical to the surface of the vertical alignment film, as illustrated in FIG. 1B, in the absence of an applied voltage across the liquid crystal layer 30 by virtue of a vertical alignment film (not shown), as a vertical alignment layer, which is provided on one surface of each of the TFT substrate 100*a* and the counter substrate 100*b* that is closer to the liquid crystal layer 30. This state is described as the liquid crystal layer 30 being in a vertical alignment. Note, however, that the liquid crystal molecules 30*a* of the liquid crystal layer 30 in a vertical alignment may slightly incline from the normal to the surface of the vertical alignment film (the surface of the substrate) depending upon the type of vertical alignment film or the type of liquid crystal material used. Generally, a vertical alignment is defined as a state where the axis of the liquid crystal molecules (referred to also as the "axial orientation") is oriented at an angle of about 85° or more with respect to the surface of the vertical alignment film.

The TFT substrate 100*a* of the liquid crystal display device 100 includes a transparent substrate (e.g., a glass substrate) 11 and a picture element electrode 14 provided on the surface of the transparent substrate 11. The counter substrate 100*b* includes a transparent substrate (e.g., a glass substrate) 21 and a counter electrode 22 provided on the surface of the transparent substrate 21. The orientation of the liquid crystal layer 30 changes for each picture element region according to the voltage applied between the picture element electrode 14 and the counter electrode 22 which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

The picture element electrode 14 of the liquid crystal display device 100 includes a plurality of openings 14*a* and a solid portion 14*b*. The opening 14*a* refers to a portion of the picture element electrode 14 made of a conductive film (e.g., an ITO film) from which the conductive film has been removed, and the solid portion 14*b* refers to a portion thereof where the conductive film is present (the portion other than the openings 14*a*). While a plurality of openings 14*a* are formed for each picture element electrode, the solid portion 14*b* is basically made of a single continuous conductive film.

The openings 14*a* are arranged so that the respective centers thereof form a square lattice, and a unit solid portion 14*b*' (defined as a portion of the solid portion 14*b* that is substantially surrounded by four openings 14*a* whose respective centers are located at the four lattice points that form one unit lattice) has a generally circular shape. Each opening 14*a* has a generally star shape having four quarter-arc-shaped sides (edges) with a four-fold rotation axis at the center among the four sides. In order to stabilize the orientation across the entire picture element region, the unit lattices preferably exist up to the periphery of the picture element electrode 14. Specifically, a peripheral portion of the picture element electrode 14 is preferably patterned, as illustrated in the figure, into a shape that corresponds to a generally half piece of the opening 14*a* (in a peripheral portion of the picture element electrode 14 along a side thereof) or into a shape that corresponds to a generally quarter piece of the opening 14*a* (in a peripheral portion of the picture element electrode 14 at a corner thereof), so that the opening 14*a* is also provided along the periphery of the picture element electrode 14.

The openings 14*a* located in the central portion of the picture element region have generally the same shape and size. The unit solid portions 14*b*' located respectively in unit lattices formed by the openings 14*a* are generally circular in shape, and have generally the same shape and size. Each unit solid portion 14*b*' is connected to adjacent unit solid portions 14*b*', thereby forming the solid portion 14*b* which substantially functions as a single conductive film.

When a voltage is applied between the picture element electrode 14 having such a structure as described above and the counter electrode 22, an inclined electric field is produced at the edge portion of each opening 14*a*, thereby producing a plurality of liquid crystal domains each having a radially-inclined orientation. The liquid crystal domain is produced in each region corresponding to the opening 14*a* and in each region corresponding to the unit solid portion 14*b*' in a unit lattice.

While the picture element electrode 14 having a square shape is illustrated herein, the shape of the picture element electrode 14 is not limited to this. A typical shape of the picture element electrode 14 can be approximated to a rectangular shape (including a square and an oblong rectangle), whereby the openings 14*a* can be regularly arranged therein in a square lattice pattern. Even when the picture element electrode 14 has a shape other than a rectangular shape, the effects of the present invention can be obtained as long as the openings 14*a* are arranged in a regular manner (e.g., in a square lattice pattern as illustrated herein) so that liquid crystal domains are formed in all regions in the picture element region.

Figure 2A:
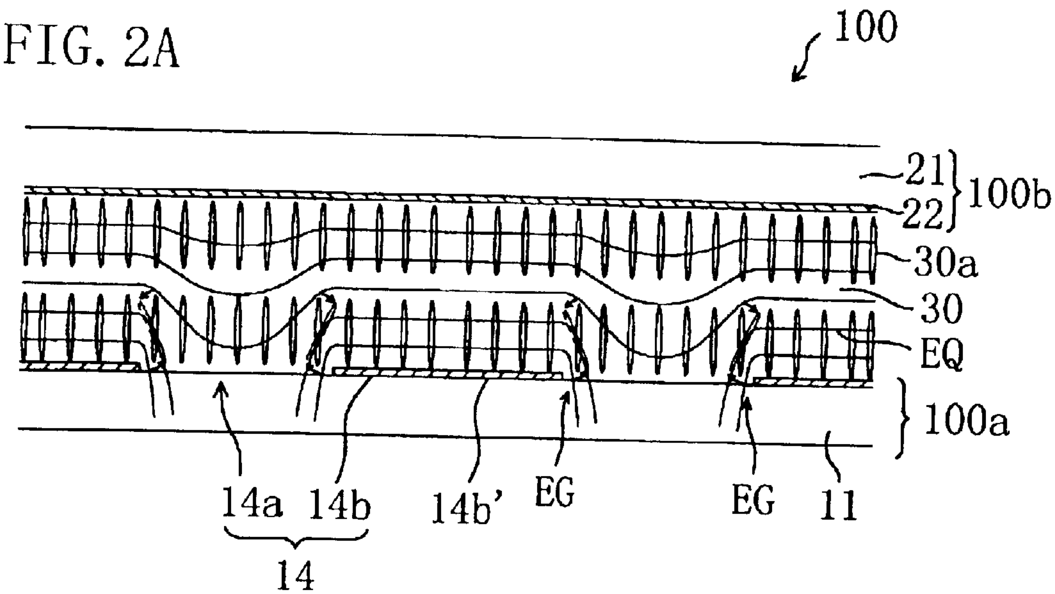
FIG. 2A and FIG. 2B illustrate a liquid crystal layer 30 of the liquid crystal display device 100 in the presence of an applied voltage thereacross, wherein FIG. 2A schematically illustrates a state where an orientation has just started to change (initial ON state), and FIG. 2B schematically illustrates a steady state.
Figure 2B:
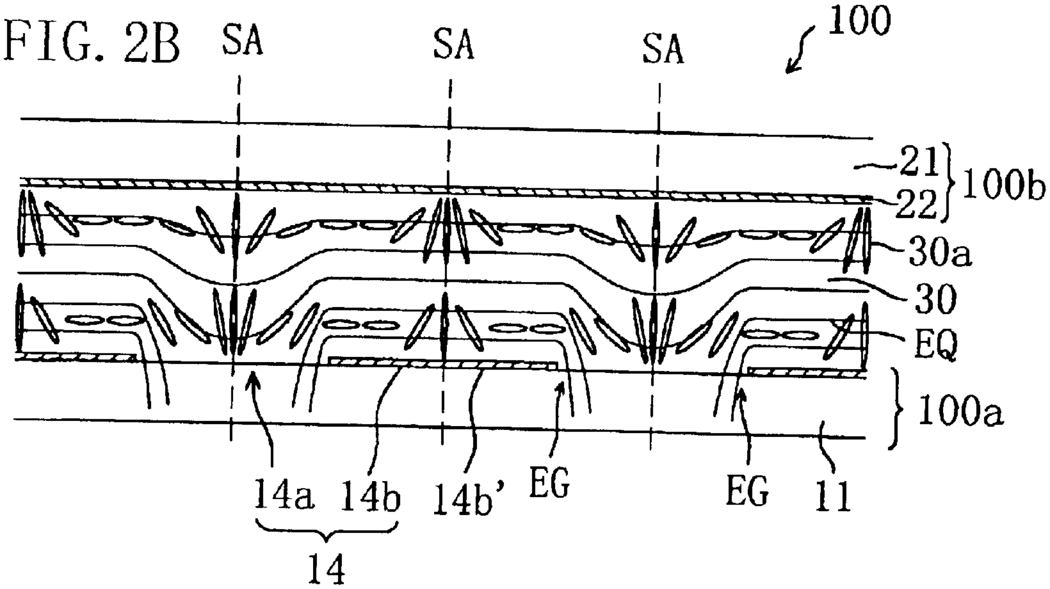

The mechanism by which liquid crystal domains are formed by an inclined electric field as described above will be described with reference to FIG. 2A and FIG. 2B. Each of FIG. 2A and FIG. 2B illustrates the liquid crystal layer 30 illustrated in FIG. 1B with a voltage being applied thereacross. FIG. 2A schematically illustrates a state where the orientation of the liquid crystal molecules 30*a* has just started to change (initial ON state) according to the voltage applied across the liquid crystal layer 30. FIG. 2B schematically illustrates a state where the orientation of the liquid crystal molecules 30*a* has changed and become steady according to the applied voltage. Curves EQ in FIG. 2A and FIG. 2B denote equipotential lines.

As illustrated in FIG. 1A, when the picture element electrode 14 and the counter electrode 22 are at the same potential (a state where no voltage is applied across the liquid crystal layer 30), the liquid crystal molecules 30*a* in each picture element region are aligned vertical to the surfaces of the substrates 11 and 21.

When a voltage is applied across the liquid crystal layer 30, a potential gradient represented by the equipotential lines EQ shown in FIG. 2A (perpendicular to the electric force line) is produced. The equipotential lines EQ are parallel to the surface of the solid portion 14*b* and the counter electrode 22 in the liquid crystal layer 30 located between the solid portion 14*b* of the picture element electrode 14 and the counter electrode 22, and drop in a region corresponding to the opening 14*a* of the picture element electrode 14. An inclined electric field represented by an inclined portion of the equipotential lines EQ is produced in the liquid crystal layer 30 above an edge portion EG of the opening 14*a* (the peripheral portion of and within the opening 14*a* including the boundary thereof).

A torque acts upon the liquid crystal molecules 30*a* having a negative dielectric anisotropy so as to direct the axial orientation of the liquid crystal molecules 30*a* to be parallel to the equipotential lines EQ (perpendicular to the electric force line). Therefore, the liquid crystal molecules 30*a* above the right edge portion EG in FIG. 2A incline (rotate) clockwise and the liquid crystal molecules 30*a* above the left edge portion EG incline (rotate) counterclockwise as indicated by arrows in FIG. 2A. As a result, the liquid crystal molecules 30*a* above the edge portions EG are oriented parallel to the corresponding portions of the equipotential lines EQ.

Referring to FIG. 3A to FIG. 3D, the change in the orientation of the liquid crystal molecules 30*a* will now be described in greater detail.

Figure 3A:
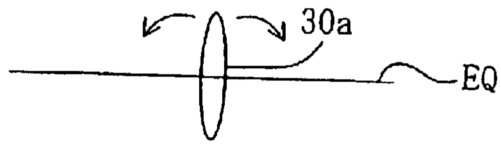

When an electric field is produced in the liquid crystal layer 30, a torque acts upon the liquid crystal molecules 30*a* having a negative dielectric anisotropy so as to direct the axial orientation thereof to be parallel to an equipotential line EQ. As illustrated in FIG. 3A, when an electric field represented by an equipotential line EQ perpendicular to the axial orientation of the liquid crystal molecule 30*a* is produced, either a torque urging the liquid crystal molecule 30*a* to incline clockwise or a torque urging the liquid crystal molecule 30*a* to incline counterclockwise occurs with the same probability. Therefore, the liquid crystal layer 30 between the pair of parallel plate-shape electrodes opposing each other has some liquid crystal molecules 30*a* that are subject to a clockwise torque and some other liquid crystal molecules 30*a* that are subject to a counterclockwise torque. As a result, the transition to the intended orientation according to the voltage applied across the liquid crystal layer 30 may not proceed smoothly.

Figure 3B:
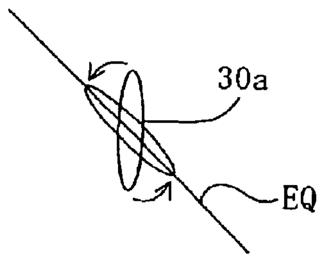
Figure 3C:
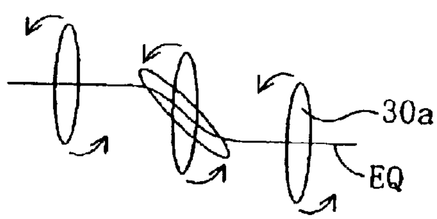
Figure 3D:
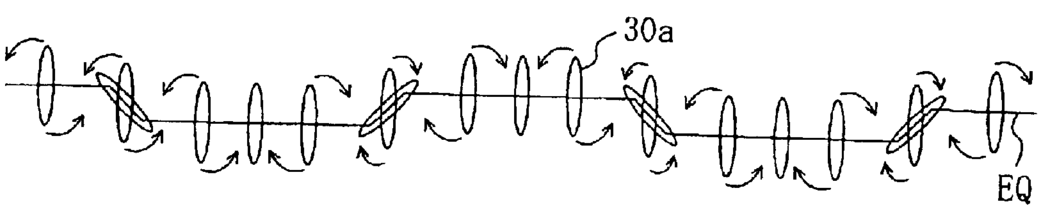

When an electric field represented by a portion of the equipotential lines EQ inclined with respect to the axial orientation of the liquid crystal molecules 30*a* (an inclined electric field) is produced at the edge portion EG of the opening 14*a* of the liquid crystal display device 100 of the present invention, as illustrated in FIG. 2A, the liquid crystal molecules 30*a* incline in whichever direction (the counterclockwise direction in the illustrated example) that requires less rotation for the liquid crystal molecules 30*a* to be parallel to the equipotential line EQ, as illustrated in FIG. 3B. The liquid crystal molecules 30*a* in a region where an electric field represented by an equipotential line EQ perpendicular to the axial orientation of the liquid crystal molecules 30*a* is produced incline in the same direction as the liquid crystal molecules 30*a* located on the inclined portion of the equipotential lines EQ so that the orientation thereof is continuous (in conformity) with the orientation of the liquid crystal molecules 30*a* located on the inclined portion of the equipotential lines EQ as illustrated in FIG. 3C. As illustrated in FIG. 3D, when an electric field such that the equipotential line EQ forms a continuous concave/convex pattern, the liquid crystal molecules 30*a* located on a flat portion of the equipotential line EQ are oriented so as to conform with the orientation direction defined by the liquid crystal molecules 30*a* located on adjacent inclined portions of the equipotential line EQ. The phrase "being located on an equipotential line EQ" as used herein means "being located within an electric field that is represented by the equipotential line EQ".

The change in the orientation of the liquid crystal molecules 30*a*, starting from those that are located on the inclined portion of the equipotential lines EQ, proceeds as described above and reaches a steady state, which is schematically illustrated in FIG. 2B. The liquid crystal molecules 30*a* located around the central portion of the opening 14*a* are influenced substantially equally by the respective orientations of the liquid crystal molecules 30*a* at the opposing edge portions EG of the opening 14*a*, and therefore retain their orientation perpendicular to the equipotential lines EQ. The liquid crystal molecules 30*a* away from the center of the opening 14*a* incline by the influence of the orientation of other liquid crystal molecules 30*a* at the closer edge portion EG, thereby forming an inclined orientation that is symmetric about the center SA of the opening 14*a*. The orientation as viewed in a direction perpendicular to the display plane of the liquid crystal display device 100 (a direction perpendicular to the surfaces of the substrates 11 and 21) is a state where the liquid crystal molecules 30*a* have a radial axial orientation (not shown) about the center of the opening 14*a*. In the present specification, such an orientation will be referred to as a "radially-inclined orientation". Moreover, a region of the liquid crystal layer that takes a radially-inclined orientation about a single axis will be referred to as a "liquid crystal domain".

A liquid crystal domain in which the liquid crystal molecules 30*a* take a radially-inclined orientation is formed also in a region corresponding to the unit solid portion 14*b*' substantially surrounded by the openings 14*a*. The liquid crystal molecules 30*a* in a region corresponding to the unit solid portion 14*b*' are influenced by the orientation of the liquid crystal molecules 30*a* at each edge portion EG of the opening 14*a* so as to take a radially-inclined orientation that is symmetric about the center SA of the unit solid portion 14*b*' (corresponding to the center of a unit lattice formed by the openings 14*a*).

The radially-inclined orientation in a liquid crystal domain formed in the unit solid portion 14*b*' and the radially-inclined orientation formed in the opening 14*a* are continuous with each other, and are both in conformity with the orientation of the liquid crystal molecules 30*a* at the edge portion EG of the opening 14*a*. The liquid crystal molecules 30*a* in the liquid crystal domain formed in the opening 14*a* are oriented in the shape of a cone that spreads upwardly (toward the substrate 100*b*), and the liquid crystal molecules 30*a* in the liquid crystal domain formed in the unit solid portion 14*b*' are oriented in the shape of a cone that spreads downwardly (toward the substrate 100*a*). As described above, the radially-inclined orientation in a liquid crystal domain formed in the opening 14*a* and that in a liquid crystal domain formed in the unit solid portion 14*b*' are continuous with each other. Therefore, no disclination line (orientation defect) is formed along the boundary therebetween, thereby preventing a decrease in the display quality due to occurrence of a disclination line.

In order to improve the viewing angle dependence, which is a display quality of a liquid crystal display device, in all azimuth angles, the existence probabilities of the liquid crystal molecules 30*a* oriented in various azimuth angle directions preferably have rotational symmetry, and more preferably have axial symmetry, in each picture element region. In other words, the liquid crystal domain formed across the entire picture element region preferably has rotational symmetry, and more preferably has axial symmetry. Note, however, that rotational symmetry may not be necessary across the entire picture element region, but it may be sufficient that each picture element region in the liquid crystal layer is formed as a collection of a plurality of groups of liquid crystal domains that are arranged so that each group has rotational symmetry (or axial symmetry) (e.g., a plurality of groups of liquid crystal domains, wherein each group of liquid crystal domains are arranged in a square lattice pattern). Therefore, the arrangement of the openings 14*a* formed in a picture element region may not need to have rotational symmetry across the entire picture element region, but it may be sufficient that the arrangement can be represented as a collection of a plurality of groups of openings that are arranged so that each group has rotational symmetry (or axial symmetry) (e.g., a plurality of groups of openings, wherein each group of openings are arranged in a square lattice pattern). Of course, this similarly applies to the arrangement of the unit solid portions 14*b*' substantially surrounded by the openings 14*a*. Moreover, since the shape of each liquid crystal domain preferably has rotational symmetry, and more preferably axial symmetry, the shape of each opening 14*a* and each unit solid portion 14*b*' preferably has rotational symmetry, and more preferably axial symmetry.

Note that a sufficient voltage may not be applied across the liquid crystal layer 30 around the central portion of the opening 14*a*, whereby the liquid crystal layer 30 around the central portion of the opening 14*a* does not contribute to the display. In other words, even if the radially-inclined orientation of the liquid crystal layer 30 around the central portion of the opening 14*a* is disturbed to some extent (e.g., even if the central axis is shifted from the center of the opening 14*a*), the display quality may not be decreased. Therefore, it may be sufficient that at least the liquid crystal domain formed corresponding to a unit solid portion 14*b*' is arranged to have rotational symmetry, and more preferably axial symmetry.

As described above with reference to FIG. 2A and FIG. 2B, the picture element electrode 14 of the liquid crystal display device 100 of the present invention includes a plurality of openings 14*a* and produces, in the liquid crystal layer 30 in the picture element region, an electric field represented by equipotential lines EQ having inclined portions. The liquid crystal molecules 30*a* having a negative dielectric anisotropy in the liquid crystal layer 30, which are in a vertical alignment in the absence of an applied voltage, change the orientation direction thereof, with the change in the orientation of those liquid crystal molecules 30*a* located on the inclined portion of the equipotential lines EQ serving as a trigger. Thus, a liquid crystal domain having a stable radially-inclined orientation is formed in the opening 14*a* and in the solid portion 14*b*. A display is produced by the change in the orientation of the liquid crystal molecules in the liquid crystal domain according to the voltage applied across the liquid crystal layer.

The shape (as viewed in the substrate normal direction) and arrangement of the openings 14*a* of the picture element electrode 14 of the liquid crystal display device 100 of the present embodiment will be described.

The display characteristics of a liquid crystal display device exhibit an azimuth angle dependence due to the orientation (optical anisotropy) of the liquid crystal molecules. In order to reduce the azimuth angle dependence of the display characteristics, it is preferred that the liquid crystal molecules are oriented in all azimuth angles with substantially the same probability. More preferably, the liquid crystal molecules in each picture element region are oriented in all azimuth angles with substantially the same probability. Therefore, the opening 14*a* preferably has a shape such that liquid crystal domains are formed in each picture element region so that the liquid crystal molecules 30*a* in the picture element region are oriented in all azimuth angles with substantially the same probability. More specifically, the shape of the opening 14*a* preferably has rotational symmetry (more preferably symmetry with at least a two-fold rotation axis) about a symmetry axis extending through the center of each opening (in the normal direction). It is also preferred that the plurality of openings 14*a* are arranged so as to have rotational symmetry. Moreover, it is preferred that the shape of the unit solid portion 14*b*' which is substantially surrounded by these openings also has rotational symmetry. It is also preferred that the unit solid portions 14*b*' are arranged so as to have rotational symmetry.

However, it may not be necessary to arrange the openings 14*a* or the unit solid portions 14*b*' so as to have rotational symmetry across the entire picture element region. The liquid crystal molecules can be oriented in all azimuth angles with substantially the same probability across the entire picture element region when, for example, a square lattice (having symmetry with a four-fold rotation axis) is used as the minimum unit, and the picture element region is formed by such square lattices, as illustrated in FIG. 1A.

The orientation of the liquid crystal molecules 30*a* when the generally star-shaped openings 14*a* having rotational symmetry and the generally circular unit solid portions 14*b*' are arranged in a square lattice pattern, as illustrated in FIG. 1A, will be described with reference to FIG. 4A to FIG. 4C.

Each of FIG. 4A to FIG. 4C schematically illustrates an orientation of the liquid crystal molecules 30*a* as viewed in the substrate normal direction. In figures, such as FIG. 4B and FIG. 4C, illustrating the orientation of the liquid crystal molecules 30*a* as viewed in the substrate normal direction, a black-spotted end of the liquid crystal molecule 30*a* drawn as an ellipse indicates that the liquid crystal molecule 30*a* is inclined so that the end is closer than the other end to the substrate on which the picture element electrode 14 having the opening 14*a* is provided. This similarly applies to all of the subsequent figures. A single unit lattice (which is formed by four openings 14*a*) in the picture element region illustrated in FIG. 1A will be described below. Cross-sectional views taken along the respective diagonals of FIG. 4A to FIG. 4C correspond to FIG. 1B, FIG. 2A and FIG. 2B, respectively, and FIG. 1B, FIG. 2A and FIG. 2B will also be referred to in the following description.

When the picture element electrode 14 and the counter electrode 22 are at the same potential, i.e., in a state where no voltage is applied across the liquid crystal layer 30, the liquid crystal molecules 30*a* whose orientation direction is regulated by the vertical alignment layer (not shown) which is provided on one side of each of the TFT substrate 100*a* and the counter substrate 100*b* that is closer to the liquid crystal layer 30 take a vertical alignment as illustrated in FIG. 4A.

When an electric field is applied across the liquid crystal layer 30 so as to produce an electric field represented by equipotential lines EQ shown in FIG. 2A, a torque acts upon the liquid crystal molecules 30*a* having a negative dielectric anisotropy so as to direct the axial orientation thereof to be parallel to the equipotential lines EQ. As described above with reference to FIG. 3A and FIG. 3B, for the liquid crystal molecules 30*a* under an electric field represented by equipotential lines EQ perpendicular to the molecular axis thereof, the direction in which the liquid crystal molecules 30*a* are to incline (rotate) is not uniquely defined (FIG. 3A), whereby the orientation change (inclination or rotation) does not easily occur. In contrast, for the liquid crystal molecules 30*a* placed under equipotential lines EQ inclined with respect to the molecular axis of the liquid crystal molecules 30*a*, the direction of inclination (rotation) is uniquely defined, whereby the orientation change easily occurs. Therefore, as illustrated in FIG. 4B, the liquid crystal molecules 30*a* start inclining from the edge portion of the opening 14*a* where the molecular axis of the liquid crystal molecules 30*a* is inclined with respect to the equipotential lines EQ. Then, the surrounding liquid crystal molecules 30*a* incline so as to conform with the orientation of the already-inclined liquid crystal molecules 30*a* at the edge portion of the opening 14*a*, as described above with reference to FIG. 3C. Then, the axial orientation of the liquid crystal molecules 30*a* becomes stable as illustrated in FIG. 4C (radially-inclined orientation).

As described above, when the shape of the opening 14*a* has rotational symmetry, the liquid crystal molecules 30*a* in the picture element region successively incline, starting from the edge portion of the opening 14*a* toward the center of the opening 14*a* upon application of a voltage. As a result, there is obtained an orientation in which those liquid crystal molecules 30*a* around the center of the opening 14*a*, where the respective orientation-regulating forces from the liquid crystal molecules 30*a* at the edge portions are in equilibrium, remain in a vertical alignment with respect to the substrate plane, while the surrounding liquid crystal molecules 30*a* are inclined in a radial pattern about those liquid crystal molecules 30*a* around the center of the opening 14*a*, with the degree of inclination gradually increasing away from the center of the opening 14*a*.

The liquid crystal molecules 30*a* in a region corresponding to the generally circular unit solid portion 14*b*' which is surrounded by the four generally star-shaped openings 14*a* arranged in a square lattice pattern also incline so as to conform with the orientation of the liquid crystal molecules 30*a* which have been inclined by an inclined electric field produced at the edge portion of each opening 14*a*. As a result, there is obtained an orientation in which those liquid crystal molecules 30*a* around the center of the unit solid portion 14*b*', where the respective orientation-regulating forces from the liquid crystal molecules 30*a* at the edge portions are in equilibrium, remain in a vertical alignment with respect to the substrate plane, while the surrounding liquid crystal molecules 30*a* are inclined in a radial pattern about those liquid crystal molecules 30*a* around the center of the unit solid portion 14*b*', with the degree of inclination gradually increasing away from the center of the unit solid portion 14*b*'.

As described above, when liquid crystal domains in each of which the liquid crystal molecules 30*a* take a radially-inclined orientation are arranged in a square lattice pattern across the entire picture element region, the existence probabilities of the liquid crystal molecules 30*a* of the respective axial orientations have rotational symmetry, whereby it is possible to realize a high-quality display without non-uniformity for any viewing angle. In order to reduce the viewing angle dependence of a liquid crystal domain having a radially-inclined orientation, the liquid crystal domain preferably has a high degree of rotational symmetry (preferably with at least a two-fold rotation axis, and more preferably with at least a four-fold rotation axis). Moreover, in order to reduce the viewing angle dependence across the entire picture element region, the plurality of liquid crystal domains provided in the picture element region are preferably arranged in a pattern (e.g., a square lattice pattern) that is a combination of a plurality of unit patterns (e.g., unit lattice patterns) each having a high degree of rotational symmetry (preferably with at least a two-fold rotation axis, and more preferably with at least a four-fold rotation axis).

For the radially-inclined orientation of the liquid crystal molecules 30*a*, a radially-inclined orientation having a counterclockwise or clockwise spiral pattern as illustrated in FIG. 5B or FIG. 5C, respectively, is more stable than the simple radially-inclined orientation as illustrated in FIG. 5A. The spiral orientation is different from a normal twist orientation (in which the orientation direction of the liquid crystal molecules 30*a* spirally changes along the thickness of the liquid crystal layer 30). In the spiral orientation, the orientation direction of the liquid crystal molecules 30*a* does not substantially change along the thickness of the liquid crystal layer 30 for a minute region. In other words, the orientation in a cross section (in a plane parallel to the layer plane) at any thickness of the liquid crystal layer 30 is as illustrated in FIG. 5B or FIG. 5C, with substantially no twist deformation along the thickness of the liquid crystal layer 30. For a liquid crystal domain as a whole, however, there may be a certain degree of twist deformation.

When a material obtained by adding a chiral agent to a nematic liquid crystal material having a negative dielectric anisotropy is used, the liquid crystal molecules 30*a* take a radially-inclined orientation of a counterclockwise or clockwise spiral pattern about the opening 14*a* and the unit solid portion 14*b*', as illustrated in FIG. 5B or FIG. 5C, respectively, in the presence of an applied voltage. Whether the spiral pattern is counterclockwise or clockwise is determined by the type of chiral agent used. Thus, by controlling the liquid crystal layer 30 in the opening 14*a* into a radially-inclined orientation of a spiral pattern in the presence of an applied voltage, the direction of the spiral pattern of the radially-inclined liquid crystal molecules 30*a* about other liquid crystal molecules 30*a* standing vertical to the substrate plane can be constant in all liquid crystal domains, whereby it is possible to realize a uniform display without display non-uniformity. Since the direction of the spiral pattern around the liquid crystal molecules 30*a* standing vertical to the substrate plane is definite, the response speed upon application of a voltage across the liquid crystal layer 30 is also improved.

Moreover, when a chiral agent is added, the orientation of the liquid crystal molecules 30*a* changes in a spiral pattern along the thickness of the liquid crystal layer 30 as in a normal twist orientation. In an orientation where the orientation of the liquid crystal molecules 30*a* does not change in a spiral pattern along the thickness of the liquid crystal layer 30, the liquid crystal molecules 30*a* which are oriented perpendicular or parallel to the polarization axis of the polarization plate do not give a phase difference to the incident light, whereby incident light passing through a region of such an orientation does not contribute to the transmittance. In contrast, in an orientation where the orientation of the liquid crystal molecules 30*a* changes in a spiral pattern along the thickness of the liquid crystal layer 30, the liquid crystal molecules 30*a* that are oriented perpendicular or parallel to the polarization axis of the polarization plate also give a phase difference to the incident light, and the optical rotatory power can also be utilized, whereby incident light passing through a region of such an orientation also contributes to the transmittance. Thus, it is possible to obtain a liquid crystal display device capable of producing a bright display.

FIG. 1A illustrates an example in which each opening 14*a* has a generally star shape and each unit solid portion 14*b*' has a generally circular shape, wherein such openings 14*a* and such unit solid portions 14*b*' are arranged in a square lattice pattern. However, the shape of the opening 14*a*, the shape of the unit solid portion 14*b*', and the arrangement thereof are not limited to those of the example above.

FIG. 6A and FIG. 6B are plan views respectively illustrating picture element electrodes 14A and 14B having respective openings 14*a* and unit solid portions 14*b*' of different shapes.

The openings 14*a* and the unit solid portions 14*b*' of the picture element electrodes 14A and 14B illustrated in FIG. 6A and FIG. 6B, respectively, are slightly distorted from those of the picture element electrode illustrated in FIG. 1A. The openings 14*a* and the unit solid portions 14*b*' of the picture element electrodes 14A and 14B have a two-fold rotation axis (not a four-fold rotation axis) and are regularly arranged so as to form oblong rectangular unit lattices. In both of the picture element electrodes 14A and 14B, the opening 14*a* has a distorted star shape, and the unit solid portion 14*b*' has a generally elliptical shape (a distorted circular shape). Also with the picture element electrodes 14A and 14B, it is possible to obtain a liquid crystal display device having a high display quality and a desirable viewing angle characteristic.

Moreover, picture element electrodes 14C and 14D as illustrated in FIG. 7A and FIG. 7B, respectively, may alternatively be used.

In the picture element electrodes 14C and 14D, generally cross-shaped openings 14*a* are arranged in a square lattice pattern so that each unit solid portion 14*b*' has a generally square shape. Of course, the patterns of the picture element electrodes 14C and 14D may be distorted so that there are oblong rectangular unit lattices. As described above, it is possible to obtain a liquid crystal display device having a high display quality and a desirable viewing angle characteristic alternatively by regularly arranging the generally rectangular (including a square and oblong rectangle) unit solid portions 14*b*'.

However, the shape of the opening 14*a* and/or the unit solid portion 14*b*' is preferably a circle or an ellipse, rather than a rectangle, so that a radially-inclined orientation is more stable. It is believed that a radially-inclined orientation is more stable with a circular or elliptical opening and/or unit solid portion because the edge of the opening 14*a* is more continuous (smooth), whereby the orientation direction of the liquid crystal molecules 30*a* changes more continuously (smoothly).

In view of the continuity of the orientation direction of the liquid crystal molecules 30*a* described above, picture element electrodes 14E and 14F as illustrated in FIG. 8A and FIG. 8B, respectively, are also desirable. The picture element electrode 14E illustrated in FIG. 8A is a variation of the picture element electrode 14 illustrated in FIG. 1A in which each opening 14*a* is simply comprised of four arcs. The picture element electrode 14F illustrated in FIG. 8B is a variation of the picture element electrode 14D illustrated in FIG. 7B in which each side of the opening 14*a* on the unit solid portion 14*b*' is an arc. In both of the picture element electrodes 14E and 14F, the openings 14*a* and the unit solid portions 14*b*' have a four-fold rotation axis and are arranged in a square lattice pattern (having a four-fold rotation axis). Alternatively, the shape of the unit solid portion 14*b*' of the opening 14*a* may be distorted into a shape having a two-fold rotation axis, and such unit solid portions 14*b*' may be arranged so as to form oblong rectangular lattices (having a two-fold rotation axis), as illustrated in FIG. 6A and FIG. 6B.

In the examples described above, the openings 14*a* are generally star-shaped or generally cross-shaped, and the unit solid portions 14*b*' are generally circular, generally elliptical, generally square (rectangular), and generally rectangular with rounded corners. Alternatively, the negative-positive relationship between the openings 14*a* and the unit solid portions 14*b*' may be inverted (hereinafter, the inversion of the negative-positive relationship between the openings 14*a* and the unit solid portions 14*b*' will be referred to simply as "inversion"). For example, FIG. 9 illustrates a picture element electrode 14G having a pattern obtained by inverting the negative-positive relationship between the openings 14*a* and the unit solid portions 14*b*' of the picture element electrode 14 illustrated in FIG. 1A. The picture element electrode 14G having an inverted pattern has substantially the same function as that of the picture element electrode 14 illustrated in FIG. 1A. When the opening 14*a* and the unit solid portion 14*b*' both have a generally square shape, as in picture element electrodes 14H and 14I illustrated in FIG. 10A and FIG. 10B, respectively, the inverted pattern may be substantially the same as the original pattern.

Also when the pattern illustrated in FIG. 1A is inverted as in the pattern illustrated in FIG. 9, it is preferred to form partial pieces (generally half or quarter pieces) of the opening 14*a* so as to form the unit solid portions 14*b*' having rotational symmetry at the edge portion of the picture element electrode 14. By employing such a pattern, the effect of an inclined electric field can be obtained at the edge portion of a picture element region as in the central portion of the picture element region, whereby it is possible to realize a stable radially-inclined orientation across the entire picture element region.

Next, which one of two inverted patterns should be employed will be discussed with respect to the picture element electrode 14 of FIG. 1A and the picture element electrode 14G illustrated in FIG. 9 having a pattern obtained by inverting the pattern of the openings 14*a* and the unit solid portions 14*b*' of the picture element electrode 14.

With either pattern, the length of the perimeter of each opening 14*a* is the same. Therefore, for the function of producing an inclined electric field, there is no difference between the two patterns. However, the area ratio of the unit solid portion 14*b*' (with respect to the total area of the picture element electrode 14) may differ between the two patterns. In other words, the area of the solid portion 14*b* (the portion where the conductive film exists) for producing an electric field acting upon the liquid crystal molecules of the liquid crystal layer may differ therebetween.

The voltage applied through a liquid crystal domain formed in the opening 14*a* is lower than the voltage applied through another liquid crystal domain formed in the solid portion 14*b*. As a result, in a normally black mode display, for example, the liquid crystal domain formed in the opening 14*a* appears darker. Thus, as the area ratio of the openings 14*a* increases, the display brightness decreases. Therefore, it is preferred that the area ratio of the solid portion 14*b* is high.

Whether the area ratio of the solid portion 14*b* is higher in the pattern of FIG. 1A or in the pattern of FIG. 9 depends upon the pitch (size) of the unit lattice.

FIG. 11A illustrates a unit lattice of the pattern illustrated in FIG. 1A, and FIG. 11B illustrates a unit lattice of the pattern illustrated in FIG. 9 (the opening 14*a* being taken as the center of each lattice). The portions illustrated in FIG. 9 that serve to connect adjacent unit solid portions 14*b*' together (the branch portions extending in four directions from the circular portion) are omitted in FIG. 11B. The length of one side of the square unit lattice (the pitch) is denoted by "p", and the distance between the opening 14*a* or the unit solid portion 14*b*' and a side of the unit lattice (the width of the side space) is denoted by "s".

Various samples of picture element electrodes 14 having different pitches p and side spaces s were produced so as to examine the stability of the radially-inclined orientation, etc. As a result, it was found that with the picture element electrode 14 having a pattern illustrated in FIG. 11A (hereinafter, referred to as the "positive pattern"), the side space s needs to be about 2.75 μm or more so as to produce an inclined electric field required to obtain a radially-inclined orientation. It was found that with the picture element electrode 14 having a pattern illustrated in FIG. 1B (hereinafter, referred to as the "negative pattern"), the side space s needs to be about 2.25 μm or more so as to produce an inclined electric field required to obtain a radially-inclined orientation. For each pattern, the area ratio of the solid portion 14*b* was examined while changing the value of the pitch p with the side space s fixed to its lower limit value above. The results are shown in Table 1 below and in FIG. 11C.

TABLE 1

| | Solid portion area ratio (%) | |
|---|---|---|
| Pitch p (μm) | Positive (FIG. 11A) | Negative (FIG. 11B) |
| 20 | 41.3 | 52.9 |
| 25 | 47.8 | 47.2 |

TABLE 1-continued

| | Solid portion area ratio (%) | |
|---|---|---|
| Pitch p (μm) | Positive (FIG. 11A) | Negative (FIG. 11B) |
| 30 | 52.4 | 43.3 |
| 35 | 55.8 | 40.4 |
| 40 | 58.4 | 38.2 |
| 45 | 60.5 | 36.4 |
| 50 | 62.2 | 35.0 |

As can be seen from Table 1 and FIG. 11C, the positive pattern (FIG. 11A) has a higher area ratio of the solid portion 14*b* when the pitch p is about 25 μm or more, and the negative pattern (FIG. 11B) has a higher area ratio of the solid portion 14*b* when the pitch p is less than about 25 μm. Therefore, in view of the display brightness and the stability of orientation, the pattern which should be employed changes at the critical pitch p of about 25 μm. For example, when three or fewer unit lattices are provided in the width direction of the picture element electrode 14 having a width of 75 μm, the positive pattern illustrated in FIG. 11A is preferred, and when four or more unit lattices are provided, the negative pattern illustrated in FIG. 11B is preferred. For patterns other than that illustrated herein, the selection between a positive pattern and a negative pattern can similarly be made so as to obtain the larger area ratio of the solid portion 14*b*.

The number of unit lattices can be determined as follows. The size of each unit lattice is calculated so that one or more (an integer number of) unit lattices are arranged along the width (horizontal or vertical) of the picture element electrode 14, and the area ratio of the solid portion is calculated for each calculated unit lattice size. Then, the unit lattice size such that the area ratio of the solid portion is maximized is selected. Note that the orientation-regulating force from an inclined electric field decreases, whereby a stable radially-inclined orientation is not easily obtained, when the diameter of the unit solid portion 14*b*' (for the positive pattern) or the opening 14*a* (for the negative pattern) is less than 15 μm. The lower limit diameter value is for a case where the thickness of the liquid crystal layer 30 is about 3 μm. When the thickness of the liquid crystal layer 30 is less than about 3 μm, a stable radially-inclined orientation can be obtained even when the diameter of the unit solid portion 14*b*' and the opening 14*a* is less than the lower limit value. When the thickness of the liquid crystal layer 30 is greater than about 3 μm, the lower limit diameter value of the unit solid portion 14*b*' and the opening 14*a* for obtaining a stable radially-inclined orientation is greater than the lower limit value shown above.

Note that the stability of the radially-inclined orientation can be increased by forming a protrusion in the opening 14*a* as will be described later. The conditions shown above are all given for cases where the protrusion is not formed.

As described above, it is possible to realize a display with a wide viewing angle by providing an electrode structure that exerts an orientation-regulating force for forming a liquid crystal domain taking a radially-inclined orientation in a picture element region.

However, the present inventors have found that the display quality may not be improved sufficiently only by providing an electrode structure as described above, depending on the positional relationship between the openings 14*a* of the picture element electrode 14 and the edge of a bus line (a group of interconnection lines) provided on the TFT substrate 100*a*. In the liquid crystal display device 100 of the present invention, the opening 14*a* of the picture element electrode 14 and the edge of the bus line are in a positional relationship as described below, thereby realizing a high-quality display.

Referring to FIG. 12, the positional relationship between the openings 14*a* of the picture element electrode 14 and the edge of a bus line 18 of the liquid crystal display device 100 of the present embodiment will now be described. FIG. 12 is a plan view schematically illustrating a picture element region of the liquid crystal display device 100 of the present embodiment. Note that in subsequent figures, a TFT provided on the TFT substrate 100*a* for each picture element region is omitted.

As illustrated in FIG. 12, the TFT substrate 100*a* of the liquid crystal display device 100 includes, on the side that is closer to the liquid crystal layer 30, the picture element electrode 14 provided for each picture element region, a TFT (not shown) as a switching element electrically connected to the picture element electrode 14, and the bus line 18 including a gate bus line (scanning line) 15 and a source bus line (signal line) 16 that are electrically connected to the TFT. In the present embodiment, the bus line 18 further includes a storage capacitor line 17 for forming a storage capacitor.

In the present embodiment, at least one of the openings 14*a* that are located along the bus line 18 is superposed on the bus line 18 in each picture element region, as illustrated in FIG. 12. More specifically, among the openings 14*a* that are located along the bus line 18, the opening 14*a* that is located along the gate bus line 15 and located between two adjacent unit solid portions 14*b*' is superposed on the bus line 18 (gate bus line 15). Thus, as viewed from the side of the TFT substrate 110*a*, the gate bus line 15 is provided so as to cover the opening 14*a* that is located between the adjacent unit solid portions 14*b*'. As viewed from the side of the counter substrate 100*b*, the unit solid portions 14*b*' interposing the opening 14*a* therebetween cover the edge of the gate bus line 15. Herein, the gate bus line 15 is formed with branch portions each extending toward the opening 14*a* between adjacent unit solid portions 14*b*', whereby the opening 14*a* between adjacent unit solid portions 14*b*' is superposed on the gate bus line 15.

In the liquid crystal display device 100, at least one of the openings 14*a* that are located along the bus line 18 is superposed on the bus line 18, as described above, thereby realizing a high-quality display. The reason for this will be described below with reference to FIG. 13, FIG. 14A, FIG. 14B, FIG. 16A and FIG. 16B, in comparison with a case where the opening 14*a* that is located along the bus line 18 is not superposed on the bus line 18.

FIG. 13 is a plan view schematically illustrating a liquid crystal display device 700, in which the opening 14*a* that is located along the bus line 18 is not superposed on the bus line 18. Moreover, FIG. 14A and FIG. 14B schematically illustrate the orientation of the liquid crystal molecules 30*a* around the opening 14*a* that is located along the gate bus line 15 in the liquid crystal display device 700, wherein FIG. 14A is a plan view, and FIG. 14B is a cross-sectional view taken along line 14B–14B' of FIG. 14A. FIG. 16A and FIG. 16B schematically illustrate the orientation of the liquid crystal molecules 30*a* around the opening 14*a* that is located along the gate bus line 15 in the liquid crystal display device 100 of the present embodiment, wherein FIG. 16A is a plan view, and FIG. 16B is a cross-sectional view taken along line 16B–16B' of FIG. 16A.

When driving the liquid crystal display device, a predetermined signal (voltage) for driving the liquid crystal display device is applied to the bus line 18 provided on the TFT substrate 100*a*, whereby an electric field is produced between the bus line 18 and the counter electrode 22. Therefore, an inclined electric field is produced in the vicinity of the edge of the bus line 18. However, the orientation-regulating force from the inclined electric field is not matched with that from an inclined electric field that is produced at the edge portion of the opening 14*a*. Therefore, if the liquid crystal domain formed in the opening 14*a* that is located along the bus line 18 is subject to the orientation-regulating force from the inclined electric field in the vicinity of the edge of the bus line 18, the orientation of the liquid crystal domain is disturbed, thereby resulting in a distorted radially-inclined orientation.

For example, in the liquid crystal display device 700, in which the opening 14*a* that is located along the bus line 18 is not superposed on the bus line 18, as illustrated in FIG. 13, the liquid crystal molecules 30*a* around the opening 14*a* that is located along the gate bus line 15 are oriented as follows in the presence of an applied voltage. As illustrated in FIG. 14B, in the presence of an applied voltage, the liquid crystal molecules 30*a* at the edge portion of the opening 14*a* are inclined counterclockwise by the inclined electric field produced at the edge portion of the opening 14*a*, whereas the liquid crystal molecules 30*a* in the vicinity of the edge of the gate bus line 15 are inclined clockwise by the inclined electric field produced in the vicinity of the gate bus line 15. Therefore, the liquid crystal layer 30 in the opening 14*a* forms a liquid crystal domain having a distorted radially-inclined orientation (a squashed circular shape in the illustrated example), as illustrated in FIG. 14A.

Since adjacent liquid crystal domains are predisposed to maintain the orientation continuity therebetween, the orientation disturbance of the liquid crystal domain in the opening 14*a* that is located along the bus line 18 influences the orientation of adjacent liquid crystal domains, i.e., the liquid crystal domains formed in adjacent unit solid portions 14*b*'. Thus, the orientation of the liquid crystal domain is disturbed also in the adjacent unit solid portions 14*b*'.

In a liquid crystal domain that takes a distorted radially-inclined orientation due to its disturbed orientation, the orientation is not stable and it easily collapses, whereby it takes a long time before the orientation of such a liquid crystal domain reaches a steady state after a voltage application. Thus, the orientation disturbance as described above leads to a decrease in the response speed (deterioration in the response characteristic).

Moreover, the liquid crystal layer 30 in each picture element region reaches a steady state with such a distorted radially-inclined orientation, in which the orientation is disturbed, and the disturbed orientation varies from one picture element region to another. Therefore, an after image phenomenon may occur, in which the previously-displayed image remains after an image-switching signal is input. This is because if the orientation of the liquid crystal layer 30 varies among different picture element regions, the transmittance also varies among different picture element regions. Particularly, there is a significant difference in the orientation of the liquid crystal layer 30 between a picture element region that has transitioned to an intermediate gray level display from a white display and a picture element region that has transitioned to an intermediate gray level display from a black display, and the difference in transmittance between such picture element regions is likely to be viewed as an after image phenomenon. This is for the following reason. In a white display, the inclined electric field produced at the edge portion of the opening 14*a* exerts a relatively strong orientation-regulating force, whereby the orientation of the liquid crystal layer 30 is stable. Therefore, the orientation of the liquid crystal layer 30 is stable even after the transition to an intermediate gray level display. On the other hand, when transitioning from a black display to an intermediate gray level display, the orientation of the liquid crystal layer 30 is likely to collapse because the orientation-regulating force from the inclined electric field produced at the edge portion of the opening 14*a* is relatively weak.

In contrast, the liquid crystal display device 100 of the present invention is designed so that at least one of the openings 14*a* that are located along the bus line 18, specifically the opening 14*a* that is located along the gate bus line 15 and located between two adjacent unit solid portions 14*b*', is superposed on the bus line 18 (gate bus line 15), as illustrated in FIG. 12, whereby the edge of the bus line 18 near the opening 14*a* that is superposed on the bus line 18 is covered by the unit solid portions 14*b*' of the picture element electrode 14.

Therefore, in the vicinity of the opening 14*a* that is superposed on the bus line 18, the liquid crystal molecules 30*a* of the liquid crystal layer 30 are electrically shielded by the unit solid portions 14*b*' of the picture element region 14 from the influence of the inclined electric field produced in the vicinity of the edge of the bus line 18. Thus, the liquid crystal molecules 30*a* of the liquid crystal layer 30 are not subject to the orientation-regulating force from the inclined electric field produced in the vicinity of the edge of the bus line 18, and the orientation thereof is regulated only by the inclined electric field that is produced at the edge portion of the opening 14*a*.

Therefore, in the liquid crystal display device 100 of the present invention, the orientation is not disturbed in the liquid crystal domain formed in the opening 14*a* that is superposed on the bus line 18 or in the liquid crystal domain formed in the unit solid portion 14*b*' that is adjacent to the opening 14*a*, whereby the decrease in the response speed (deterioration in the response characteristic) and the occurrence of the after image phenomenon are suppressed, thus realizing a high-quality display.

Note that although the inclined electric field produced in the vicinity of the edge of the bus line 18 not only causes the decrease in the response speed and the after image phenomenon, as described above, but also causes a decrease in the contrast ratio, the decrease in the contrast ratio can be suppressed if the bus line 18 is made of a light-blocking material. This will now be described in greater detail.

As described above, an inclined electric field is produced in the vicinity of the edge of the bus line 18, and the inclined electric field is produced regardless of the presence/absence of the applied voltage across the liquid crystal layer 30 between the picture element electrode 14 and the counter electrode 22. Therefore, in a liquid crystal display device that produces a display in a normally black mode, if the liquid crystal molecules 30*a* in the vicinity of the edge of the bus line 18 are inclined, in the absence of an applied voltage, by the orientation-regulating force from the inclined electric field, light leakage may occur, thereby decreasing the contrast ratio. Particularly, since the gate bus line 15 is, most of the time, under the application of a relatively high voltage (OFF voltage) for holding TFTs OFF, the degree of such light leakage is significant in the vicinity of the edge of the gate bus line 15.

In the liquid crystal display device 100 of the present invention, the edge of the bus line 18 near the opening 14*a* that is superposed on the bus line 18 is covered by the unit solid portions 14*b*' of the picture element electrode 14, whereby the liquid crystal molecules 30*a* of the liquid crystal layer 30 are electrically shielded from the influence of the inclined electric field produced in the vicinity of the edge of the bus line 18. Therefore, the liquid crystal molecules 30*a* of the liquid crystal layer 30 are not inclined by the orientation-regulating force from the inclined electric field. Although the liquid crystal molecules 30*a* of the liquid crystal layer 30 in the opening 14*a* that is superposed on the bus line 18 may be inclined by the electric field produced between the bus line 18 and the counter electrode 22, the opening that is superposed on the bus line 18 is blocked from light if the bus line 18 is made of a light-blocking material.

Therefore, if the bus line 18 is made of a light-blocking material, the decrease in the contrast ratio due to the occurrence of light leakage is suppressed, thereby realizing a display with an even higher quality.

Moreover, if the bus line 18 is made of a light-blocking material, it is possible to suppress the non-uniformity in the display plane (i.e., a local variation in the contrast ratio), as will be described below, thereby improving the display quality.

A residual charge is likely to occur in the opening 14*a*, through which an insulator material is exposed, due to the inclined electric field produced in the vicinity of the edge of the bus line 18, and if the liquid crystal molecules 30*a* in the opening 14*a* that is located along the bus line 18 are inclined due to the influence of the residual charge, it will cause light leakage. While the degree of the residual charge varies depending on the surface condition of the insulator material, variations in the surface condition of the insulator material occur when printing an alignment film or when injecting a liquid crystal material. Therefore, in a liquid crystal display device, there are variations in the residual charge in the display plane. If the residual charge varies in the display plane, the degree of light leakage also varies in the display plane, thereby causing local variations in the contrast ratio, thus resulting in non-uniformity. Particularly, since a relatively high voltage is applied to the gate bus line 15, as described above, the gate bus line 15 significantly contributes to the occurrence of the non-uniformity.

In the liquid crystal display device 100 of the present invention, when the bus line 18 is made of a light-blocking material, the opening 14*a* that is superposed on the bus line 18 is shaded by the bus line 18, thereby suppressing the occurrence of the non-uniformity as described above, and thus improving the display quality.

Moreover, in the vicinity of the edge of the gate bus line 15 in the liquid crystal display device 700 illustrated in FIG. 13, there are some regions where the conductive film (solid portion 14*b*) of the picture element electrode 14 is not formed, as illustrated in FIG. 15A (a cross-sectional view taken along line 15A–15A' of FIG. 13), and some other regions where the conductive film of the picture element electrode 14 is formed, as illustrated in FIG. 15B (a cross-sectional view taken along line 15B–15B' of FIG. 13). Therefore, in a region where the conductive film (solid portion 14*b*) is not formed in the vicinity of the edge of the gate bus line 15, impurity ions are adsorbed on the surface of the TFT substrate 100*a* by the electric field due to the gate bus line 15, as illustrated in FIG. 15A, whereby an orientation disturbance occurs due to the charge of the adsorbed impurity ions (hereinafter referred to as "cumulative charge"). Therefore, even if the bus line 18 is made of a light-blocking material, an orientation disturbance occurs due to the cumulative charge, thereby causing light leakage, in each opening portion near the gate bus line 15 (a region LL delimited by a broken line in FIG. 13).

In contrast, in the liquid crystal display device 100 of the present invention, in an area that is strongly influenced by the electric field due to the gate bus line 15, i.e., an area in the vicinity of the gate bus line 15, there are many regions where the conductive film (solid portion 14*b*) of the picture element electrode 14 is formed, as the region illustrated in FIG. 15B, thereby suppressing the orientation disturbance due to the cumulative charge, thus suppressing the light leakage.

Moreover, the impurities, which cause the cumulative charge, are not evenly distributed in the display plane, but are typically localized in a streak-shaped pattern in the display plane. This is because when a liquid crystal material is injected through a plurality of injection ports that are arranged at a predetermined interval, the liquid crystal material flows more slowly in regions between the injection ports than in the other regions, whereby the impurities are localized in such regions.

Therefore, the degree to which the cumulative charge is formed or lost varies between a streak-shaped region where the impurities are localized (a region with more impurities) and another region (a region with less impurities), whereby the degree of light leakage varies between the streak-shaped region and the other region. As a result, in the liquid crystal display device 700 illustrated in FIG. 13, the streak-shaped region appears to be a "black streak", where the brightness is higher than in the other region, or a "white streak", where the brightness is lower than in the other region, thereby causing display non-uniformity.

In contrast, the liquid crystal display device 100 of the present invention suppresses the occurrence of the light leakage, itself, due to the cumulative charge, as described above, thereby suppressing the occurrence of display non-uniformity.

Note that while the above description has been made with respect to a case where in each picture element region, at least one of the openings 14*a* located along the bus line 18 that is located along the gate bus line 15 and located between the unit solid portions 14*b*' is superposed on the bus line 18, the present invention is not limited to this. By employing an arrangement where in each picture element region, at least one of the openings 14*a* that are located along the bus line 18 and located between the unit solid portions 14*b*' is superposed on the bus line 18, the orientation disturbance in the liquid crystal domain is suppressed, whereby the decrease in the response speed (deterioration in the response characteristic) and the occurrence of the after image phenomenon are suppressed.

In order to suppress the orientation disturbance due to an inclined electric field produced in the vicinity of the edge of the bus line 18, it is preferred to increase the proportion of the opening 14*a* that is superposed on the bus line 18, i.e., to increase the portion of the edge of the bus line 18 to be covered by the unit solid portions 14*b*' of the picture element electrode 14. However, in a case where the bus line 18 is made of a light-blocking material, an increase in this proportion may decrease the aperture ratio. Thus, the proportion of the opening 14*a* that is superposed on the bus line 18 can suitably be determined depending on the application of the liquid crystal display device, etc., in view of the intended response characteristic and aperture ratio.

Of course, not only the opening 14*a* that is located between two adjacent unit solid portions 14*b*', but also other openings 14*a* that are located along the bus line 18, may be superposed on the bus line 18. For example, among the plurality of openings 14*a* of the picture element electrode 14, all of the openings 14*a* that are located along the gate bus line 15 may be superposed on the bus line 18, as in a liquid crystal display device 100A illustrated in FIG. 17.

In the liquid crystal display device 100 illustrated in FIG. 12, there is a portion of the opening 14*a* that is not superposed on the bus line 18 at the corner of a picture element region (in the vicinity of the intersection between the gate bus line 15 and the source bus line 16). In contrast, in the liquid crystal display device 100A illustrated in FIG. 17, the edge of the gate bus line 15 is covered by the unit solid portions 14*b*' even at the corner of the picture element region, and all of the openings 14*a* that are located along the gate bus line 15 are superposed on the bus line 18.

In the liquid crystal display device 100A illustrated in FIG. 17, a larger portion of the edge of the bus line 18 is covered by the unit solid portions 14*b*' of the picture element electrode 14, thereby providing a greater effect of suppressing the orientation disturbance. Note however that in the arrangement where a portion of the opening 14*a* that is at the corner of the picture element region is also superposed on the bus line 18, as compared with the arrangement illustrated in FIG. 12, the area of the intersection between the gate bus line 15 and the source bus line 16 is larger, whereby the parasitic capacitance may be large. Therefore, while the arrangement illustrated in FIG. 17 may be preferred in order to suppress the orientation disturbance, the arrangement illustrated in FIG. 12 may be preferred in order to reduce the parasitic capacitance. Of course, the orientation disturbance can be suppressed sufficiently and a sufficiently high display quality can be obtained as long as at least one of the openings 14*a* located along the bus line 18 that is located along the gate bus line 15 and located between adjacent unit solid portions 14*b*' is superposed on the bus line 18, as illustrated in FIG. 12.

Note that while FIG. 12 and FIG. 17 each show a case where the gate bus line 15 includes a branch portion extending toward the opening 14*a*, whereby the opening 14*a* is superposed on the gate bus line 15, the present invention is not limited thereto. Alternatively, the width of the gate bus line 15 may be increased so that the opening 14*a* that is located along the gate bus line 15 is superposed on the gate bus line 15 (so that the edge of the gate bus line 15 is covered by the unit solid portions 14*b*' of the picture element electrode 14), as in a liquid crystal display device 100B illustrated in FIG. 18. Note however that when the width of the gate bus line 15 is increased, the overlapping area between the gate bus line 15 and the unit solid portions 14*b*' increases, thereby increasing the gate-drain parasitic capacitance, as compared with the arrangements illustrated in FIG. 12 and FIG. 17. Moreover, when the gate bus line 15 is made of a light-blocking material, the aperture ratio decreases, as compared with the arrangements illustrated in FIG. 12 and FIG. 17. Therefore, in order to reduce the parasitic capacitance and to improve the aperture ratio, the arrangements illustrated in FIG. 12 and FIG. 17 are preferred.

Moreover, when driving the liquid crystal display device 100, a larger voltage is typically applied to the gate bus line 15 than to the source bus line 16, whereby the inclined electric field produced in the vicinity of the edge of the gate bus line 15 has a greater influence on the liquid crystal molecules than the inclined electric field produced in the vicinity of the edge of the source bus line 16.

Therefore, it is possible to effectively suppress the decrease in the response speed and the occurrence of the after image phenomenon without leading to an unnecessary decrease in the aperture ratio, by employing an arrangement where at least one or all of the openings 14*a* located along the bus line that is located along the gate bus line is superposed on the bus line 18 (gate bus line 15), as in the liquid crystal display devices 100 and 100A illustrated in FIG. 12 and FIG. 17.

Of course, it is possible to employ an arrangement where at least one or all of the openings 14*a* that are located along the source bus line 16 is superposed on the bus line 18, or an arrangement where all of the openings 14*a* that are located along the gate bus line 15 and the source bus line 16 are superposed on the bus line 18, as in liquid crystal display devices 100C and 100D illustrated in FIG. 19 and FIG. 20. In the liquid crystal display devices 100C and 100D illustrated in FIG. 19 and FIG. 20, the source bus line 16 includes branch portions each extending toward the opening 14*a*, and not only the opening 14*a* that is located along the gate bus line 15 but also the opening 14*a* that is located along the source bus line 16 is superposed on the bus line 18.

Furthermore, at least one or all of the openings 14*a* that is located along the storage capacitor line 17 may be superposed on the bus line 18, as necessary.

Note that the present invention is not limited to liquid crystal display devices including the picture element electrode 14 as illustrated in FIG. 12, etc., but the present invention may of course be used with other suitable liquid crystal display devices including the picture element electrode 14 of various other shapes. Various modifications can also be made with respect to the number or the arrangement of the unit solid portions 14*b*' of the picture element electrode 14. For example, the present invention can suitably be used with a liquid crystal display device having a relatively small number of unit solid portions 14*b*' in each picture element electrode 14, e.g., a liquid crystal display device in which three unit solid portions 14*b*' are arranged in each picture element region along the direction in which the source bus line 16 extends.

The liquid crystal display device 100 as described above may employ the same arrangement as a vertical alignment type liquid crystal display device known in the art, except that the picture element electrode 14 includes the openings 14*a* and the bus line 18 has a predetermined shape, and may be produced by a known production method.

Typically, a vertical alignment layer (not shown) is provided on one side of each of the picture element electrode 14 and the counter electrode 22 that is closer to the liquid crystal layer 30 so as to vertically align the liquid crystal molecules having a negative dielectric anisotropy.

The liquid crystal material may be a nematic liquid crystal material having a negative dielectric anisotropy. A guest-host mode liquid crystal display device can be obtained by adding a dichroic dye to a nematic liquid crystal material having a negative dielectric anisotropy. A guest-host mode liquid crystal display device does not require a polarization plate.

The above description has been made with respect to a case where the bus line 18 is formed in a predetermined shape (e.g., a shape with branch portions as illustrated in FIG. 12, etc., or a shape with a large width as illustrated in FIG. 18) so that the edge of the bus line 18 is covered by the solid portion 14*b* (unit solid portions 14*b*') of the picture element electrode 14. However, the present invention is not limited to this. Alternatively, the edge of the bus line 18 may be covered by the solid portion 14*b* by arranging the unit solid portions 14*b*' (or openings 14*a*) of the picture element electrode 14 in a predetermined arrangement, without changing the shape of the bus line 18.

For example, the picture element electrode 14 may be formed so that a portion of the unit solid portion 14*b*' (having a shape that corresponds to about one half of the unit solid portion 14*b*') are located along the gate bus line 15, as in a liquid crystal display device 100E illustrated in FIG. 21A and FIG. 21B. In the liquid crystal display device 100E, a portion of the unit solid portion 14*b*' is located along the gate bus line 15, whereby the liquid crystal layer 30 forms a portion of a liquid crystal domain taking a radially-inclined orientation in a portion of the solid portion 14*b* (a portion of the unit solid portion 14*b*') that is located along the gate bus line 15 in the presence of an applied voltage between the picture element electrode 14 and the counter electrode 22.

In the liquid crystal display device 100E, the edge of the gate bus line 15 is covered by a portion of the unit solid portion 14*b*' (having a shape that corresponds to about one half of the unit solid portion 14*b*') and branch portions electrically connecting these unit solid portions 14*b*' together, as illustrated in FIG. 21A and FIG. 21B. Thus, the edge of the gate bus line 15 is covered by the solid portion 14*b*. Therefore, effects as those of, for example, the liquid crystal display device 100 illustrated in FIG. 12 can be obtained. Furthermore, in the liquid crystal display device 100E, it is not necessary to form the gate bus line 15 with branch portions or to increase the width of the gate bus line 15, whereby an unnecessary decrease in the aperture ratio does not occur even if the bus line 18 is made of a light-blocking material.

Table 2 below shows the aperture ratio ("AR") of each of the liquid crystal display device 100E, as illustrated in FIG. 21A and FIG. 21B, and a liquid crystal display device 100F in which the gate bus line 15 includes branch portions, as illustrated in FIG. 22A and FIG. 22B. Table 2 also shows the ratio ("AR ratio") of the aperture ratio of the liquid crystal display device 100E with respect to that of the liquid crystal display device 100F.

TABLE 2

| | 13" | | 15" | | 20" | | 22" | |
|---|---|---|---|---|---|---|---|---|
| | AR | AR ratio | AR | AR ratio | AR | AR ratio | AR | AR ratio |
| LCD 100F | 51.2% | 101.2% | 57.4% | 100.9% | 57.9% | 100.8% | 58.3% | 100.9% |
| LCD 100E | 51.8% | | 58.0% | | 58.3% | | 58.8% | |

As shown in Table 2, the liquid crystal display device 100E has an aperture ratio that is improved by about 1% (0.8% to 1.2%) for any of 13"-, 15"-, 20"- and 22"-liquid crystal panels. Note that it is needless to say that the values shown in Table 2 are for particular specifications, and even higher aperture ratios can be expected for some specifications of the liquid crystal display device.

While FIG. 21A and FIG. 21B illustrate a case where the edge of the gate bus line 15 is covered by the solid portion 14*b* of the picture element electrode 14, it is preferred that the edge of at least one of the gate bus line 15 and the source bus line 16 is covered by the solid portion 14*b* of the picture element electrode 14. The unit solid portions 14*b*' may alternatively be arranged so that the edge of the gate bus line 15 and that of the source bus line 16 are both covered by the solid portion 14*b* of the picture element electrode 14, as in a liquid crystal display device 100G illustrated in FIG. 23. In the liquid crystal display device 10G, a portion of the unit solid portions 14*b*' (having a shape that corresponds to about one half of the unit solid portion 14*b*') is located along the source bus line 16, as illustrated in FIG. 23, whereby the edge of the source bus line 16 is also covered by the solid portion 14*b* of the picture element electrode 14. Therefore, it is possible to further improve the effect of suppressing the orientation disturbance.

As described above, by appropriately setting the arrangement of the unit solid portions 14*b*' (or openings 14*a*) of the picture element electrode 14, it is possible to suppress the orientation disturbance without changing the shape of the bus line 18. FIG. 24A and FIG. 24B, and FIG. 25A and FIG. 25B illustrate alternative liquid crystal display devices 100H and 100I, respectively, according to the embodiment of the present invention.

In each of the liquid crystal display devices 100H and 100I the shape of each unit solid portion 14*b*' of the picture element electrode 14 is a generally star shape having eight sides (edges) and having a four-fold rotation axis at its center. Moreover, the opening 14*a* has a generally rhombus shape.

In the liquid crystal display device 100H, the edge of the gate bus line 15 is formed in a zigzag shape so that the edge of the gate bus line 15 is covered by the solid portion 14*b* of the picture element electrode 14, as illustrated in FIG. 24A and FIG. 24B. On the other hand, in the liquid crystal display device 100I, a portion of the generally star-shaped unit solid portion 14*b*' (having a shape that corresponds to about one half of the unit solid portion 14*b*') is provided along the gate bus line 15 and along the source bus line 16 so that the edge of the gate bus line 15 and the edge of the source bus line 16 are covered by the solid portion 14*b* of the picture element electrode 14, as illustrated in FIG. 25A and FIG. 25B. Therefore, in the liquid crystal display device 100I, it is possible to prevent the unnecessary decrease in the aperture ratio.

Alternative Embodiment

A structure of one picture element region of a liquid crystal display device 200 according to an alternative embodiment of the present invention will be described with reference to FIG. 26A and FIG. 26B. Moreover, in subsequent figures, each element having substantially the same function as the corresponding element in the liquid crystal display device 100 will be denoted by the same reference numeral and will not be further described below. FIG. 26A is a plan view as viewed in the substrate normal direction, and FIG. 26B is a cross-sectional view taken along line 26B–26B' of FIG. 26A. FIG. 26B illustrates a state where no voltage is applied across a liquid crystal layer.

As illustrated in FIG. 26A and FIG. 26B, the liquid crystal display device 200 is different from the liquid crystal display device 100 illustrated in FIG. 1A and FIG. 1B in that a TFT substrate 200*a* includes a protrusion 40 in the opening 14*a* of the picture element electrode 14. A vertical alignment film (not shown) is provided on the surface of the protrusion 40.

The cross section of the protrusion 40 along the plane of the substrate 11 is a generally star-shaped cross section, i.e., the same shape as that of the opening 14*a*, as illustrated in FIG. 26A. Note that adjacent protrusions 40 are connected to each other so as to completely surround each unit solid portion 14*b*' in a generally circular pattern. The cross section of the protrusion 40 along a plane vertical to the substrate 11 is a trapezoidal shape as illustrated in FIG. 26B. Specifically, the cross section has a top surface 40*t* parallel to the substrate plane and a side surface 40*s* inclined by a taper angle θ (<90°) with respect to the substrate plane. Since the vertical alignment film (not shown) is provided so as to cover the protrusion 40, the side surface 40*s* of the protrusion 40 has an orientation-regulating force of the same direction as that of an inclined electric field for the liquid crystal molecules 30*a* of the liquid crystal layer 30, thereby functioning to stabilize the radially-inclined orientation.

The function of the protrusion 40 will now be described with reference to FIG. 27A to FIG. 27D, FIG. 28A and FIG. 28B.

First, the relationship between the orientation of the liquid crystal molecules 30*a* and the configuration of the surface having a vertical alignment power will be described with reference to FIG. 27A to FIG. 27D.

Figure 27A:
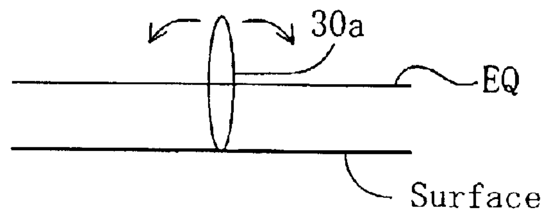

As illustrated in FIG. 27A, a liquid crystal molecule 30*a* on a horizontal surface is aligned vertical to the surface due to the orientation-regulating force of the surface having a vertical alignment power (typically, the surface of a vertical alignment film). When an electric field represented by an equipotential line EQ perpendicular to the axial orientation of the liquid crystal molecule 30*a* is applied through the liquid crystal molecule 30*a* in a vertical alignment, a torque urging the liquid crystal molecule 30*a* to incline clockwise and a torque urging the liquid crystal molecule 30*a* to incline counterclockwise act upon the liquid crystal molecule 30*a* with the same probability. Therefore, in the liquid crystal layer 30 between a pair of opposing electrodes in a parallel plate arrangement include some liquid crystal molecules 30*a* that are subject to the clockwise torque and other liquid crystal molecules 30*a* that are subject to the counterclockwise torque. As a result, the transition to the orientation according to the voltage applied across the liquid crystal layer 30 may not proceed smoothly.

Figure 27B:
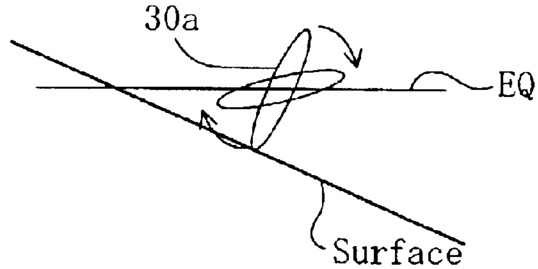
Figure 27C:
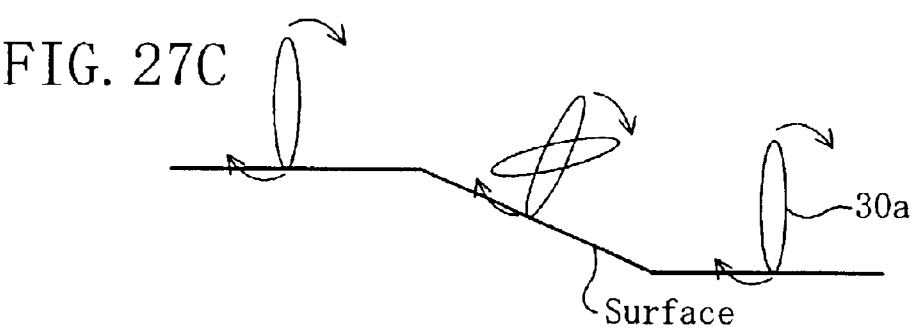

When an electric field represented by a horizontal equipotential line EQ is applied through a liquid crystal molecule 30*a* vertically aligned to an inclined surface, as illustrated in FIG. 27B, the liquid crystal molecule 30*a* inclines in whichever direction (the clockwise direction in the illustrated example) that requires less inclination for the liquid crystal molecule 30*a* to be parallel to the equipotential line EQ. Then, as illustrated in FIG. 27C, other adjacent liquid crystal molecules 30*a* aligned vertical to a horizontal surface incline in the same direction (the clockwise direction) as the liquid crystal molecule 30*a* located on the inclined surface so that the orientation thereof is continuous (in conformity) with the orientation of the liquid crystal molecule 30*a* aligned vertical to the inclined surface.

Figure 27D:
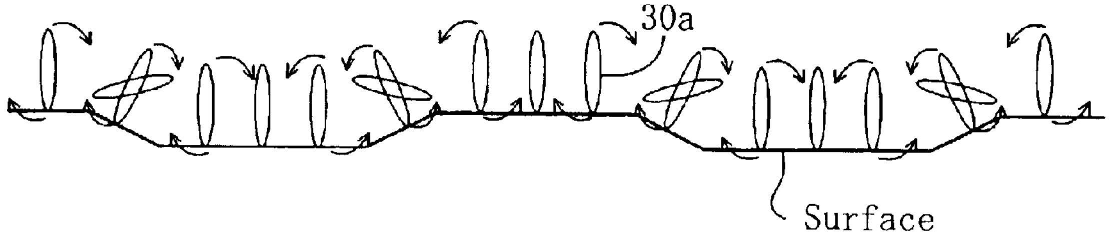

As illustrated in FIG. 27D, for a surface with concave/convex portions whose cross section includes a series of trapezoids, the liquid crystal molecules 30*a* on the top surface and those on the bottom surface are oriented so as to conform with the orientation direction regulated by other liquid crystal molecules 30*a* on the inclined portions of the surface.

In the liquid crystal display device 200, the direction of the orientation-regulating force exerted by the configuration (protrusions) of the surface is aligned with the direction of the orientation-regulating force exerted by an inclined electric field, thereby stabilizing the radially-inclined orientation.

FIG. 28A and FIG. 28B each illustrate a state in the presence of an applied voltage across the liquid crystal layer 30 shown in FIG. 26B. FIG. 28A schematically illustrates a state where the orientation of the liquid crystal molecules 30*a* has just started to change (initial ON state) according to the voltage applied across the liquid crystal layer 30. FIG. 28B schematically illustrates a state where the orientation of the liquid crystal molecules 30*a* has changed and become steady according to the applied voltage. In FIG. 28A and FIG. 28B, curves EQ denote equipotential lines.

When the picture element electrode 14 and the counter electrode 22 are at the same potential (i.e., in a state where no voltage is applied across the liquid crystal layer 30), the liquid crystal molecules 30*a* in each picture element region are aligned vertical to the surfaces of the substrates 11 and 21 as illustrated in FIG. 26B. The liquid crystal molecules 30*a* in contact with the vertical alignment film (not shown) on the side surface 40*s* of the protrusion 40 are aligned vertical to the side surface 40*s*, and the liquid crystal molecules 30*a* in the vicinity of the side surface 40*s* take an inclined orientation as illustrated due to the interaction (the nature as an elastic continuum) with the surrounding liquid crystal molecules 30*a*.

When a voltage is applied across the liquid crystal layer 30, a potential gradient represented by equipotential lines EQ shown in FIG. 28A is produced. The equipotential lines EQ are parallel to the surfaces of the solid portion 14*b* and the counter electrode 22 in a region of the liquid crystal layer 30 located between the solid portion 14*b* of the picture element electrode 14 and the counter electrode 22, and drop in a region corresponding to the opening 14*a* of the picture element electrode 14, thereby producing an inclined electric field represented by the inclined portion of the equipotential lines EQ in each region of the liquid crystal layer 30 above an edge portion (the peripheral portion of and within the opening 14*a* including the boundary thereof) EG of the opening 14*a*.

Due to the inclined electric field, the liquid crystal molecules 30*a* above the right edge portion EG in FIG. 28A incline (rotate) clockwise and the liquid crystal molecules 30*a* above the left edge portion EG incline (rotate) counterclockwise as indicated by arrows in FIG. 28A, as described above, so as to be parallel to the equipotential lines EQ. The direction of the orientation-regulating force exerted by the inclined electric field is the same as that of the orientation-regulating force exerted by the side surface 40*s* located at each edge portion EG.

As described above, the change in the orientation starts from the liquid crystal molecules 30*a* located on the inclined portion of the equipotential lines EQ, and reaches a steady state of the orientation schematically illustrated in FIG. 28B. The liquid crystal molecules 30*a* around the central portion of the opening 14*a*, i.e., around the central portion of the top surface 40*t* of the protrusion 40, are substantially equally influenced by the respective orientations of the liquid crystal molecules 30*a* at the opposing edge portions EG of the opening 14*a*, and therefore retain their orientation perpendicular to the equipotential lines EQ. The liquid crystal molecules 30*a* away from the center of the opening 14*a* (the top surface 40*t* of the protrusion 40) incline by the influence of the orientation of other liquid crystal molecules 30*a* at the closer edge portion EG, thereby forming an inclined orientation that is symmetric about the center SA of the opening 14*a* (the top surface 40*t* of the protrusion 40). An inclined orientation symmetric about the center SA of the unit solid portion 14*b*' is formed also in the region corresponding to the unit solid portion 14*b*' which is substantially surrounded by the openings 14*a* and the protrusions 40.

As described above, in the liquid crystal display device 200, as in the liquid crystal display device 100, liquid crystal domains each having a radially-inclined orientation are formed corresponding to the openings 14*a* and the unit solid portions 14*b*'. Since the protrusions 40 are provided so as to completely surround each unit solid portion 14*b*' in a generally circular pattern, each liquid crystal domain is formed corresponding to the generally circular region surrounded by the protrusions 40. Moreover, the side surface of the protrusion 40 provided in the opening 14*a* functions to incline the liquid crystal molecules 30*a* in the vicinity of the edge portion EG of the opening 14*a* in the same direction as the direction of the orientation-regulating force exerted by the inclined electric field, thereby stabilizing the radially-inclined orientation.

Of course, the orientation-regulating force exerted by the inclined electric field only acts in the presence of an applied voltage, and the strength thereof depends upon the strength of the electric field (the level of the applied voltage). Therefore, when the electric field strength is small (i.e., when the applied voltage is low), the orientation-regulating force exerted by the inclined electric field is weak, in which case the radially-inclined orientation may collapse due to floating of the liquid crystal material when a stress is applied to the liquid crystal panel. Once the radially-inclined orientation collapses, it is not restored until application of a voltage sufficient to produce an inclined electric field that exerts a sufficiently strong orientation-regulating force. On the other hand, the orientation-regulating force from the side surface 40*s* of the protrusion 40 is exerted regardless of the applied voltage, and is very strong as it is known in the art as the "anchoring effect" of the alignment film. Therefore, even when floating of the liquid crystal material occurs and the radially-inclined orientation once collapses, the liquid crystal molecules 30*a* in the vicinity of the side surface 40*s* of the protrusion 40 retain the same orientation direction as that of the radially-inclined orientation. Therefore, the radially-inclined orientation is easily restored once the floating of the liquid crystal material stops.

Thus, the liquid crystal display device 200 has an additional advantage of being strong against a stress in addition to the advantages of the liquid crystal display device 100. Therefore, the liquid crystal display device 200 can be suitably used in apparatuses that are often subject to a stress, such as PCs that are often carried around and PDAs.

When the protrusion 40 is made of a dielectric material having a high transparency, there is obtained an advantage of improving the contribution to the display of a liquid crystal domain that is formed in a region corresponding to the opening 14*a*. When the protrusion 40 is made of an opaque dielectric material, there is obtained an advantage that it is possible to prevent light leakage caused by the retardation of the liquid crystal molecules 30*a* that are in an inclined orientation due to the side surface 40*s* of the protrusion 40. Whether to employ a transparent dielectric material or an opaque dielectric material can be determined in view of the application of the liquid crystal display device, for example. In either case, the use of a photosensitive resin provides an advantage that the step of patterning the protrusions 40 corresponding to the openings 14*a* can be simplified. In order to obtain a sufficient orientation-regulating force, the height of the protrusion 40 is preferably in the range of about 0.5 μm to about 2 μm, when the thickness of the liquid crystal layer 30 is about 3 μm. Typically, the height of the protrusion 40 is preferably in the range of about ⅙ to about ⅔ of the thickness of the liquid crystal layer 30.

As described above, the liquid crystal display device 200 includes the protrusion 40 in the opening 14*a* of the picture element electrode 14, and the side surface 40*s* of the protrusion 40 exerts an orientation-regulating force in the same direction as that of the orientation-regulating force exerted by an inclined electric field for the liquid crystal molecules 30*a* of the liquid crystal layer 30. Preferred conditions for the side surface 40*s* to exert an orientation-regulating force of the same direction as that of the orientation-regulating force exerted by the inclined electric field will now be described with reference to FIG. 29A to FIG. 29C.

FIG. 29A to FIG. 29C schematically illustrate cross-sectional views of liquid crystal display devices 200A, 200B and 200C, respectively. FIG. 29A to FIG. 29C correspond to FIG. 28A. The liquid crystal display devices 200A, 200B and 200C all have a protrusion in the opening 14*a*, but differ from the liquid crystal display device 200 in terms of the positional relationship between the entire protrusion 40 as a single structure and the corresponding opening 14*a*.

In the liquid crystal display device 200 described above, the entire protrusion 40 as a structure is formed in the opening 14*a*, and the bottom surface of the protrusion 40 is smaller than the opening 14*a*, as illustrated in FIG. 28A. In the liquid crystal display device 200A illustrated in FIG. 29A, the bottom surface of a protrusion 40A is aligned with the opening 14*a*. In the liquid crystal display device 200B illustrated in FIG. 29B, the bottom surface of a protrusion 40B is greater than the opening 14*a* so as to cover a portion of the solid portion (conductive film) 14*b* surrounding the opening 14*a*. The solid portion 14*b* is not formed on the side surface 40*s* of any of the protrusions 40, 40A and 40B. As a result, the equipotential lines EQ are substantially flat over the solid portion 4*b* and drop into the opening 14*a*, as illustrated in the respective figures. Therefore, as the protrusion 40 of the liquid crystal display device 200, the side surface 40*s* of the protrusion 40A of the liquid crystal display device 200A and that of the protrusion 40B of the liquid crystal display device 200B both exert an orientation-regulating force of the same direction as that of the orientation-regulating force exerted by the inclined electric field, thereby stabilizing the radially-inclined orientation.

In contrast, in the liquid crystal display device 200C illustrated in FIG. 29C, the bottom surface of a protrusion 40C is greater than the opening 14*a*, and a portion of the solid portion 14*b* extending into a region above the opening 14*a* is formed on the side surface 40*s* of the protrusion 40C. Due to the influence of the portion of the solid portion 14*b* formed on the side surface 40*s*, a ridge portion is created in the equipotential lines EQ. The ridge portion of the equipotential lines EQ has a gradient opposite to that of the other portion of the equipotential lines EQ dropping into the opening 14*a*. This indicates that an inclined electric field has been produced whose direction is opposite to that of an inclined electric field for orienting the liquid crystal molecules 30*a* into a radially-inclined orientation. Therefore, in order for the side surface 40*s* to have an orientation-regulating force of the same direction as that of the orientation-regulating force exerted by the inclined electric field, it is preferred that the solid portion (conductive film) 14*b* is not formed on the side surface 40*s*.

Next, a cross-sectional structure of the protrusion 40 taken along line 30A–30A' of FIG. 26A will be described with reference to FIG. 30.

Since the protrusions 40 illustrated in FIG. 26A are formed so as to completely surround each unit solid portion 14*b*' in a generally circular pattern, as described above, the portions serving to connect adjacent unit solid portions 14*b*' together (the branch portions extending in four directions from the circular portion) are formed on the protrusion 40 as illustrated in FIG. 30. Therefore, in the step of depositing the conductive film to be the solid portions 14*b* of the picture element electrode 14, there is a considerable possibility that disconnection may occur on the protrusion 40 or delamination may occur in an after-treatment of the production process.

In view of this, in a liquid crystal display device 200D illustrated in FIG. 31A and FIG. 31B, protrusions 40D independent of one another are formed so that each of the protrusions 40D is completely included within the opening 14*a* so that the conductive film to be the solid portion 14*b* is formed on the flat surface of the substrate 11, thereby eliminating the possibility of disconnection or delamination. Although the protrusions 40D do not completely surround each unit solid portion 14*b*' in a generally circular pattern, a generally circular liquid crystal domain corresponding to each unit solid portion 14*b*' is formed, and the radially-inclined orientation of the unit solid portion 14*b*' is stabilized as in the above-described examples.

The effect of stabilizing the radially-inclined orientation which is obtained by forming the protrusion 40 in the opening 14*a* is not limited to the pattern of the opening 14*a* described above, but may similarly be applied to any of the patterns of the opening 14*a* described above to obtain effects as those described above. In order for the protrusion 40 to sufficiently exert the effect of stabilizing the orientation against a stress, it is preferred that the pattern of the protrusion 40 (the pattern as viewed in the substrate normal direction) covers as much area as possible of the liquid crystal layer 30. Therefore, for example, a greater orientation stabilizing effect of the protrusion 40 can be obtained with the positive pattern with circular unit solid portions 14*b*' than with the negative pattern with circular openings 14*a*.

With the electrode structure described above where openings are provided in the picture element electrode, a sufficient voltage may not be applied across the liquid crystal layer in a region corresponding to the opening and a sufficient retardation change may not be obtained, thereby decreasing the light efficiency. In view of this, a dielectric layer may be provided on one side of the picture element electrode with openings (an upper electrode) that is away from the liquid crystal layer, with an additional electrode (a lower electrode) being provided via the dielectric layer so as to at least partially oppose the openings of the picture element electrode (i.e., a two-layer electrode may be employed). In this way, it is possible to apply a sufficient voltage across the liquid crystal layer corresponding to the opening, thereby improving the light efficiency and/or the response characteristic.

Each of FIG. 32A to FIG. 32C schematically illustrates a cross-sectional structure of one picture element region of a liquid crystal display device 300 having a picture element electrode 15 (a two-layer electrode) including a lower electrode 12, an upper electrode 14, and a dielectric layer 13 provided therebetween. The upper electrode 14 of the picture element electrode 15 is substantially equivalent to the picture element electrode 14 described above, and includes openings and a solid portion having any of the various shapes described above and arranged in any of the various patterns described above. The function of the picture element electrode 15 having a two-layer structure will now be described.

The picture element electrode 15 of the liquid crystal display device 300 includes a plurality of openings 14*a* (including 14*a*1 and 14*a*2). FIG. 32A schematically illustrates an orientation of the liquid crystal molecules 30*a* in the liquid crystal layer 30 in the absence of an applied voltage (OFF state). FIG. 32B schematically illustrates a state where the orientation of the liquid crystal molecules 30*a* has just started to change (initial ON state) according to the voltage applied across the liquid crystal layer 30. FIG. 32C schematically illustrates a state where the orientation of the liquid crystal molecules 30*a* has changed and become steady according to the applied voltage. In FIG. 32A to FIG. 32C, the lower electrode 12, which is provided so as to oppose the openings 14*a*1 and 14*a*2 via the dielectric layer 13, overlaps both of the openings 14*a*1 and 14*a*2 and also extends in a region between the openings 14*a*1 and 14*a*2 (a region where the upper electrode 14 exists). However, the arrangement of the lower electrode 12 is not limited to this, but the arrangement may alternatively be such that the area of the lower electrode 12=the area of the opening 14*a*, or the area of the lower electrode 12<the area of the opening 14*a*, for each of the openings 14*a*1 and 14*a*2. Thus, the structure of the lower electrode 12 is not limited to any particular structure as long as the lower electrode 12 opposes at least a portion of the opening 14*a* via the dielectric layer 13. However, when the lower electrode 12 is provided within the opening 14*a*, there is a region (gap region) in which neither the lower electrode 12 nor the upper electrode 14 is present in a plane as viewed in the direction normal to the substrate 11. A sufficient voltage may not be applied across the liquid crystal layer 30 in the region opposing the gap region. Therefore, in order to stabilize the orientation of the liquid crystal layer 30, it is preferred that the width of the gap region is sufficiently reduced. Typically, it is preferred that the width of the gap region does not exceed about 4 μm. Moreover, the lower electrode 12 that is provided at a position such that it opposes the region where the conductive layer of the upper electrode 14 exists via the dielectric layer 13 has substantially no influence on the electric field applied across the liquid crystal layer 30. Therefore, such a lower electrode 12 may or may not be patterned.

As illustrated in FIG. 32A, when the picture element electrode 15 and the counter electrode 22 are at the same potential (a state where no voltage is applied across the liquid crystal layer 30), the liquid crystal molecules 30*a* in the picture element region are aligned vertical to the surfaces of the substrates 11 and 21. Herein, it is assumed that the upper electrode 14 and the lower electrode 12 of the picture element electrode 15 are at the same potential for the sake of simplicity.

When a voltage is applied across the liquid crystal layer 30, a potential gradient represented by equipotential lines EQ shown in FIG. 32B is produced. A uniform potential gradient represented by equipotential lines EQ parallel to the surfaces of the upper electrode 14 and the counter electrode 22 is produced in the liquid crystal layer 30 in a region between the upper electrode 14 of the picture element electrode 15 and the counter electrode 22. A potential gradient according to the potential difference between the lower electrode 12 and the counter electrode 22 is produced in regions of the liquid crystal layer 30 located above the openings 14*a*1 and 14*a*2 of the upper electrode 14. The potential gradient produced in the liquid crystal layer 30 is influenced by a voltage drop due to the dielectric layer 13, whereby the equipotential lines EQ in the liquid crystal layer 30 drop in regions corresponding to the openings 14*a*1 and 14*a*2 (creating a plurality of "troughs" in the equipotential lines EQ). Since the lower electrode 12 is provided in a region opposing the openings 14*a*1 and 14*a*2 via the dielectric layer 13, the liquid crystal layer 30 around the respective central portions of the openings 14*a*1 and 14*a*2 also has a potential gradient that is represented by a portion of the equipotential lines EQ parallel to the plane of the upper electrode 14 and the counter electrode 22 ("the bottom of the trough" of the equipotential lines EQ). An inclined electric field represented by an inclined portion of the equipotential lines EQ is produced in the liquid crystal layer 30 above an edge portion EG of each of the openings 14*a*1 and 14*a*2 (the peripheral portion of and within the opening including the boundary thereof).

As is clear from a comparison between FIG. 32B and FIG. 2A, since the liquid crystal display device 300 has the lower electrode 12, a sufficient electric field can act also upon the liquid crystal molecules in the liquid crystal domain formed in a region corresponding to the opening 14*a*.

A torque acts upon the liquid crystal molecules 30*a* having a negative dielectric anisotropy so as to direct the axial orientation of the liquid crystal molecules 30*a* to be parallel to the equipotential lines EQ. Therefore, the liquid crystal molecules 30*a* above the right edge portion EG in FIG. 32B incline (rotate) clockwise and the liquid crystal molecules 30*a* above the left edge portion EG incline (rotate) counterclockwise as indicated by arrows in FIG. 32B. As a result, the liquid crystal molecules 30*a* above the edge portions EG are oriented parallel to the corresponding portions of the equipotential lines EQ.

When an electric field represented by a portion of the equipotential lines EQ inclined with respect to the axial orientation of the liquid crystal molecules 30*a* (an inclined electric field) is produced at the edge portions EG of the openings 14*a*1 and 14*a*2 of the liquid crystal display device 300, as illustrated in FIG. 32B, the liquid crystal molecules 30*a* incline in whichever direction (the counterclockwise direction in the illustrated example) that requires less rotation for the liquid crystal molecules 30*a* to be parallel to the equipotential line EQ, as illustrated in FIG. 3B. The liquid crystal molecules 30*a* in a region where an electric field represented by an equipotential line EQ perpendicular to the axial orientation of the liquid crystal molecules 30*a* is produced incline in the same direction as the liquid crystal molecules 30*a* located on the inclined portion of the equipotential lines EQ so that the orientation thereof is continuous (in conformity) with the orientation of the liquid crystal molecules 30*a* located on the inclined portion of the equipotential lines EQ as illustrated in FIG. 3C.

The change in the orientation of the liquid crystal molecules 30*a*, starting from those that are located on the inclined portion of the equipotential lines EQ, proceeds as described above and reaches a steady state, i.e., an inclined orientation (radially-inclined orientation) that is symmetric about the center SA of each of the openings 14*a*1 and 14*a*2, as schematically illustrated in FIG. 32C. The liquid crystal molecules 30*a* in a region of the upper electrode 14 located between the two adjacent openings 14*a*1 and 14*a*2 also take an inclined orientation so that the orientation thereof is continuous (in conformity) with the orientation of the liquid crystal molecules 30*a* at the edge portions of the openings 14*a*1 and 14*a*2. The liquid crystal molecules 30*a* in the middle between the edge of the opening 14*a*1 and the edge of the opening 14*a*2 are subject to substantially the same influence from the liquid crystal molecules 30*a* at the respective edge portions, and thus remain in a vertical alignment as the liquid crystal molecules 30*a* located around the central portion of each of the openings 14*a*1 and 14*a*2. As a result, the liquid crystal layer above the upper electrode 14 between the adjacent two openings 14*a*1 and 14*a*2 also takes a radially-inclined orientation. Note that the inclination direction of the liquid crystal molecules differs between the radially-inclined orientation of the liquid crystal layer in each of the openings 14*a*1 and 14*a*2 and that of the liquid crystal layer between the openings 14*a*1 and 14*a*2. Observation of the orientation around the liquid crystal molecule 30*a* at the center of each region having the radially-inclined orientation illustrated in FIG. 32C shows that the liquid crystal molecules 30*a* in the regions of the openings 14*a*1 and 14*a*2 are inclined so as to form a cone that spreads toward the counter electrode, whereas the liquid crystal molecules 30*a* in the region between the openings are inclined so as to form a cone that spreads toward the upper electrode 14. Since both of these radially-inclined orientations are formed so as to conform with the inclined orientation of the liquid crystal molecules 30*a* at an edge portion, the two radially-inclined orientations are continuous with each other.

As described above, when a voltage is applied across the liquid crystal layer 30, the liquid crystal molecules 30*a* incline, starting from those above the respective edge portions EG of the openings 14*a*1 and 14*a*2 provided in the upper electrode 14. Then, the liquid crystal molecules 30*a* in the surrounding regions incline so as to conform with the inclined orientation of the liquid crystal molecules 30*a* above the edge portion EG. Thus, a radially-inclined orientation is formed. Therefore, as the number of openings 14*a* to be provided in each picture element region increases, the number of liquid crystal molecules 30*a* that initially start inclining in response to an applied electric field also increases, thereby reducing the amount of time that is required to achieve the radially-inclined orientation across the entire picture element region. Thus, by increasing the number of openings 14*a* to be provided in the picture element electrode 15 for each picture element region, it is possible to improve the response speed of a liquid crystal display device. Moreover, by employing a two-layer electrode including the upper electrode 14 and the lower electrode 12 as the picture element electrode 15, a sufficient electric field can act also upon the liquid crystal molecules in a region corresponding to the opening 14*a*, thereby improving the response characteristic of the liquid crystal display device.

Moreover, the orientation of a liquid crystal domain that takes a radially-inclined orientation can be further stabilized by providing a protrusion on the counter substrate for orienting the liquid crystal molecules into a radially-inclined orientation in cooperation with the orientation-regulating structure (the electrode structure with openings therein as described above) of the TFT substrate.

FIG. 33A and FIG. 33B illustrate a liquid crystal display device 400 including protrusions 28 provided on a counter substrate 400*b*. FIG. 33A is a plan view, and FIG. 33B is a cross-sectional view taken along line 33B–33B' of FIG. 33A.

The liquid crystal display device 400 includes the TFT substrate 100*a* having the picture element electrode 14 in which the openings 14*a* are formed, and the counter substrate 400*b* having the protrusions 28 that are protruding toward the liquid crystal layer 30. Note that the TFT substrate 100*a* is not limited to the illustrated arrangement, but may alternatively be any of the various arrangements described above.

Each protrusion 28 provided on the counter substrate 400*b* has a side surface 28*s* that is inclined with respect to the substrate plane of the counter substrate 400*b* (the substrate plane of the transparent substrate 11), and the protrusion 28 is formed on the counter electrode 22 in the illustrated example.

The surface of each protrusion 28 has a vertical alignment power (typically, a vertical alignment film (not shown) is formed so as to cover the protrusion 28), and the liquid crystal molecules 30*a* are aligned substantially vertical to the side surface 28*s* due to the anchoring effect thereof, as illustrated in FIG. 33B. Therefore, the liquid crystal molecules 30*a* around the protrusion 28 are in a radially-inclined orientation about the protrusion 28. Thus, the protrusion 28 orients the liquid crystal molecules 30*a* into a radially-inclined orientation by virtue of the configuration of the surface thereof (with a vertical alignment power).

Moreover, the protrusion 28 is provided in a region opposing the solid portion 14*b* of the picture element electrode 14 and, more specifically, is provided so as to oppose the central portion of the unit solid portion 14*b*'. With such an arrangement of the protrusions 28, the inclination direction of the liquid crystal molecules due to the protrusion 28 is aligned with the orientation direction of the radially-inclined orientation of a liquid crystal domain that is formed in a region corresponding to the unit solid portion 14*b*' of the picture element electrode 14 by the orientation-regulating structure. Since the protrusion 28 exerts an orientation-regulating force regardless of the presence/absence of an applied voltage, a stable radially-inclined orientation can be obtained at any gray level, and a desirable resistance to a stress is also provided.

As described above, in the liquid crystal display device 400, the direction of the radially-inclined orientation formed by the orientation-regulating structure is aligned with the direction of the radially-inclined orientation formed by the protrusion 28, thereby stabilizing the radially-inclined orientation, in the presence of an applied voltage across the liquid crystal layer 30, i.e., in the presence of an applied voltage between the picture element electrode 14 and the counter electrode 22. This is schematically shown in FIG. 34A to FIG. 34C. FIG. 34A illustrates a state in the absence of an applied voltage, FIG. 34B illustrates a state where the orientation has just started to change (initial ON state) after application of a voltage, and FIG. 34C schematically illustrates a steady state during the voltage application.

As illustrated in FIG. 34A, the orientation-regulating force exerted by the protrusion 28 acts upon the liquid crystal molecules 30*a* in the vicinity thereof even in the absence of an applied voltage, thereby forming a radially-inclined orientation.

When voltage application begins, an electric field represented by equipotential lines EQ shown in FIG. 34B is produced (by the orientation-regulating structure), and a liquid crystal domain in which the liquid crystal molecules 30*a* are in a radially-inclined orientation is formed in each region corresponding to the opening 14*a* and each region corresponding to the solid portion 14*b*, and the liquid crystal layer 30 reaches a steady state as illustrated in FIG. 34C. The inclination direction of the liquid crystal molecules 30*a* in each liquid crystal domain formed in a region corresponding to the solid portion 14*b* coincides with the direction in which the liquid crystal molecules 30*a* are inclined by the orientation-regulating force exerted by the protrusion 28 which is provided in a corresponding region.

When a stress is applied upon the liquid crystal display device 400 which is in a steady state, the radially-inclined orientation of the liquid crystal layer 30 once collapses, but upon removal of the stress, the radially-inclined orientation is restored because of the orientation-regulating forces from the orientation-regulating structure and the protrusion 28 acting upon the liquid crystal molecules 30*a*. Therefore, the occurrence of an after image due to a stress is suppressed.

Note that the orientation-regulating force from the protrusion 28 does not have to be strong because it is only required to have an effect of stabilizing a radially-inclined orientation formed by the orientation-regulating structure and fixing the central axis position thereof. For example, a sufficient orientation-regulating force is obtained by forming the protrusion 28 with a diameter of about 15 μm and a height (thickness) of about 1 μm for the unit solid portion 14*b*' having a diameter of about 30 μm to about 50 μm.

While the material of the protrusion 28 is not limited to any particular material, the protrusion 28 can easily be formed by using a dielectric material such as a resin. Moreover, it is preferred to use a resin material that deforms by heat, in which case it is possible to easily form the protrusion 28 having a slightly-humped cross section as illustrated in FIG. 33B through a heat treatment after patterning. The protrusion 28 having a slightly-humped cross section (along the normal to the substrate plane) with a vertex as illustrated in the figure provides a desirable effect of fixing the central position of the radially-inclined orientation. Of course, the protrusion may alternatively have a top surface.

Moreover, while FIG. 33A illustrates the protrusion 28 whose cross section (along the substrate plane of the counter substrate 400*b*) is in a generally circular shape, the cross-sectional shape of the protrusion 28 is not limited thereto, and the protrusion 28 may alternatively have a generally rectangular cross section or a generally cross-shaped cross section. In order to reduce the viewing angle dependence, the protrusion 28 preferably has a cross-sectional shape having a high degree of rotational symmetry.

FIG. 35 illustrates a liquid crystal display device 400A including protrusions 28A having a generally cross-shaped cross section. The liquid crystal display device 400A has substantially the same structure as that of the liquid crystal display device 400 illustrated in FIG. 33A and FIG. 33B except that the protrusions 28A have a generally cross-shaped cross section.

As compared with a protrusion having a generally circular cross section and having about the same area, the protrusion 28A having a generally cross-shaped cross section has a larger inclined side surface that exerts an orientation-regulating force on the liquid crystal molecules 30*a*, and is capable of exerting the orientation-regulating force over a larger area in a liquid crystal domain. Therefore, it is possible to more effectively exert a greater orientation-regulating force on the liquid crystal molecules 30*a*. Thus, the liquid crystal display device 400A including the protrusion 28A having a generally cross-shaped cross section has a further stabilized orientation and an improved response speed to voltage application.

Of course, it is possible to employ an arrangement where protrusions of different cross-sectional shapes (along the substrate plane) are present on the counter substrate. For example, protrusions having a greater orientation-regulating force (e.g., the protrusions 28A having a generally cross-shaped cross section illustrated in FIG. 35) may be provided for improving the orientation-regulating force in regions where an unnecessary electric field that adversely influences the display is likely to occur (e.g., in the vicinity of the bus line), while providing protrusions having a different cross-sectional shape in other regions.

FIG. 36 and FIG. 37 illustrate liquid crystal display devices 400B and 400C, respectively, including protrusions of different cross-sectional shapes on the counter substrate 400*b*.

The TFT substrate of the liquid crystal display device 400B illustrated in FIG. 36 includes the picture element electrode 14 in which a portion of the unit solid portion 14*b*' (having a shape that corresponds to about one half of the unit solid portion 14*b*') is located along the gate bus line 15, as in the liquid crystal display device 100E illustrated in FIG. 21A and FIG. 21B. The counter substrate of the liquid crystal display device 400B includes a protrusion 28B having a generally T-shaped cross section in each region corresponding to a portion of the unit solid portion 14*b*' that is located along the gate bus line 15, and includes the protrusion 28 having a generally circular cross section in each region corresponding to the unit solid portion 14*b*'.

The direction in which the liquid crystal molecules 30*a* are inclined by the generally T-shaped protrusion 28B is aligned with the orientation direction of the radially-inclined orientation of a portion of a liquid crystal domain that is formed corresponding to the portion of the unit solid portion 14*b*' (having a shape that corresponds to about one half of the unit solid portion 14*b*') located along the gate bus line 15. The generally T-shaped protrusion 28B provided corresponding to the portion of the unit solid portion 14*b*' (having a shape that corresponds to about one half of the unit solid portion 14*b*') is capable of effectively exerting a greater orientation-regulating force on the liquid crystal molecules 30*a* for the same reason as the generally cross-shaped protrusion 28A provided in each region corresponding to the unit solid portion 14*b*'.

Therefore, in the liquid crystal display device 400B in which the protrusions 28B having a great orientation-regulating force are located along the gate bus line 15, it is possible to effectively regulate the orientation of the liquid crystal molecules 30*a* located along the gate bus line 15 whose orientation is likely to be disturbed.

The TFT substrate of the liquid crystal display device 400C illustrated in FIG. 37 includes the picture element electrode 14 in which a portion of the unit solid portion 14*b*' (having a shape that corresponds to about one half of the unit solid portion 14*b*') is located along the gate bus line 15 and the source bus line 16, as in the liquid crystal display device 100G illustrated in FIG. 23. The counter substrate of the liquid crystal display device 400C includes the protrusion 28B having a generally T-shaped cross section in each region corresponding to the portion of the unit solid portion 14*b*' that is located along the gate bus line 15 and the source bus line 16, and includes the protrusion 28 having a generally circular cross section in each region corresponding to the unit solid portion 14*b*'.

In the liquid crystal display device 400C in which the protrusions 28B having a great orientation-regulating force are located along the gate bus line 15 and the source bus line 16, it is possible to effectively regulate the orientation of the liquid crystal molecules 30*a* that are located along the gate bus line 15 and those that are located along the source bus line 16.

Arrangement of Polarization Plate and Phase Plate

A so-called "vertical alignment type liquid crystal display device", including a liquid crystal layer in which liquid crystal molecules having a negative dielectric anisotropy are vertically aligned in the absence of an applied voltage, is capable of displaying an image in various display modes. For example, a vertical alignment type liquid crystal display device may be used in an optical rotation mode or in a display mode that is a combination of an optical rotation mode and a birefringence mode, in addition to a birefringence mode in which an image is displayed by controlling the birefringence of the liquid crystal layer with an electric field. It is possible to obtain a birefringence-mode liquid crystal display device by providing a pair of polarization plates on the outer side (the side away from the liquid crystal layer 30) of the pair of substrates (e.g., the TFT substrate and the counter substrate) of any of the liquid crystal display devices described above. Moreover, a phase difference compensator (typically a phase plate) may be provided as necessary. Furthermore, a liquid crystal display device with a high brightness can be obtained also by using generally circularly-polarized light.

Another Alternative Embodiment

The decrease in the display quality due to the inclined electric field produced in the vicinity of the edge of the bus line occurs not only in liquid crystal display devices having an orientation-regulating structure (an electrode structure having unit solid portions and openings) for forming a liquid crystal domain that takes a radially-inclined orientation, but occurs in liquid crystal display devices in general that include a vertical alignment type liquid crystal layer, which takes a vertical alignment in the absence of an applied voltage, and that regulate the orientation by using an electrode structure having openings therein.

With the present invention, it is possible to improve the display quality in liquid crystal display devices in general that include a vertical alignment type liquid crystal layer and that regulate the orientation by using an electrode structure having openings therein.

A structure of a liquid crystal display device 500 according to another alternative embodiment of the present invention will be described with reference to FIG. 38A and FIG. 38B. FIG. 38A is a plan view as viewed in the substrate normal direction, and FIG. 38B is a cross-sectional view taken along line 38B–38B' of FIG. 38A. FIG. 38A and FIG. 38B illustrate a state where a voltage is applied across the liquid crystal layer.

The liquid crystal display device 500 includes an active matrix substrate (hereinafter referred to as a "TFT substrate") 500*a*, a counter substrate (referred to also as a "color filter substrate") 500*b*, and the liquid crystal layer 30 provided between the TFT substrate 500*a* and the counter substrate 500*b*.

The liquid crystal molecules 30*a* of the liquid crystal layer 30 have a negative dielectric anisotropy, and are aligned vertical to the surface of the vertical alignment film in the absence of an applied voltage across the liquid crystal layer 30 by virtue of a vertical alignment film (not shown), as a vertical alignment layer, which is provided on one surface of each of the TFT substrate 500*a* and the counter substrate 500*b* that is closer to the liquid crystal layer 30.

The TFT substrate 500*a* of the liquid crystal display device 500 includes the transparent substrate (e.g., a glass substrate) 11 and a picture element electrode 19 provided on the surface of the transparent substrate 11. The counter substrate 500*b* includes the transparent substrate (e.g., a glass substrate) 21 and the counter electrode 22 provided on the surface of the transparent substrate 21. The orientation of the liquid crystal layer 30 changes for each picture element region according to the voltage applied between the picture element electrode 19 and the counter electrode 22 which are arranged so as to oppose each other via the liquid crystal layer 30. A display is produced by utilizing a phenomenon that the polarization or amount of light passing through the liquid crystal layer 30 changes along with the change in the orientation of the liquid crystal layer 30.

The picture element electrode 19 of the TFT substrate 500*a* includes a plurality of openings 19*a* and a solid portion 19*b*. The opening 19*a* refers to a portion of the picture element electrode 19 made of a conductive film (e.g., an ITO film) from which the conductive film has been removed, and the solid portion 19*b* refers to a portion thereof where the conductive film is present (the portion other than the openings 19*a*). While a plurality of openings 19*a* are formed for each picture element electrode, the solid portion 19*b* is basically made of a single continuous conductive film.

In the present embodiment, each opening 19*a* has a slit shape (i.e., a shape having a significantly small width with respect to its length (the width being the dimension in the direction perpendicular to the length)). Each of the openings 19*a* has a side that extends in a direction at 45° with respect to the long side and the short side of the picture element region (the column and row directions of the matrix pattern arrangement). Moreover, the direction in which the side extends in the upper half of the picture element region is different by 90° from that in the lower half of the picture element region.

When a voltage is applied between the picture element electrode 19 and the counter electrode 22, an inclined electric field represented by an inclined portion of the equipotential lines EQ is produced in the liquid crystal layer 30 above the edge portion of the opening 19*a* of the picture element electrode 19 (the peripheral portion of and within the opening 19*a* including the boundary thereof). Therefore, the liquid crystal molecules 30*a* having a negative dielectric anisotropy, which are in a vertical alignment in the absence of an applied voltage, are inclined to be along the inclination direction of the inclined electric field produced at the edge portion of the opening 19*a*. Thus, when a voltage is applied between the picture element electrode 19 and the counter electrode 22, the orientation of the liquid crystal layer 30 is regulated by the inclined electric field produced at the edge portion of each of the openings 19*a* of the picture element electrode 19.

In the liquid crystal display device 500, the orientation of the liquid crystal layer 30 is regulated by the inclined electric field produced at the edge portion of the opening 19*a*, whereby the liquid crystal molecules 30*a* in the picture element region are oriented in four different azimuth directions at an angle of an integer multiple of 90° with one another. In other words, in the liquid crystal display device 500, the picture element region has a multi-domain orientation. Therefore, the liquid crystal display device 500 has a desirable viewing angle characteristic.

Moreover, the counter substrate 500*b* of the liquid crystal display device 500 includes protrusions 29 on one surface thereof that is closer to the liquid crystal layer 30. Each protrusion 29 has an inclined side surface 29*s* and is formed in a zigzag pattern (or a ">"-shaped pattern) as viewed in the substrate normal direction. The direction in which the inclined side surface 29*s* extends coincides with the direction in which the side of the opening 19*a* extends, and the protrusion 29 is provided so as to be located substantially in the middle of two openings 19*a* that are arranged adjacent to each other in the width direction thereof.

The surface of the protrusion 29 has a vertical alignment power (typically, a vertical alignment film (not shown) is formed so as to cover the protrusion 29), and the liquid crystal molecules 30*a* are aligned substantially vertical to the side surface 29*s* due to the anchoring effect thereof. When a voltage is applied across the liquid crystal layer 30 being in such a state, other liquid crystal molecules 30*a* around the protrusion 29 incline so as to conform with the inclined orientation of the liquid crystal molecules 30*a* on the inclined side surface 29*s* due to the anchoring effect of the inclined side surface 29*s* of the protrusion 29.

Since the direction of the orientation regulation by the inclined electric field produced at the edge portion of the opening 19*a* of the picture element electrode 19 is aligned with the direction of the orientation regulation by the protrusion 29, the protrusion 29 further stabilizes the orientation of the liquid crystal layer, which is brought into a multi-domain orientation by the inclined electric field in the presence of an applied voltage.

The TFT substrate 500*a* of the liquid crystal display device 500 includes a TFT (not shown) as a switching element electrically connected to the picture element electrode 19, and the bus line 18 including the gate bus line (scanning line) 15 and the source bus line (signal line) 16 that are electrically connected to the TFT.

In the present embodiment, the opening 19*a* of the picture element electrode 19 is formed so as not to run across the edge of the gate bus line 15, and the edge of the gate bus line 15 is covered by the solid portion 19*b* of the picture element electrode 19, as illustrated in FIG. 38A. Therefore, a high-quality display is realized. The reason for this will be described with reference to FIG. 38A, FIG. 38B and FIG. 39. FIG. 39 is a plan view schematically illustrating a liquid crystal display device 800 in which a portion of the edge of the gate bus line 15 is not covered by the solid portion 19*b* of the picture element electrode 19.

An inclined electric field is produced in the vicinity of the edge of the bus line 18, and the inclined electric field is produced regardless of the presence/absence of the applied voltage across the liquid crystal layer 30 between the picture element electrode 19 and the counter electrode 22. Therefore, in a liquid crystal display device that produces a display in a normally black mode, if the liquid crystal molecules 30*a* in the vicinity of the edge of the bus line 18 are inclined, in the absence of an applied voltage, by the orientation-regulating force from the inclined electric field, light leakage may occur, thereby decreasing the contrast ratio. Particularly, since the gate bus line 15 is, most of the time, under the application of a relatively high voltage (OFF voltage) for holding TFTs OFF, the degree of such light leakage is significant in the vicinity of the edge of the gate bus line 15.

In the liquid crystal display device 800, the picture element electrode 19 includes openings 19*a* that are formed so as to run across the edge of the gate bus line 15, and thus a portion of the edge of the gate bus line 15 is not covered by the solid portion 19*b* of the picture element electrode 19, as illustrated in FIG. 39. Therefore, around the portion of the edge of the gate bus line 15 that is not covered by the solid portion 19*b* (i.e., in a region LL delimited by a broken line in FIG. 39), the liquid crystal molecules 30*a* are inclined by the inclined electric field produced in the vicinity of the edge of the gate bus line 15, whereby light leakage occurs.

Moreover, a residual charge is likely to occur in the opening 19*a*, through which an insulator material is exposed, due to the inclined electric field produced in the vicinity of the edge of the bus line 18, and if the liquid crystal molecules 30*a* in the opening 19*a* that is located along the bus line 18 are inclined due to the influence of the residual charge, it will cause light leakage. While the degree of the residual charge varies depending on the surface condition of the insulator material, variations in the surface condition of the insulator material occur when printing an alignment film or when injecting a liquid crystal material. Therefore, in a liquid crystal display device, there are variations in the residual charge in the display plane. If the residual charge varies in the display plane, the degree of light leakage also varies in the display plane, thereby causing local variations in the contrast ratio, thus resulting in non-uniformity. Particularly, since a relatively high voltage is applied to the gate bus line 15, as described above, the gate bus line 15 significantly contributes to the occurrence of the non-uniformity.

In the liquid crystal display device 800, the picture element electrode 19 includes openings 19*a* that are formed so as to run across the edge of the gate bus line 15, and thus a portion of the edge of the gate bus line 15 is not covered by the solid portion 19*b* of the picture element electrode 19, as illustrated in FIG. 39. Therefore, there is a region that is not covered by the conductive film (solid portion 19*b*) of the picture element electrode 19 in the vicinity of the edge of the gate bus line 15, whereby light leakage occurs due to a residual charge in such a region, thus causing display non-uniformity.

In contrast, in the liquid crystal display device 500 of the present embodiment, the openings 19*a* of the picture element electrode 19 are formed so as not to run across the edge of the gate bus line 15, and the edge of the gate bus line 15 is covered by the solid portion 19*b* of the picture element electrode 19. Therefore, the liquid crystal molecules 30*a* of the liquid crystal layer 30 are electrically shielded from the influence of the inclined electric field produced in the vicinity of the edge of the bus line 18. Thus, the liquid crystal molecules 30*a* of the liquid crystal layer 30 are not inclined by the orientation-regulating force from the inclined electric field. Therefore, the occurrence of light leakage is suppressed, thereby suppressing the decrease in the contrast ratio. Moreover, in the liquid crystal display device 500, the edge of the gate bus line 15 is covered by the solid portion 19*b* of the picture element electrode 19, and the region in the vicinity of the edge of the gate bus line 15 is covered by the conductive film (solid portion 19*b*) of the picture element electrode 19, whereby a residual charge is unlikely to occur, and thus the occurrence of non-uniformity is suppressed. As described above, in the liquid crystal display device 500, the occurrence of light leakage due to the inclined electric field produced in the vicinity of the gate bus line 15 is suppressed, thereby suppressing the decrease in the contrast ratio, while the occurrence of non-uniformity due to a residual charge in the vicinity of the gate bus line 15 is suppressed, thereby realizing a high-quality display.

Note that while the present embodiment has been described above with respect to a case where the edge of the gate bus line 15 is covered by the solid portion 19*b* in the picture element electrode 19, it is possible to alternatively employ an arrangement where the edge of the source bus line 16 is covered by the solid portion 19*b* of the picture element electrode 19 as in a liquid crystal display device 500A illustrated in FIG. 40. It is possible to improve the display quality by covering at least one of the edge of the gate bus line 15 and that of the source bus line 16 with the solid portion 19*b* of the picture element electrode 19. Since the inclined electric field produced in the vicinity of the edge of the gate bus line 15 typically has a greater influence on the liquid crystal molecules than the inclined electric field produced in the vicinity of the edge of the source bus line 16, it is preferred that at least the edge of the gate bus line 15 is covered by the solid portion 19*b* of the picture element electrode 19. Moreover, in order to more reliably suppress the influence of the inclined electric field produced in the vicinity of the edge of the bus line 18, it is preferred that both the edge of the gate bus line 15 and that of the source bus line 16 are covered by the solid portion 19*b* of the picture element electrode 19, as in the liquid crystal display device 500B illustrated in FIG. 41.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A liquid crystal display device, comprising a first substrate, a second substrate, a liquid crystal layer provided between the first substrate and the second substrate, and a plurality of picture element regions for producing a display, wherein:

the first substrate includes, on one side thereof that is closer to the liquid crystal layer, a picture element electrode provided for each of the plurality of picture element regions, a switching element electrically connected to the picture element electrode, and a bus line including a gate bus line and a source bus line that are electrically connected to the switching element;

the second substrate includes a counter substrate opposing the picture element electrode via the liquid crystal layer;

the picture element electrode includes a plurality of openings and a solid portion that includes a plurality of unit solid portions;

in each of the plurality of picture element regions, the liquid crystal layer takes a vertical alignment in the absence of an applied voltage between the picture element electrode and the counter electrode, and forms a plurality of liquid crystal domains in the plurality of openings and the solid portion by inclined electric fields produced at respective edge portions of the plurality of openings of the picture element electrode in response to a voltage applied between the picture element electrode and the counter electrode, each of the plurality of liquid crystal domains taking a radially-inclined orientation, and an orientation of each of the plurality of liquid crystal domains changing according to the applied voltage, thereby producing a display; and in each of the plurality of picture element regions, at least one of the plurality of openings of the picture element electrode that is located along the bus line and located between two adjacent ones of the plurality of unit solid portions overlaps the bus line.

2. The liquid crystal display device of claim 1, wherein the at least one opening that overlaps the bus line at least includes an opening that is located along the gate bus line.

3. The liquid crystal display device of claim 2, wherein all of the openings located along the gate bus line entirely overlap the bus line.

4. The liquid crystal display device of claim 2, wherein the at least one opening that overlaps the bus line further includes an opening that is located along the source bus line.

5. The liquid crystal display device of claim 3, wherein the at least one opening that overlaps the bus line further includes an opening that is located along the source bus line.

6. A liquid crystal display device, comprising a first substrate, a second substrate, a liquid crystal layer provided between the first substrate and the second substrate, and a plurality of picture element regions for producing a display, wherein:

the first substrate includes, on one side thereof that is closer to the liquid crystal layer, a picture element electrode provided for each of the plurality of picture element regions, a switching element electrically connected to the picture element electrode, and a bus line including a gate bus line and a source bus line that are electrically connected to the switching element;

the second substrate includes a counter substrate opposing the picture element electrode via the liquid crystal layer;

the picture element electrode includes a plurality of openings and a solid portion that includes a plurality of unit solid portions, each of which is surrounded by at least some of the plurality of openings;

the liquid crystal layer takes a substantially vertical alignment in the absence of an applied voltage between the picture element electrode and the counter electrode; and in each of the plurality of picture element regions, at least one of the plurality of openings of the picture element electrode that is located along the bus line and located between two adjacent ones of the plurality of unit solid portions overlaps the source bus line and/or gate bus line.

7. The liquid crystal display device of claim 6, wherein the at least one opening that overlaps the bus line at least includes an opening that is located along the gate bus line.

8. The liquid crystal display device of claim 7, wherein all of the openings located along the gate bus line entirely overlap the bus line.

9. The liquid crystal display device of claim 7, wherein the at least one opening that overlaps the bus line further includes an opening that is located along the source bus line.

10. The liquid crystal display device of claim 8, wherein the at least one opening that overlaps the bus line further includes an opening that is located along the source bus line.

11. A liquid crystal display device, comprising a first substrate, a second substrate, a liquid crystal layer provided between the first substrate and the second substrate, and a plurality of picture element regions for producing a display, wherein:

the first substrate includes, on one side thereof that is closer to the liquid crystal layer, a picture element electrode provided for each of the plurality of picture element regions, a switching element electrically connected to the picture element electrode, and a bus line including a gate bus line and a source bus line that are electrically connected to the switching element;

the second substrate includes a counter substrate opposing the picture element electrode via the liquid crystal layer;

the picture element electrode includes a plurality of openings and a solid portion;

in each of the plurality of picture element regions, the liquid crystal layer takes a substantially vertical alignment in the absence of an applied voltage between the picture element electrode and the counter electrode, and an orientation of the liquid crystal layer is regulated by an inclined electric field that is produced at an edge portion of each of the plurality of openings of the picture element electrode in the presence of an applied voltage between the picture element electrode and the counter electrode;

in each of the plurality of picture element regions, at least one of an edge of the gate bus line and that of the source bus line is covered by the solid portion of the picture element electrode;

the solid portion of the picture element electrode includes a plurality of unit solid portions; and in each of the plurality of picture element regions, the liquid crystal layer forms a plurality of liquid crystal domains in the plurality of openings and the solid portion by inclined electric fields produced at respective edge portions of the plurality of openings of the picture element electrode in response to a voltage applied between the picture element electrode and the counter electrode, each of the plurality of liquid crystal domains taking a radially-inclined orientation, and an orientation of each of the plurality of liquid crystal domains changing according to the applied voltage, therby producing a display.

12. The liquid crystal display device of claim 11, wherein in each of the plurality of picture element regions, at least the edge of the gate bus line is covered by the solid portion of the picture element electrode.

13. The liquid crystal display device of claim 11, wherein in each of the plurality of picture element regions, at least one of the plurality of openings of the picture element electrode that is located along the bus line and located between two adjacent ones of the plurality of unit solid portions overlaps the bus line.

14. The liquid crystal display device of claim 11, wherein the liquid crystal layer forms a portion of a liquid crystal domain that takes a radially-inclined orientation in a portion of the solid portion that is located along the bus line by the inclined electric field in the presence of an applied voltage between the picture element electrode and the counter electrode.

15. A liquid crystal display device, comprising a first substrate, a second substrate, a liquid crystal layer provided between the first substrate and the second substrate, and a plurality of picture element regions for producing a display, wherein:

the first substrate includes, on one side thereof that is closer to the liquid crystal layer, a picture element electrode provided for each of the plurality of picture element regions, a switching element electrically connected to the picture element electrode, and a bus line including a gate bus line and a source bus line that are electrically connected to the switching element;

the second substrate includes a counter substrate opposing the picture element electrode via the liquid crystal layer;

the picture element electrode includes a plurality of openings and a solid portion;

in each of the plurality of picture element regions, the liquid crystal layer takes a substantially vertical alignment in the absence of an applied voltage between the picture element electrode and the counter electrode, and an orientation of the liquid crystal layer is regulated by an inclined electric field that is produced at an edge portion of each of the plurality of openings of the picture element electrode in the presence of an applied voltage between the picture element electrode and the counter electrode;

in each of the plurality of picture element regions, at least one of an edge of the gate bus line and that of the source bus line is covered by the solid portion of the picture element electrode;

in each of the plurality of picture element regions, at least the edge of the gate bus line is covered by the solid portion of the picture element electrode; and the solid portion of the picture element electrode includes a plurality of unit solid portions; and in each of the plurality of picture element regions, at least the edge of the gate bus line is covered by the solid portion of the picture element electrode; and the solid portion of the picture element electrode includes a plurality of unit solid portions; and in each of the plurality of picture element regions, the liquid crystal layer forms a plurality of liquid crystal domains in the plurality of openings and the solid portion by inclined electric fields produced at respective egde portions of the plurality of openings of the picture element electrode in response to a voltage applied between the picture element electrode and the counter electrode, each of the plurality of liquid crystal domains taking a radially-inclined orientation, and an orientation of each of the plurality of liquid crystal domains changing according to the applied voltage, thereby producing a display.

* * * * *

UNITED STATES PATENT AND TRADEMARK OFFICE

CERTIFICATE OF CORRECTION

PATENT NO. : 6,965,422 B2
DATED : November 15, 2005
INVENTOR(S) : Kubo et al.

It is certified that error appears in the above-identified patent and that said Letters Patent is hereby corrected as shown below:

Title page,
Item [30], Foreign Application Priority Data, insert:
-- November 30, 2001 (JP) 2001-366092
September 27, 2002 (JP) 2002-282664 --.

Signed and Sealed this

Twenty-eighth Day of March, 2006

JON W. DUDAS
*Director of the United States Patent and Trademark Office*